United States Patent
Karibe et al.

(12)

(10) Patent No.: US 6,453,316 B1
(45) Date of Patent: Sep. 17, 2002

(54) SCHEDULING UNIT FOR SCHEDULING SERVICE REQUESTS TO CYCLICALLY PROVIDE SERVICES

(75) Inventors: Tomoyuki Karibe, Neyagawa; Takeshi Kokado, Kyoto; Yukiko Ito, Moriguchi; Tsutomu Tanaka, Nishinomiya; Masaaki Tamai, Moriguchi; Shinzo Doi, Hirakata, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/106,176

(22) Filed: Jun. 29, 1998

Related U.S. Application Data

(62) Division of application No. 08/738,495, filed on Oct. 28, 1996, now abandoned.

(30) Foreign Application Priority Data

| Oct. 26, 1995 | (JP) | ............................................ 7-278799 |
| Oct. 26, 1995 | (JP) | ............................................ 7-278813 |
| Oct. 26, 1995 | (JP) | ............................................ 7-278814 |
| May 20, 1996 | (JP) | ............................................ 8-125146 |
| Aug. 13, 1996 | (JP) | ............................................ 8-213556 |

(51) Int. Cl.$^7$ .......................... G06F 17/30; G06F 13/14
(52) U.S. Cl. ......................................... 707/8; 709/102
(58) Field of Search .............................. 395/287, 728; 707/200–206, 8, 10; 709/100–108, 200–203, 208–211

(56) References Cited

U.S. PATENT DOCUMENTS 5,559,764 A * 9/1996 Chen et al. .................. 369/30
6,032,200 A * 2/2000 Lin ............................. 710/6
6,079,028 A * 6/2000 Ozden et al. ................. 714/6

\* cited by examiner

*Primary Examiner*—Maria N. Von Buhr
(74) *Attorney, Agent, or Firm*—Wenderoth, Lind & Ponack, L.L.P.

(57) ABSTRACT

When a get resource message arrives from an exterior, a resource allocation part reserves a resource. In case of data reading or data writing, a declared value management part checks parameters and a slot allocation part allocates the resource, thereby constructing an efficient file system guaranteeing delay quality in relation to data reading. As the result, it is possible to provide a file system providing pictures in a quick response time for requests from users and supporting users requiring various regeneration speeds.

42 Claims, 35 Drawing Sheets

FIG. 5

| SLOT NUMBER | RESERVED USER NUMBER | ALLOCATION REQUEST NUMBER | NON-PREFERENTIAL FLAG |
|---|---|---|---|
| 1 | 2 | 2 | OFF |
| 1 | NO | NO | OFF |
| 2 | 15 | NO | OFF |
| ⋮ | ⋮ | ⋮ | ⋮ |

FIG. 6

| DESTINATION UNIT NUMBER | SLOT NUMBER | ALLOCATION REQUEST NUMBER |
|---|---|---|
| 1 | 1 | 12 |
| 1 | 2 | 3 |
| 2 | 1 | NO |
| ⋮ | ⋮ | ⋮ |

FIG. 7
| RESOURE DESCRIPTOR | READ OR WRITE | AVERAGE RESERVATION INTERVAL BETWEEN SLOTS | ENSURED FILE SYSTEM INTERNAL BAND | CURRENTLY USABLE FILE SYSTEM INTERNAL BAND |
|---|---|---|---|---|
| 1 | read | 85ms | 6Mbps | 0 |
| 2 | read | 128ms | 4Mbps | 0 |
| ⋮ | ⋮ | ⋮ | ⋮ | ⋮ |
FIG. 8
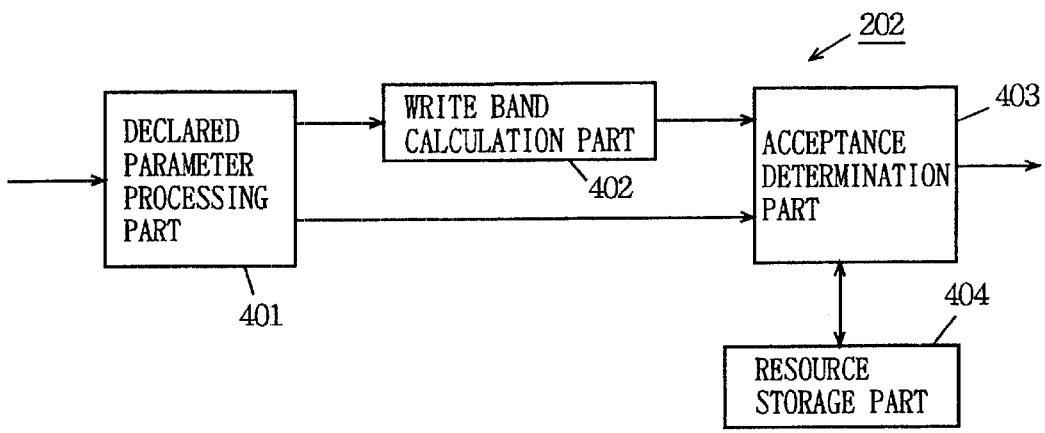
FIG. 9
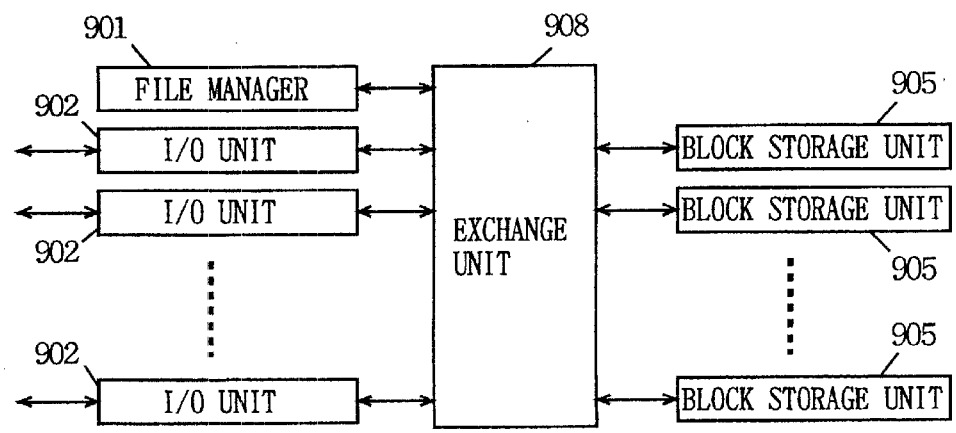

| | DISTRIBUTION RATIO | EFFECTIVE BAND | EFFECTIVE CAPACITY |
|---|---|---|---|
| 1414a CAPACITY: 2GB BAND: 1Mbps | 1/(1+2+3) = 1/6 | 6Mbps | 12GB |
| 1414b CAPACITY: 2GB BAND: 2Mbps | 2/(1+2+3) = 1/3 | 6Mbps | 6GB |
| 1414c CAPACITY: 4GB BAND: 3Mbps | 3/(1+2+3) = 1/2 | 6Mbps | 8GB |

FIG. 15

| | | DISTRIBUTION RATIO | EFFECTIVE BAND | EFFECTIVE CAPACITY |
|---|---|---|---|---|
| 1515a | CAPACITY: 2GB<br>BAND : 1Mbps | 2/(2+2+4) = 1/4 | 4Mbps | 8GB |
| 1515b | CAPACITY: 2GB<br>BAND : 2Mbps | 2/(2+2+4) = 1/4 | 8Mbps | 8GB |
| 1515c | CAPACITY: 4GB<br>BAND : 3Mbps | 4/(2+2+4) = 1/2 | 6Mbps | 8GB |

FIG. 16

| | | DISTRIBUTION RATIO | EFFECTIVE BAND | EFFECTIVE CAPACITY |
|---|---|---|---|---|
| 1616a | CAPACITY: 2GB<br>BAND : 1Mbps | $1/6\alpha + 1/4(1-\alpha) = (3-\alpha)/12$ | $12/(3-\alpha)$ Mbps | $24/(3-\alpha)$ GB |
| 1616b | CAPACITY: 2GB<br>BAND : 2Mbps | $1/3\alpha + 1/4(1-\alpha) = (3+\alpha)/12$ | $24/(3+\alpha)$ Mbps | $24/(3+\alpha)$ GB |
| 1616c | CAPACITY: 4GB<br>BAND : 3Mbps | $1/2\alpha + 1/2(1-\alpha) = 1/2$ | 6Mbps | 8GB |

| CLIENT ID | T req | T ofs |
|---|---|---|
|  |  |  |
|  |  |  |
|  |  |  |

| SERVER ID | T itv | T ofs |
|---|---|---|
|  |  |  |
|  |  |  |
|  |  |  |

SCHEDULING UNIT FOR SCHEDULING SERVICE REQUESTS TO CYCLICALLY PROVIDE SERVICES

This is a divisional of Ser. No. 08/738,495, filed Oct. 28, 1996, abandoned.

BACKGROUND OF THE INVENTION

1. Field of the Invention

The present invention relates to a file system, and more specifically, it relates to a file system handling reading/writing of multimedia data such as pictures, sounds and animation requiring real-time properties.

2. Description of the Background Art

A file system employed in a conventional computer has mainly handled text data. According to "Design of UNIX Kernel" (written by Maurice J. Bach/translated by Fumi Sakamoto, Yoshikatsu Tada and Jun Murai; Kyoritsu Shuppan Kabushiki Kaisha), for example, a file is opened with an open system call for reading or writing the content of the file with a system call such as read or write in case of reading or writing data from or in the file in the UNIX file system.

Such file systems include video servers handling digitized video data, for example. Such video servers include that having a structure of connecting a plurality of storage units storing video data with each other by an exchange unit, as described in Japanese Patent Laying-Open gazette No. 07-107425 titled "Video server". A video regeneration procedure in such a video server is described in ISO/IEC Standard 13818-6 (Committee Draft). According to this Committee Draft, the video server completes preparation for continuous regeneration of pictures when a user transmits "Directory Open" to the video server, while the video server starts transmission of video data to the user when the user transmits "DSM Stream Play" or "DSM Pause Resume". In order to stop supply of the video data, the user transmits "DSM Stream Pause" to the video server.

In the conventional file system such as UNIX, however, the waiting time for reading is increased on the user side when a number of accesses are simultaneously made by users. The waiting time for a user issuing a read command for completely receiving data is unpredictable due to influence exerted by the situation of accesses from other users. Particularly in the file system such as the video server managing data such as pictures and sounds requiring temporal continuity so that each user reads a part of the data every constant time for regenerating the data in his terminal, it is necessary to reliably acquire the data within the constant time, while the conventional file system cannot cope with this. In relation to the data such as video data requiring temporal continuity, therefore, the user must previously acquire long data for regenerating pictures after acquiring all data. In this case, the user must hold a mass storage unit which can store long data, and a long waiting time is required for starting regeneration of pictures.

SUMMARY OF THE INVENTION

Therefore, an object of the present invention is to provide a file system which can provide data to a request from a user in a quick response time, and support users requiring various regeneration speeds.

The present invention has the following characteristics to attain the above object.

The first aspect is a file system for reading or writing data from or in a storage unit for storing data in response to a request from an exterior, which comprises:

a resource management part for managing the maximum value of read or write handling capacity and a used quantity of the handling capacity, and the resource management part is adapted:

to receive a get resource message previously requiring assurance of a necessary band in case of reading or writing the data;

to determine whether or not the band required by the get resource message can be ensured on a basis of the maximum value and the used quantity of the handling capacity when the get resource message is received; and to update and store the used quantity if the required band can be ensured as a result of the determination.

According to the first aspect, as hereinabove described, the band in the file system is ensured when the get resource message is received, whereby it is possible to guarantee delay quality as to reading or writing of files. Further, it is possible to efficiently utilize resources in the file system without ensuring a useless band, by implementing reading or writing of a plurality of files through the ensured band.

The second aspect is characterized in that, in the first aspect, information indicating a necessary band width is given to the get resource message as a parameter.

The third aspect is characterized in that, in the second aspect, the information, which is the parameter of the get resource message, indicating the necessary band width represents an interval for reading/writing a data block having a fixed length from/in the storage unit.

The fourth aspect is characterized in that, in the first aspect, the band width which is ensured in accordance with the request by the get resource message is previously stored in the resource management part.

The fifth aspect is characterized in that, in the fourth aspect, information for identifying whether the get resource message is for reading or writing is given to the get resource message, and the resource management part stores two types of band quantities for reading and writing as band quantities which are ensured in accordance with the request by the get resource message.

The sixth aspect is characterized in that, in the first aspect, a first delay time from a request for reading data up to start of transmission of the data is given to the get resource message as a parameter, and the resource management is adapted:

to previously store a minimum value of a delay time which is warrantable by the file system;

to compare the first delay time with the minimum value when the get resource message is received; and to ensure no band if the first delay time is shorter than the minimum value as a result of the comparison.

The seventh aspect is characterized in that, the sixth aspect further comprises a declared value management part for checking a parameter which is given to a message arriving from the exterior, and the declared value management part is adapted:

to receive a read block message which is provided with a second delay time up to start of transmission of read data as the parameter in case of performing data reading;

to compare the second delay time with the first delay time when the read block message is received; and to decide transmission of a violation notice to a transmitter of the read block message when the second delay time is determined to be shorter as a result of the comparison.

The eighth aspect is characterized in that, the first aspect further comprises a declared value management part for checking a parameter which is given to a message arriving from the exterior, and the declared value management part is adapted:

to store a minimum value of a delay time which is warrantable by the file system;

to receive a read block message which is provided with a second delay time up to start of transmission of read data as the parameter in case of performing data reading;

to compare the second delay time with the minimum time when the read block message is received; and to decide transmission of a violation notice to a transmitter of the read block message when the second delay time is determined to be shorter as a result of the comparison.

The ninth aspect is characterized in that, in the first aspect, the get resource message is provided with a delay time up to start of transmission of data from a read request as a parameter, and the resource management part is adapted:

to calculate a band width which is necessary for satisfying the delay time when the get resource message is received; and to compare the band width which is obtained as a result of the calculation with the band width to be ensured in accordance with the request by the get resource message, for determining whether or not the larger band width can be ensured.

According to the ninth aspect, as hereinabove described, a determination is made as to whether or not the larger band can be ensured in the band satisfying the delay time declared by the get resource message and the band to be ensured in accordance with the request by the get resource message to allocate the band, whereby a plurality of delay qualities can be supported.

The tenth aspect is characterized in that, the first aspect further comprises a declared value management part for checking a parameter which is given to a get resource message arriving from the exterior, and the declared value management part is adapted in data writing:

to monitor a speed of data arrival;

to compare the speed of data arrival obtained as a result of the monitoring with a band width which is ensured when the get resource message is accepted; and not to perform data writing but to make a violation notice to a transmitter of the get resource message when the speed of data arrival is determined to be larger as a result of the comparison.

The eleventh aspect is characterized in that, the first aspect further comprises a declared value management part for checking a parameter which is given to a message arriving from the exterior, and the declared value management part is adapted:

to receive a read block message which provided with a read data quantity per unit time as the parameter in data reading;

to calculate a data read speed from the data quantity per unit time when the read block message is received;

to compare the data read speed obtained by the calculation and the band width ensured when the get resource message is accepted; and to stop the data reading and decide transmission of a violation notice to a transmitter of the read block message if the data read speed is larger as a result of the comparison.

The twelfth aspect is characterized in that, in the first aspect, each of the maximum value and the used quantity of the handling capacity is a read data quantity per unit time.

The thirteenth aspect is characterized in that, in the twelfth aspect, a flag distinguishing reading and writing from each other and information indicating the necessary band width are given to the get resource message as parameters, and the resource management part refers to the flag when the get resource message is received to regard a band width which is decided by the parameters given to the get resource message as the band width to be ensured in case of reading, while regarding a value obtained by multiplying the band width which is decided by the parameters given to the get resource message by a constant value as the band width to be ensured in case of writing.

The fourteenth aspect is characterized in that, in the first aspect, each of the maximum value and the used quantity of the handling capacity is a write data quantity per unit time.

The fifteenth aspect is characterized in that, in the fourteenth aspect, a flag distinguishing reading and writing from each other and information indicating the necessary band width are given to the get resource message as parameters, and the resource management part refers to the flag when the get resource message is received to regard a band width which is decided by the parameters given to the get resource message as the band width to be ensured in case of writing, while regarding a value obtained by multiplying the band width which is decided by the parameters given to the get resource message by a constant value as the band width to be ensured in case of reading.

According to the thirteenth or fifteenth aspect, as hereinabove described, a band obtained by multiplying the required band by a constant value is regarded as the band to be ensured in data writing or data reading, whereby it is not necessary to previously divide the handling capacity of the file system into handling capacities for writing and reading, the ratios can be readily changed in response to requests from users, and resources can be efficiently used.

The sixteenth aspect is a file system comprising a plurality of block storage units storing data, a single or a plurality of I/O units controlling data writing or data reading in response to a request from a user, and an exchange unit connecting each block storage unit with each I/O unit, in which each I/O unit divides the magnitude of the data required by the user into blocks having fixed lengths and transmits a block read request to the block storage unit every block for reading the blocks, and each I/O unit is adapted:

to set an MS arrival slot dividing time every constant time so that a constant number of block read requests can be registered in the MS arrival slot;

to allocate the MS arrival slot to the block read request in case of transmitting the block read request;

to calculate a time for allowing input from each block storage unit to the exchange unit on the basis of a time corresponding to the allocated MS arrival slot; and to give a difference time between the calculated time and a current time to the block read request as a delay limit value and transmit the same to the block storage unit, whereby input of the block which is read from the block storage unit in response to the block read request in the exchange unit is allowed after a time of the delay limit value from arrival of the block read request at the block storage unit.

According to the sixteenth aspect, as hereinabove described, the MS arrival slot is allocated to the block read request, whereby the number of blocks inputted from the block storage units in the exchange unit can be temporally smoothed. Consequently, it is possible to avoid the blocks read from the plurality of block storage units and inputted in the exchange unit from colliding with each other on the input side into the I/O unit and being discarded in the interior of the exchange unit. Further, fluctuation caused by traffic times of the blocks can be reduced, whereby it is possible to efficiently utilize the exchange unit.

The seventeenth aspect is characterized in that, the sixteenth aspect comprises a plurality of server units which are provided with the I/O units and the block storage units in the interiors thereof.

The eighteenth aspect is characterized in that, in the sixteenth aspect, each I/O unit allocates no MS arrival slot to a block read request which is not inputted in the exchange unit among the block read requests.

The nineteenth aspect is characterized in that, the sixteenth aspect further comprises a resource management part managing a maximum value of read or write handling capacity and a used quantity of the handling capacity, the resource management part is adapted:

to receive a get resource message previously requiring assurance of a necessary band in case of performing data reading or data writing;

to determine whether or not the band which is required by the get source message can be ensured on the basis of the maximum value and the used quantity of the handling capacity when the get resource message is received; and to update and store the used quantity if the required band can be ensured as a result of the determination, and each I/O unit is adapted:

to set an issuance interval for the block read requests which are necessary for reading data of the ensured band at T_min for deciding an expected slot of the MS arrival slot at the interval T_min when a band necessary for reading a file is ensured;

to reserve the expected slot if a free space is present in the decided expected slot;

to successively refer to an MS arrival slot of a next time for reserving an MS arrival slot having a free space if the decided expected slot has no free space; and to allocate the block read request to the reserved MS arrival slot in case of data reading.

According to the nineteenth aspect, as hereinabove described, the band in the file system is ensured when the get resource message is received, whereby delay quality can be guaranteed as to reading or writing of files. Reading or writing of a plurality of files is implemented through the ensured band, whereby resources in the file system can be effectively utilized with no necessity for ensuring useless bands.

The twentieth aspect is characterized in that, in the nineteenth aspect, each I/O unit reserves the MS arrival slots in order from the MS arrival slot having a larger ensured band to the MS arrival slot having a smaller ensured band.

According to the twentieth aspect, as hereinabove described, MS arrival slot reservation is made in the order from that having a larger ensured band to that having a smaller one, whereby it is possible to utilize the slot by 100% by making the maximum registration number of each slot constant while guaranteeing delay qualities of all bands. At this time, time fluctuation of a request transmission number is eliminated and it is possible to most efficiently utilize the exchange unit.

The twenty-first aspect is characterized in that, in the nineteenth aspect, each I/O unit makes the MS arrival slot reservation in the order from the MS arrival slot whose next expected slot arrives with earlier timing.

The twenty-second aspect is characterized in that, in the nineteenth aspect, each I/O unit regards a reserved MS arrival slot as an unallocated MS arrival slot as a result of the allocation of the MS arrival slot if an MS arrival slot which is reserved at a time before the time corresponding to the allocated MS arrival slot for the same user is present, and allocates the unallocated MS arrival slot to a data read request from a user acquiring no resource.

The twenty-third aspect is characterized in that, in the nineteenth aspect, each I/O unit performs the reservation of MS arrival slots with respect to all users whose get resource messages are accepted, for allocating unreserved MS arrival slots to data read requests from users acquiring no resources.

According to the twenty-second or twenty-third aspect, as hereinabove described, unused MS arrival slots are allocated to reading of data from users acquiring no resources, whereby the use efficiency of the file system can be further improved.

The twenty-fourth aspect is characterized in that, the first aspect further comprises:

a single or a plurality of block storage units storing data;

a single or a plurality of I/O units controlling data writing or data reading in response to a request from a user; and an exchange unit for connecting each block storage unit with each I/O unit, and each I/O unit is adapted:

to divide the magnitude of data which is required to be written by the user into blocks having fixed lengths and transmit a block read request to each block storage unit for every block thereby reading the blocks; and to set a write slot which is divided every constant time in correspondence to each block storage unit for allocating the write slot to a block write request in case of transmitting the block write request.

According to the twenty-fourth aspect, as hereinabove described, the MS arrival slot is allocated to the block read request, whereby the number of blocks inputted from the block storage units in the exchange unit can be temporally smoothed. Consequently, it is possible to avoid the blocks read from the plurality of block storage units and inputted in the exchange unit from colliding with each other on the input side to the I/O unit and being discarded in the interior of the exchange unit. Further, fluctuation caused by traffic times of the blocks can be reduced, whereby it is possible to efficiently utilize the exchange unit.

The twenty-fifth aspect is a method of dispersing/arranging file data in respective storage units in a file system inputting/outputting the file data in/from a plurality of storage units, and characterized in that:

ratios for arranging the file data are decided in proportion to bands which are provided in respective storage units for dispersing and storing the file data in the respective storage units in accordance with the decided ratios.

According to the twenty-fifth aspect, as hereinabove described, the ratios for arranging the file data are decided in proportion to the bands provided in the respective storage units so that the file data are dispersed and stored in the respective storage units in accordance with the decided ratios, whereby it is possible to prevent such a situation that the ability of a storage unit having high performance (data read/write speed) cannot be sufficiently brought out due to a bottleneck of a storage unit having low performance.

The twenty-sixth aspect is a method of dispersing/arranging file data in respective storage units in a file system inputting/outputting the file data in/from a plurality of storage units, which is characterized in that:

ratios for arranging the file data, which are decided in proportion to storage capacities, are provided in the respective storage units for dispersing and storing the file data in the respective storage units in accordance with the decided ratios.

According to the twenty-sixth aspect, as hereinabove described, the ratios for arranging the file data are decided in proportion to the storage capacities provided in the respective storage units so that the file data are dispersed and stored in the respective storage units in accordance with the decided ratios, whereby it is possible to prevent such a situation that the ability of a storage unit having high performance (data read/write speed) cannot be sufficiently brought out due to a bottleneck of a storage unit having low performance.

The twenty-seventh aspect is a method of dispersing/arranging file data in respective storage units in a file system inputting/outputting the file data in/from a plurality of storage units, which is characterized in that:

ratios for arranging the file data, which are decided in proportion to bands and storage capacities, are provided in the respective storage units for dispersing and storing the file data in the respective storage units in accordance with the decided ratios.

According to the twenty-seventh aspect, as hereinabove described, the ratios for arranging the file data are decided in proportion to the bands and the storage capacities provided in the respective storage units so that the file data are dispersed and stored in the respective storage units in accordance with the decided ratios, whereby it is possible to prevent such a situation that the ability of a storage unit having high performance (data read/write speed) cannot be sufficiently brought out due to a bottleneck of a storage unit having low performance.

The twenty-eighth aspect is an input/output band management unit for managing input/output bands of file data with respect to respective storage units in a file system inputting/outputting the file data in/from a plurality of storage units, which comprises:

a band management part for managing bands provided in the respective storage units;

a capacity management part for managing storage capacities provided in the respective storage units;

a distribution ratio decision part for deciding ratios for distributing the file data in the respective storage units in accordance with a previously defined algorithm;

a band calculation part for deciding a band in case of integrating all storage units on the basis of management information held by the band management part and the ratios of distribution decided in the distribution ratio decision part;

a capacity calculation part for deciding a storage capacity in case of integrating all storage units on the basis of management information held by the capacity management part and the ratios of distribution decided in the distribution ratio decision part;

a total band control part for controlling the input/output bands of all storage units on the basis of the value calculated in the band calculation part; and a total capacity control part for controlling the storage capacities of all storage units on the basis of the value calculated in the capacity calculation part.

According to the twenty-eighth aspect, as hereinabove described, the plurality of storage units are integrated for managing the input/output band and the storage capacity, whereby management of the input/output band is simplified in case of combining storage units having different bands and different storage capacities with each other and using the same.

The twenty-ninth aspect is characterized in that, in the twenty-eighth aspect, the distribution ratio decision part decides ratios for arranging the file data in proportion to the bands which are provided in the respective storage units.

The thirtieth aspect is characterized in that, in the twenty-eighth aspect, the distribution ratio decision part decides ratios for arranging the file data in proportion to the storage capacities which are provided in the respective storage units.

The thirty-first aspect is characterized in that, in the twenty-eighth aspect, the distribution ratio decision part decides ratios for arranging the file data in proportion to the bands and the storage capacities which are provided in the respective storage units.

According to the twenty-ninth to thirty-first aspects, as hereinabove described, the ratios for distributing the file data are decided in proportion to the bands and/or the storage capacities provided in the respective storage units, whereby the use efficiency of the overall storage units can be optimized.

The thirty-second aspect is characterized in that, in the twenty-ninth aspect, the band calculation part regards a minimum value as the band in case of integrating all storage units among values obtained by multiplying the bands which are provided in the respective storage units by inverse numbers of the distribution ratios decided in the distribution ratio decision part.

The thirty-third aspect is characterized in that, in the twenty-eighth aspect, the capacity calculation part regards a minimum value as the storage capacity in case of integrating all storage units among values which are obtained by multiplying the storage capacities provided in the respective storage units by inverse numbers of the distribution ratios decided in the distribution ratio decision part.

The thirty-fourth aspect is a file system for inputting/outputting file data in/from a plurality of storage units, which comprises:

a file attribute management part for defining as file attributes and managing band characteristics; and a band acquisition part for acquiring necessary bands in accordance with the file band characteristics managed in the file attribute management part before inputting/outputting the file data.

According to the thirty-fourth aspect, as hereinabove described, the band characteristics are newly defined as the file attributes and managed so that input/output of the file data is controlled on the basis of the managed band characteristics, whereby access control responsive to the band characteristics of the respective files can be performed.

The thirty-fifth aspect is characterized in that, the thirty-fourth aspect employs layout profile information describing distribution ratios of the file data in the respective storage units as the band characteristics of the file attributes.

The thirty-sixth aspect is a file system for inputting/outputting file data in/from a plurality of storage units, which comprises:

a file open processing part for performing file open processing;

a band acquisition part for performing acquisition of a band employed for inputting/outputting the file data; and a data input/output part for dividing the band acquired in the band acquisition part and individually allocating the same to a plurality of files which are opened by the file open processing part thereby simultaneously inputting/outputting data of a plurality of files.

The thirty-seventh aspect is a file system for inputting/outputting file data in/from a plurality of storage units, which comprises:

a file open processing part for performing file open processing;

a band acquisition part for performing acquisition of a band employed for inputting/outputting the file data; and a data input/output part for integratedly allocating a single band acquired in the band acquisition part to a plurality of files which are opened by the file open processing part, thereby alternately inputting/outputting data of a plurality of files through the same band.

According to the thirty-sixth or thirty-seventh aspect, as hereinabove described, the degree of freedom of bands used for data input/output can be improved by independently and arbitrarily combining file open and band acquisition.

The thirty-eighth aspect is a scheduling unit for scheduling service requests so that a server cyclically provides services to a plurality of clients, which comprises:

first queue for queuing service requests from the plurality of clients;

a registration part for registering cycles for generating execution rights for the plurality of clients;

an execution right generation part for generating the execution rights for executing the service requests in relation to the cycles registered in the registration part; and an execution instruction part for instructing the server to execute service requests from clients corresponding to the execution rights generated by the execution right generation part among the service requests queued in the first queue part.

As hereinabove described, the first queue part queues the service requests from the respective clients. The registration part registers the cycles for generating execution rights for the respective clients. The execution right generation part generates execution rights in relation to the cycles registered in the registration part. The execution instruction part instructs the server to execute the service requests from the clients corresponding to the execution rights generated by the execution right generation part among the service requests queued in the first queue.

Thus, the service requests from the respective clients are queued while the cycles for generating execution rights for the respective clients are registered so that execution rights are generated on the basis of the cycles. The server is instructed to execute those from the clients corresponding to the generated execution rights among the queued service requests. Thus, the time from transmission to execution of a service request from a certain client is not influenced by situations of transmission of service requests from other clients, whereby it is possible to prevent the time up to execution of the transmitted service request from being indefinite.

The thirty-ninth aspect is characterized in that, in the thirty-eighth aspect, the execution right generation part is started in a prescribed cycle for determining whether or not the execution rights are generated for every client on the basis of the cycles for generating the execution rights which are registered in the registration part and the cycle for starting the same at the time of starting while collectively generating the execution rights for the clients who determined to generate the execution rights.

According to the thirty-ninth aspect, as hereinabove described, the execution right generation part is started in the prescribed cycle and performs the operation of generating execution rights. At this time, the execution right generation part determines whether or not execution rights are generated for the respective clients on the basis of the cycles for generating execution rights and the cycle for starting the same, for collectively generating the execution rights for the clients determined to be generated. Thus, the processing operation of the execution right generation part can be reduced as compared with an operation of generating execution rights in the cycles for generating execution rights registered in the registration part.

The fortieth aspect is characterized in that, in the thirty-ninth aspect, the execution right generation part calculates a time from a current started time up to a time for generating the next execution right on the basis of the cycles for generating the execution rights which are registered in the registration part and the cycle for starting the same and determines whether or not the execution rights are generated by comparing the time obtained by the calculation with the cycle for starting the same.

Thus, it is possible to determine whether or not execution rights for the respective clients are generated.

The forty-first aspect is characterized in that, in the fortieth aspect, the execution right generation part generates an execution right for a client having a time Tofs between a current started time to a time for generating the next execution right which is less than a cycle Tslt for starting the same (Tofs<Tslt) and adds a cycle Treq for generating the execution right registered in the registration part to the Tofs of the client, for calculating a new Tofs for next starting by an expression Tofs=Tofs−Tslt with respect to the Tofs if the Tofs obtained by the addition is greater than or equal to Tslt (Tofs≧Tslt).

According to the forty-first aspect, as hereinabove described, the execution right generation part generates the execution right for the client having the Tofs which is less than the Tslt. Further, the part adds the Treq to this Tofs, for calculating the new Tofs for next starting by the expression Tofs=Tofs−Tslt with respect to the Tofs if the Tofs obtained by the addition is greater than or equal to Tslt (Tofs≧Tslt). Thus, it is possible to generate the execution right by determining the client for whom the execution right must be generated.

The forty-second aspect is characterized in that, in the forty-first aspect, the execution right generation part repeats an operation of further generating an execution right, adding the Treq to the Tofs and comparing the result with the Tslt if the Tofs obtained by the addition is less than Tslt (Tofs<Tslt), and calculates a new Tofs for next starting by an expression Tofs=Tofs−Tslt with respect to the Tofs when the Tofs obtained by the addition is greater than or equal to the Tslt (Tofs≧Tslt).

According to the forty-second aspect, as hereinabove described, the execution right generation part repeats the operation of further generating the execution right, adding the Treq to the Tofs and comparing the result with the Tslt if the Tofs obtained by the addition is less than Tslt (Tofs<Tslt). Further, the part calculates the new Tofs for next starting by the expression Tofs=Tofs−Tslt with respect to the Tofs when the Tofs obtained by the addition is greater than or equal to the Tslt (Tofs≧Tslt). Thus, it is possible to generate a necessary number of execution rights by farther determining a plurality of clients for whom the execution rights must be generated.

The forty-third aspect is characterized in that, in the forty-first aspect, the execution right generation part generates no execution right as to a client having a time Tofs between a current started time and a time for generating the next execution right which is greater than or equal to the Tslt (Tofs≧Tslt) or a service request which is not queued in the first queue, and calculates a new Tofs for next starting through an expression Tofs=Tofs−Tslt with respect to the Tofs.

According to the forty-third aspect, as hereinabove described, the execution right generation part generates no execution right as to the client having the Tofs which is greater than or equal to the Tslt (Tofs≧Tslt) or a service request which is not queued in the first queue. Further, the part calculates the new Tofs for next starting through the expression Tofs=Tofs−Tslt with respect to the Tofs. Thus, no execution right is generated for the client whose service request is not queued, so that no service is provided to the client transmitting no service request.

The forty-fourth aspect is characterized in that, in the forty-third aspect, the execution right generation part zeroes the Tofs for next starting if the new Tofs obtained by the calculation is less than zero (Tofs<0).

Thus, it is possible to prevent such a phenomenon that the Tofs of the client whose service request is not queued is reduced to a small value due to repetitive subtraction of the Tslt and a number of execution rights for this client are generated when the service request is queued.

The forty-fifth aspect is characterized in that, in the thirty-ninth aspect, the execution instruction part is started in a prescribed cycle for selecting an execution right for a client having a shorter time between a current started time to a time for generating the next execution right.

Thus, it is possible to further reduce the number of times of delay occurrence by selecting the execution right of the client having a shorter time between the current started time and the time for generating the next execution right.

The forty-sixth aspect is characterized in that, in the forty-fifth aspect, the execution right generation part calculates an evaluation index indicating precedence as a function of the cycles for generating the execution rights which are registered in the registration part and providing the same to the generated execution rights, and the execution instruction part selects an execution right to be preferentially processed among those generated by the execution right generation part.

According to the forty-sixth aspect, as hereinabove described, the execution right generation part provides the evaluation index indicating the precedence calculated as the function of the cycles for generating the execution rights, and the execution instruction part selects the execution right to be preferentially processed on the basis of the provided evaluation index. Thus, when the execution rights compete with each other, that to be preferentially processed can be selected in relation to the cycles for generating the execution rights.

The forty-seventh aspect is characterized in that, in the forty-sixth aspect, the execution right generation part calculates the evaluation index Nsft by a function Nsft=f(Treq/Tslt), where f(x) represents the minimum integer exceeding x, with respect to the cycles Treq for generating execution rights which are registered in the registration part and the cycle Tslt for starting the same, and the execution instruction part selects an execution right having a smaller evaluation index Nsft provided thereto.

Thus, when execution rights compete with each other, that having a shorter cycle for generating the execution right can be selected.

The forty-eighth aspect is characterized in that, in the forty-seventh aspect, the execution right generation part is started in a cycle which is shorter than the longest one of the cycles registered in the registration part.

Thus, execution rights for all clients are not provided with the same evaluation indices.

The forty-ninth aspect is characterized in that, in the forty-seventh aspect, the execution right generation part is started in a cycle which is further shorter than the shortest one of the cycles registered in the registration part.

Thus, more detailed evaluation indices are provided to the execution rights for the respective clients.

The fiftieth aspect is characterized in that, in the forty-sixth aspect, the execution instruction part includes a second queue for queuing the execution rights which are generated by the execution right generation part for every evaluation index, provided by the execution right generation part, in order of generation, for selecting that execution right having a smaller provided evaluation index and being precedently generated among the execution rights which are queued in the queue.

Thus, the execution instruction part can readily select that execution right to be preferentially processed among the generated execution rights, whereby the processing operation of the execution instruction part can be reduced.

The fifty-first aspect is characterized in that, in the forty-sixth aspect, the execution instruction part recognizes a maximum number of service requests, execution of which is instructed in starting, stops the instructions of execution when the execution of the service requests is instructed by a number which is equal to the maximum number, and changes the evaluation indices of remaining execution rights to those having higher precedence.

According to the fifty-first aspect, as hereinabove described, the execution instruction part stops the execution instruction when the maximum number of execution instructions are performed, while changing the evaluation indices for the remaining execution rights to those having higher precedence. Thus, it is possible to make execution instruction not performed beyond the maximum number, while it is possible to prevent the remaining execution rights from being not selected for a long time.

The fifty-second aspect is characterized in that, in the fifty-first aspect, the maximum number of the service requests, execution of which is instructed in starting, recognized by the execution instruction part is a maximum number of the service requests which are executable by the server in a time equal to the cycle for starting the same.

Thus, it is possible to make execution instruction not performed beyond the maximum number.

The fifty-third aspect is characterized in that, in the forty-seventh aspect, the execution instruction part recognizes a maximum number of service requests, execution of which is instructed in starting, stops instruction of execution when execution of the service requests is instructed by a number which is equal to the maximum number, and decrements the evaluation indices of remaining execution rights.

According to the fifty-third aspect, as hereinabove described, the execution instruction part stops the execution instruction when the maximum number of execution instruction is performed, while decrementing the evaluation indices for the remaining execution rights. Thus, it is possible to make execution instruction not performed beyond the maximum number, while the evaluation indices of the remaining execution rights are decremented every Tslt, whereby it is possible to make the execution rights selected after Treq+Tslt from generation at the latest.

The fifty-fourth aspect is characterized in that, in the fifty-third aspect, the maximum number of the service requests, execution of which is instructed in starting, recognized by the execution instruction part is a maximum number of the service requests which are executable by the server in a time equal to the cycle for starting the same.

Thus, it is possible to make execution instruction not performed beyond the maximum number.

The fifty-fifth aspect is characterized in that, the fifty-first aspect further comprises a registration instruction part for instructing the registration part to register the cycles for generating execution rights on the basis of declarations from the plurality of clients.

Thus, it is possible to make the cycles for generating execution rights registered in the registration part at need.

The fifty-sixth aspect is characterized in that, in the fifty-fifth aspect, the registration instruction part recognizes a maximum number of service requests, execution of which is instructed by the execution instruction part per unit time, for instructing the registration part to register the cycles if the same determines that an average number of the generated execution rights per unit time is not in excess of the maximum number even if further registration is made when registration of a further cycle is declared in addition to already registered cycles, while making the cycle not registered if the same determines otherwise.

According to the fifty-sixth aspect, as hereinabove described, the registration instruction part instructs the registration part to register the declared cycles only when the same determines that the average number of the generated execution rights per unit time is not in excess of the maximum number of the service requests, execution of which is instructed by the execution instruction part per unit time, even if the declared cycle is further registered in addition to the already registered cycles. Thus, it is possible to prevent the average number of the generated execution rights per unit time from exceeding the maximum number of the service requests, execution of which is instructed by the execution instruction part per unit time, in case of registering the new cycle.

The fifty-seventh aspect is a scheduling unit for scheduling service requests so that a plurality of servers cyclically provide services to a client respectively, which comprises:

a first queue for queuing service requests to the plurality of servers;

a registration part for registering cycles for generating execution rights for the plurality of servers;

an execution right generation part for generating the execution rights for executing the service requests in relation to the cycles registered in the registration part; and an execution instruction part for instructing the servers to execute the service requests to the servers corresponding to the execution rights generated by the execution right generation part among the service requests queued in the first queue.

As hereinabove described, the first queue queues the service requests to the respective servers. The registration part registers the cycles for generating execution rights for the respective servers. The execution right generation part generates execution rights in relation to the cycles registered in the execution rights. The execution instruction part instructs the servers to execute the service requests for the servers corresponding to the execution rights generated by the execution right generation part among the service requests queued in the first queue.

Thus, the service requests for the respective servers are queued while the cycles for generating execution rights for the respective servers are registered so that the execution rights are generated on the basis of the cycles. The servers are instructed to execute those of the queued service requests for the servers corresponding to the generated execution rights. Thus, the time from transmission to execution of a service request to a certain server is not influenced by situations of transmission of service requests to other servers, whereby it is possible to prevent the time up to execution of the transmitted service request from being indefinite.

The fifty-eighth aspect is characterized in that, in the fifty-seventh aspect, the execution right generation part is started in a prescribed cycle for determining at the time of starting whether or not the execution rights are generated for respective servers on the basis of the cycles for generating the execution rights which are registered in the registration part and the cycle for starting the same and collectively generating the execution rights for the servers for which the execution rights are determined to be generated.

According to the fifty-eighth aspect, as hereinabove described, the execution right generation part is started in the prescribed cycle, and performs the operation of generating execution rights. At this time, the execution right generation part determines whether or not the execution rights are generated for the respective servers on the basis of the cycles for generating execution rights and the cycle for starting the same, for collectively generating the execution rights for the servers determined to be generated. Thus, the processing operation of the execution right generation part can be reduced as compared with the case of generating execution rights in the cycles for generating the execution rights registered in the registration part.

The fifty-ninth aspect is characterized in that, in the fifty-eighth aspect, the execution right generation part calculates a time from a current started time up to a time for generating the next execution right on the basis of the cycles for generating execution rights which are registered in the registration part and the cycle for starting the same and compares the time obtained by the calculation with the cycle for starting the same, thereby determining whether or not the execution rights are generated.

Thus, it is possible to determine whether or not execution rights for the respective servers are generated.

The sixtieth aspect is characterized in that, in the fifty-eight aspect, the execution right generation part generates an execution right for a server having a time Tofs between a current started time to a time for generating the next execution right which is less than a cycle Tslt for starting the same (Tofs<Tslt) and adds a cycle Titv for generating the execution right registered in the registration part to the Tofs of the server, for calculating a new Tofs for next starting by an expression Tofs=Tofs−Tslt with respect to the Tofs if the Tofs which is obtained by the addition is greater than or equal to Tslt (Tofs≧Tslt).

According to the sixtieth aspect, as hereinabove described, the execution right generation part generates the execution right for the server having the Tofs which is less than the Tslt (Tofs<Tslt). Further, the part adds the Titv to the Tofs, for calculating the new Tofs for next starting by the expression Tofs=Tofs−Tslt with respect to the Tofs if the Tofs which is obtained by the addition is greater than or equal to Tslt (Tofs≧Tslt). Thus, it is possible to determine the server for which the execution right is to be generated, for making the execution right generated.

The sixty-first aspect is characterized in that, in the sixtieth aspect, the execution right generation part repeats an operation of further generating an execution right, adding the Titv to the Tofs and comparing the result with the Tslt if the Tofs obtained by the addition is less than Tslt (Tofs<Tslt), and calculates a new Tofs for next starting by an expression Tofs=Tofs−Tslt with respect to the Tofs when the Tofs obtained by the addition is greater than or equal to Tslt (Tofs≧Tslt).

According to the sixty-first aspect, as hereinabove described, the execution right generation part repeats the operation of further generating the execution right, adding the Titv to the Tofs and comparing the result with the Tslt if the Tofs obtained by the addition is less than Tslt (Tofs<Tslt). Further, the part calculates the new Tofs for next starting by the expression Tofs=Tofs−Tslt with respect to the Tofs when the Tofs obtained by the addition is greater than or equal to Tslt (Tofs≧Tslt). Thus, it is possible to further determine a plurality of servers for which execution rights are to be generated, for generating a necessary number of execution rights.

The sixty-second aspect is characterized in that, in the sixtieth aspect, the execution right generation part generates no execution right as to a server having a time Tofs between a current started time and a time for generating the next execution right which is greater than or equal to the Tslt (Tofs≧Tslt) or having a service request which is not queued in the first queue and calculates a new Tofs for next starting through an expression Tofs=Tofs−Tslt with respect to the Tofs.

According to the sixty-second aspect, as hereinabove described, the execution right generation part generates no execution right as to the server having the Tofs which is greater than or equal to the Tslt (Tofs≧Tslt) or the service request which is not queued in the first queue. Further, the part calculates the new Tofs for next starting through the expression Tofs =Tofs−Tslt with respect to the Tofs. Thus, no execution right is generated for the server whose service request is not queued, whereby it is possible to prevent the server receiving no service request from providing a service.

The sixty-third aspect is characterized in that, in the sixty-second aspect, the execution right generation part zeroes the Tofs for next starting if the new Tofs obtained by the calculation is less than zero (Tofs<0).

Thus, it is possible to prevent such a phenomenon that the Tofs of the server for whom no service request is queued is reduced to a small value due to repetitive subtraction of the Tslt and a number of execution rights for this server are generated when the service request is queued.

The sixty-fourth aspect is characterized in that, in the fifty-eighth aspect, the execution instruction part is started in a prescribed cycle for selecting an execution right of a server having a shorter time between a current started time to a time for generating the next execution right.

Thus, the number ofttimes of delay occurrence can be further reduced by selecting the execution right of the server having the shorter time between the current started time to the time for generating the next execution right.

The sixty-fifth aspect is characterized in that, in the sixty-fourth aspect, the execution right generation part calculates an evaluation index indicating precedence as a function of the cycles for generating execution rights which are registered in the registration part and providing the same to the generated execution rights, and the execution instruction part selects an execution right to be preferentially processed among those generated by the execution right generation part on the basis of the provided evaluation index.

According to the sixty-fifth aspect, as hereinabove described, the execution right generation part provides the evaluation index indicating the precedence calculated as the functions of the cycles for generating the execution rights, and the execution instruction part selects the execution right to be preferentially processed on the basis of the provided evaluation index. Thus, when execution rights compete with each other, that to be further preferentially processed in relation to the cycles for generating the execution rights can be selected.

The sixty-sixth aspect is characterized in that, in the sixty-fifth aspect, the execution right generation part calculates an evaluation index Nsft by a function Nsft=f(Titv/Tslt), where f(x) represents a minimum integer exceeding x, with respect to the cycles Titv for generating execution rights which are registered in the registration part and the cycle Tslt for starting the same, and the execution instruction part selects an execution right having a smaller evaluation index Nsft which is provided thereto.

Thus, when execution rights compete with each other, that execution right having a shorter cycle for generating the execution right can be selected.

The sixty-seventh aspect is characterized in that, in the sixty-sixth aspect, the execution right generation part is started in a cycle which is shorter than the longest one of the cycles registered in the registration part.

Thus, execution rights for all clients are not provided with the same evaluation indices.

The sixty-eighth aspect is characterized in that, in the sixty-sixth aspect, the execution right generation part is started in a cycle which is further shorter than the shortest one of the cycles registered in the registration part.

Thus, more detailed evaluation indices are provided to the execution rights for the respective servers.

The sixty-ninth aspect is characterized in that, in the sixty-fifth aspect, the execution instruction part includes a second queue part for queuing the execution rights which are generated by the execution right generation part for every evaluation index provided by the execution right generation part in order of generation, for selecting that execution right having a smaller provided evaluation index and being precedently generated among the execution rights which are queued in the queue.

Thus, the execution instruction part can readily select that execution right to be preferentially processed among the generated execution rights, whereby the processing operation of the execution instruction part can be reduced.

The seventieth aspect is characterized in that, in the sixty-fifth aspect, the execution instruction part recognizes a maximum number of service requests, execution of which is instructed in starting, stops instruction of execution when execution of the service requests is instructed by a number which is equal to the maximum number, and changes the evaluation indices of remaining execution rights to those of higher precedence.

According to the seventieth aspect, as hereinabove described, the execution instruction part stops execution instruction when the maximum number of execution instruction is performed, and changes the evaluation indices of the remaining execution rights to those of higher precedence. Thus, it is possible to make execution instruction not performed beyond the maximum number, while it is possible to prevent the remaining execution rights from being not selected for a long time.

The seventy-first aspect is characterized in that, in the seventieth aspect, the maximum number of the service requests, execution of which is instructed in starting, recognized by the execution instruction part is a number of the service requests corresponding to a maximum quantity of information transmittable from all servers to the client in a time which is equal to the cycle for starting the same.

Thus, it is possible to make execution instruction not performed in a number exceeding the maximum information quantity transmittable from all servers to the client.

The seventy-second aspect is characterized in that, in the sixty-sixth aspect, the execution instruction part recognizes a maximum number of the service requests, execution of which is instructed in starting, stops instruction of execution when execution of the service requests is instructed by a number which is equal to the maximum number, and decrements the evaluation indices of remaining execution rights.

According to the seventy-second aspect, as hereinabove described, the execution instruction part stops execution instruction when the maximum number of execution instruction is performed, and decrements the evaluation indices of the remaining execution rights. Thus, it is possible to make execution instruction not performed beyond the maximum number, while the evaluation indices of the remaining execution rights are decremented every Tslt, whereby it is possible to make the execution rights selected after Treq+Tslt from generation at the latest.

The seventy-third aspect is characterized in that, in the seventy-second aspect, the maximum number of the service requests, execution of which is instructed in starting, recognized by the execution instruction part is a number of the service requests corresponding to a maximum quantity of information transmittable from all servers to the client in a time which is equal to the cycle for starting the same.

Thus, it is possible to make execution instruction not performed in a number exceeding the maximum information quantity transmittable from all servers to the client.

The seventy-fourth aspect is characterized in that, the seventieth aspect further comprises a registration instruction part for instructing the registration part to register/update the cycles for generating execution rights on the basis of a declaration from the client.

Thus, it is possible to make the registration part register/update the cycles for generating execution rights at need.

The seventy-fifth aspect is characterized in that, in the seventy-fourth aspect, the registration instruction part recognizes a maximum number of service requests, execution of which is instructed by the execution instruction part to all servers per unit time, for instructing the registration part to register the cycles if the same determines that an average number of generated execution rights of all servers per unit time is not in excess of the maximum number even if further registration is made when registration of a cycle of a further server is declared in addition to already registered cycles, while making the cycle not registered if the same determines otherwise.

According to the seventy-fifth aspect, as hereinabove described, the registration instruction part instructs the registration part to register the declared cycles only when the same determines that the average number of the execution rights of all servers per unit time is not in excess of the maximum number of the service requests, execution of which is instructed by the execution instruction part to all servers per unit time, even if the declared cycle is further registered in addition to the already registered cycles. Thus, it is possible to prevent the average number of the generated execution rights of all servers per unit time when the declared cycle of the server is registered from exceeding the maximum number of the service requests, execution of which is instructed by the execution instruction part to all servers per unit time.

The seventy-sixth aspect is characterized in that, in the seventy-fourth aspect, the registration instruction part recognizes a maximum number of service requests, execution of which is instructed by the execution instruction part to each server per unit time, for instructing the registration part to register the cycles if the same determines that an average number of generated execution rights of each server per unit time is not in excess of the maximum number even if further registration is made when registration of a cycle of a further server is declared in addition to already registered cycles, while making the cycle not registered if the same determines otherwise.

According to the seventy-sixth aspect, as hereinabove described, the registration instruction part instructs the registration part to register the declared cycles only when the same determines that the average number of the execution rights of each server per unit time is not in excess of the maximum number of the service requests, execution of which is instructed to the server, even if the declared cycle of the server is further registered in addition to the already registered cycles. Thus, it is possible to prevent the average number of the generated execution rights of each server per unit time when the declared cycle of the server is registered from exceeding the maximum number of the service requests, execution of which is instructed by the execution instruction part to each server per unit time.

The seventy-seventh aspect is characterized in that, in the seventy-sixth aspect, the maximum number of the service requests, execution of which is instructed by the execution instruction part to each server per unit time, is a maximum number of the service requests executable by each server per unit time.

Thus, it is possible to prevent the average number of the generated execution rights of each server per unit time when the declared cycle of the server is registered from exceeding the maximum number of the service requests, which can be executed by this server per unit time.

The seventy-eighth aspect is characterized in that, in the seventy-fourth aspect, the registration instruction part recognizes a maximum number of service requests, execution of which is instructed by the execution instruction part to all servers per unit time, and a maximum number of the service requests, execution of which is instructed by the execution instruction part to each server per unit time, and instructs the registration part to update a cycle Titv for generating an execution right for a certain server already registered to a new Titv calculated by an expression Titv=1/(1/Titv+1/Treq) when a declaration for updating the cycle Titv to that for generating an execution right with further addition of a cycle Treq in case of determining that an average number of generated execution rights of all servers per unit time is not in excess of a maximum number of the service requests, execution of which is instructed by the execution instruction part to all servers per unit time and in case of determining that an average number of generated execution right of the server per unit time is not in excess of a maximum number of the service requests, execution of which is instructed by the execution instruction part to the server per unit time, while not updating the Titv in case of determining otherwise.

According to the seventy-eighth aspect, as hereinabove described, the registration part is instructed to update the cycle Titv for the certain server to the new Titv only in case of determining that the average number of the generated execution rights of all servers per unit time is not in excess of the maximum number of the service requests, execution of which is instructed by the execution instruction part to all servers per unit time and in case of determining that the average number of the generated execution rights of the server per unit time is not in excess of the maximum number of the service requests, execution of which is instructed by the execution instruction part to the server per unit time, when the declaration for updating the cycle Titv to that for generating the execution right with further addition of the cycle Treq is received. Thus, it is possible to make the average number of the generated execution rights of all servers per unit time not exceed the maximum number of the service requests, execution of which is instructed by the execution instruction part to all servers, when the Titv of the server is updated, while it is possible to make the average number of the generated execution rights of the server per unit time not exceed the maximum number of the service requests, execution of which is instructed by the execution instruction part to this server per unit time.

The seventy-ninth aspect is characterized in that, in the seventy-fourth aspect, the registration instruction part instructs the registration part to update an already registered cycle Titv for generating an execution right of a certain server to a new Titv which is calculated by an expression Titv=1/(1/Titv−1/Treq) when a declaration is made to update the Titv to that for generating an execution right while excluding a cycle Treq.

Thus, it is possible to update the already registered cycle to the new one when the declaration is made to update the already registered cycle for generating the execution right to that for generating the same while excluding the cycle Treq.

The eightieth aspect is a server unit connected with a plurality of terminals through wire or radio transmission paths for retrieving and reading corresponding data from those stored therein when a data read request is transmitted from any of the terminals and transmitting the read data to the terminal issuing the read request, which comprises:

a data storage part storing various data and being accessible at random in response to read requests from the terminals;

an input/output part for controlling input/output of the data between the data storage part and each terminal;

an exchange part for exchanging the data between the input/output part and the data storage part; and a resource management part for managing resources which are necessary in case of reading data required by the terminals from the data storage part and outputting the same to the terminals, and the resource management separates the resources of the overall server unit to resources (preferential resources) employed for outputting data (preferential data) for which continuity must be guaranteed to the terminals and resources (non-preferential resources) employed for outputting data (non-preferential data) for which no continuity may be guaranteed to the terminals to manage the same.

According to the eightieth aspect, as hereinabove described, the resources of the overall system are separated into the preferential resources and the non-preferential resources and managed, whereby resources used for reading the non-preferential data can be ensured independently of the preferential resources. Consequently, no influence is inserted on output of the preferential data even if the read quantity of the non-preferential data is increased.

The eighty-first aspect is characterized in that, in the eightieth aspect, each terminal is divided into a plurality of groups, the input/output part includes a plurality of I/O units provided every group of the terminal, each I/O unit includes:

a preferential input/output control part executing input/output control with respect to a command requiring reading of the preferential data transmitted from the terminal of the corresponding group; and a non-preferential input/output control part executing input/output control with respect to a command requiring reading of the non-preferential data transmitted from the terminal of the corresponding group, the data storage part includes:

a plurality of storage units; and a plurality of MSFSs connected with each storage unit for controlling reading of data from the storage unit, and the non-preferential input/output control part includes:

a command queue for temporarily storing commands requiring reading of the non-preferential data transmitted from the terminals of the corresponding group;

a command queue control part for fetching the commands from the command queue;

a command transmission part for transmitting the commands fetched by the command queue control part to corresponding destination the MSFSs;

a data buffer part for temporarily storing the non-preferential data read from the storage units by the MSFSs; and a data transmission part for transmitting the non-preferential data stored in the data buffer part to the terminals.

The eighty-second aspect is characterized in that, in the eighty-first aspect, the command queue is provided in correspondence to each of a plurality of terminals belonging to the corresponding group for storing the commands from the corresponding terminal in-order of arrival, the command queue control part executes command fetch processing of selecting a single command queue storing the commands from a plurality of command queues while fetching a command stored in its head and that transmitted to the same MSFS and outputting the same to the command transmission part, the command transmission part:

transmits the commands received from the command queue control part to the MSFSs for executing the same; and transmits a receiving completion notice to the command queue control part when the same confirms that the data buffer part receives all read data for the transmitted commands from the MSFSs; and the command queue control part repeatedly executes the command fetch processing every time the same receives the receiving completion notice from the command transmission part.

According to the eighty-second aspect, as hereinabove described, it comes to that the command queue control part does not output the next command to the command transmission part after the commands are outputted to the command transmission part and before the data buffer part receives all data corresponding to the outputted command. Thus, the I/O unit does not simultaneously communicate with a plurality of MSFSs in relation to receiving of the non-preferential data, and it is not necessary to take collision of cells of the non-preferential data into consideration. On the other hand, the MSFSs can transmit data at a high speed by using all communication bands of the non-preferential resources provided in the I/O unit.

The eighty-third aspect is characterized in that, in the eighty-second aspect, the command queue control part limits a number of the commands which are fetched from a single command queue to not more than a predetermined constant number in a single command fetch processing.

When a number of commands are substantially simultaneously transmitted to a single MSFS, congestion is caused in the MSFS receiving the commands, and hence the aforementioned eighty-second aspect is adapted to limit the number of the commands fetched from a single command queue and transmitted to the command transmission part to not more than the predetermined constant number.

The eighty-fourth aspect is characterized in that, in the eighty-second aspect, the non-preferential input/output control part further includes a buffer management part for managing a used state of the data buffer part, and the command queue control part decides the command queue selected for the command fetch processing on the basis of the used state of the data buffer part which is managed by the buffer management part.

The eighty-fifth aspect is characterized in that, in the eighty-fourth aspect, the buffer management part is provided with a plurality of used quantity counters for counting the number of untransmitted data stored in the data buffer part of every terminal, and the command queue control part refers to the used quantity counters of the buffer management part before executing the command fetch processing for selecting a command queue corresponding to a terminal having a minimum untransmitted data number as a target of the command fetch processing.

According to the eighty-fifth aspect, as hereinabove described, the command queue corresponding to the terminal having the minimum data quantity stored in the data buffer part is selected from the command queues storing the commands on the basis of the used situation of the data buffer part managed by the buffer management part so that transmission processing for the commands stored in the selected command queue is preferentially executed, whereby such a phenomenon that a single terminal occupies and uses non-preferential resources shared by a plurality terminals is reduced and the best use of the communicatability provided in the server unit for the respective terminals can be made.

The eighty-sixth aspect is characterized in that, in the eighty-second aspect, the command transmission part transmits a command which is received from the command queue control part to the MSFS after reserving an area for storing the non-preferential data read by the MSFS in the data buffer part, and stops transmission of the commands to the MSFS until the area for storing the non-preferential data can be reserved in the data buffer part if the area cannot be reserved.

According to the eighty-sixth aspect, as hereinabove described, the command transmission part reserves the area for storing the data in the data buffer part and thereafter transmits the command requiring reading of the non-preferential data to the MSFS. Namely, the command transmission part transmits no command requiring reading of the non-preferential data to the MSFS until the storage area can be reserved, if the storage region is unreservable. Thus, it is possible to prevent the data from being discarded due to no storage area in the data buffer part in receiving of data from the MSFS.

The eighty-seventh aspect is characterized in that, in the eighty-first aspect, the command queue control part decides cycles for outputting the commands to the command transmission part on the basis of a smaller one of a communication band serving as a non-preferential resource for each I/O unit for outputting data to each terminal and a communication band serving as a non-preferential resource for each I/O unit for receiving the non-preferential data read from the data storage part.

According to the eighty-seventh aspect, as hereinabove described, the command queue control part decides the cycles for outputting the commands to the command transmission part on the basis of the smaller one of the communication band serving as a non-preferential resource for each I/O unit for outputting data to each terminal and the communication band serving as a non-preferential resource for each I/O unit for receiving the non-preferential data read from the data storage part. Thus, an average band used by the data transmitted from the MSFS is equal to or less than the communication band for the exchange part for communicating with the MSFS, whereby an effect of suppressing congestion of the exchange part resulting from data transmission of the MSFS can be expected. Further, an average band used by the data transmitted from the MSFS is also equal to or less than the communication band for serving as a non-preferential resource for each I/O unit for outputting the data to each terminal, whereby increase of the quantity of the data stored in the data buffer part in the I/O unit can be suppressed.

The eighty-eighth aspect is characterized in that, in the eighty-first aspect, the command transmission part includes:

a plurality of transmission queues provided in correspondence to the respective MSFSs for storing the commands received from the command queue control part for the respective MSFSs; and a plurality of processing number counters provided in correspondence to respective ones of the transmission queues, which are incremented every transmission of the commands from the corresponding transmission queues to the MSFSs and decremented every arrival of data read from the corresponding MSFSs at the data buffer part thereby counting the number of the non-preferential data not yet arriving at the data buffer part, and the command transmission part limits the number of the commands which are transmitted from the respective transmission queues to the MSFSs so that the number of unarriving non-preferential data counted by the processing number counters are not in excess of a prescribed threshold.

According to the eighty-eighth aspect, as hereinabove described, the command transmission part transmits commands in a noted transmission queue to the MSFS only when the count value of the processing counter corresponding to the noted transmission queue is less than the predetermined threshold value, whereby it is possible to avoid such a phenomenon that read processing is concentrated to a single MSFS and the commands reside in this MSFS.

The eighty-ninth aspect is characterized in that, in the eightieth aspect, the resource management part manages a communication band of the exchange part, a band for the data storage part for reading data, and a communication band for the input/output part for outputting data to the respective terminals as the resources.

The ninetieth aspect is characterized in that, in the eightieth aspect, the exchange part is formed by an ATM switch, and a communication band serving as a non-preferential resource of the ATM switch is ensured in an ABR mode.

According to the ninetieth aspect, as hereinabove described, the communication band serving as a non-preferential resource of the ATM switch is ensured in the ABR mode so that the MSFS reading data transmits the data through the communication band ensured in the ABR mode, whereby the transmission rate from the MSFS is immediately reduced and congestion is eliminated even if congestion is caused in the ATM switch. Therefore, the I/O unit can regularly correctly receive the data.

The ninety-first aspect is characterized in that, in the eightieth aspect, the resource management part previously fixedly allocates parts of the resources of the overall server unit as the preferential resources while allocating the remaining parts as the non-preferential resources.

The ninety-second aspect is characterized in that, in the eightieth aspect, the resource management part changes a quantity which is allocated as the preferential resources among the resources of the overall server unit in response to read requests for the preferential data from the terminals.

According to the ninety-second aspect, as hereinabove described, the quantity which is allocated as the preferential resources among the resources of the overall server unit is changed in response to the read requests for the preferential data from the terminals, whereby allocation of the resources can be flexibly changed in response to increase/decrease of the read requests for the preferential data, and the best use of the finite resources can be efficiently made.

The ninety-third aspect is characterized in that, in the ninety-second aspect, the resource management part allocates all those not allocated as the preferential resources among the resources of the overall server unit as the non-preferential resources while allocating preferential resources from those allocated as the non-preferential resources in such a range that the quantity of the non-preferential resources is not below a prescribed resource quantity when it is necessary to increase the preferential resources.

According to the ninety-third aspect, as hereinabove described, all resources not allocated as the preferential resources are managed as the non-preferential resources while allocating preferential resources from the non-preferential resources in such a range that the quantity of the non-preferential resources is not below the prescribed resource quantity (minimum band width) when it is necessary to newly increase the preferential resources, whereby input/output of the preferential data is not influenced even if reading of the non-preferential data is increased and all unused resources are used as non-preferential resources, whereby reading of the non-preferential data is efficiently executed.

The ninety-fourth aspect is a file system for issuing a data acquisition request to a data storage unit in response to a data transmission request from a user and transmitting data acquired from the data storage unit in accordance with the data acquisition request to the user, which comprises:

a data acquisition part for acquiring data from the data storage unit successively from a position specified by the data transmission request continuously at a specified speed;

a buffer for storing the data acquired by the data acquisition part from the data storage unit;

a buffer management part for performing operation of the data stored in the buffer and management of a data quantity;

a data transmission part for continuously reading the data stored in the buffer in order specified by the data transmission request continuously at a specified transmission speed and transmitting the same to the user; and a pause control part for receiving a pause request and a pause release request from the user for controlling the data transmission part, the data acquisition part and the buffer management part, and the pause control part is adapted:

to control the data transmission part to immediately stop data transmission while controlling the data acquisition part to immediately stop data acquisition in case of receiving the pause request from the user; and to control the data transmission part to resume data transmission successively from a head of the data stored in the buffer after pause processing while controlling the data acquisition part to resume data acquisition successively from data next to the last data stored in the buffer after the pause processing in case of receiving the pause release request from the user.

According to the ninety-fourth aspect, as hereinabove described, the data stored in the buffer after the pause processing are transmitted to the user at first when the pause release request is received from the user, whereby the time up to resuming of data transmission after the pause release can be shortened as compared with the case of newly performing a data transmission request.

The ninety-fifth aspect is characterized in that, in the ninety-fourth aspect, the pause control part substitutes a data acquisition resume time trd for making the data acquisition part resume data acquisition, a quantity N of the data stored in the buffer after the pause processing, a data transmission speed V after pause release and a time D required by the data acquisition part for data acquisition in the following expression (a) in case of receiving the pause release request from the user, thereby calculating a data transmission resume time tsd for making the data transmission part resume data transmission:

$$tsd=trd+D-N/V \qquad (a)$$

According to the ninety-fifth aspect, as hereinabove described, the time for resuming data transmission in the pause release is calculated through the expression (a), whereby the data stored in the buffer after the pause processing is transmitted to the user at least before the head data acquired by the data acquisition part acquires after the pause release is stored in the buffer. Consequently, the time up to data transmission resuming in the pause release can be shortened as compared with the case of newly making a data transmission request. Also when the data transmission speed around the pause is changed, further, it is possible to prevent the transmission data from being interrupted due to removal of the transmission data from the buffer, whereby continuous transmission of the data can be implemented.

The ninety-sixth aspect is characterized in that, in the ninety-fourth aspect, the pause control part substitutes a data transmission resume time tsd for making the data transmission part resume data transmission, a quantity N of the data stored in the buffer after the pause processing, a data transmission speed V after pause release and a time D required by the data acquisition part for data acquisition in the following expression (b) in case of receiving the pause release request from the user, thereby calculating a data acquisition resume time trd for making the data acquisition part resume data acquisition:

$$trd=tsd+N/V-D \qquad (b)$$

According to the ninety-sixth aspect, as hereinabove described, the time for resuming data transmission in the pause release is calculated through the expression (b), whereby the data stored in the buffer after the pause processing is transmitted to the user at least before the head data acquired by the data acquisition part after the pause release is stored in the buffer. Consequently, the time up to data transmission resuming in the pause release can be shortened as compared with the case of newly making a data transmission request. Also when the data transmission speed around the pause is changed, further, it is possible to prevent the transmission data from being interrupted due to removal of the transmission data from the buffer, whereby continuous transmission of the data can be implemented.

The ninety-seventh aspect is characterized in that, in the ninety-fourth aspect, the pause control part determines whether or not a quantity of the data stored in the buffer after pause processing is greater than a limit data quantity transmittable at a data transmission speed after pause release in a time which is required by the data acquisition part for data acquisition in case of receiving the pause release request from the user, and controls the buffer management part to delete data of a part exceeding the limit data quantity if the data quantity is greater than the limit data quantity as a result of the determination, thereby deciding a head position of the data being acquired by the data acquisition part after pause release.

According to the ninety-seventh aspect, as hereinabove described, the data of the part exceeding the limit data quantity is eliminated from the buffer in the pause release, whereby the buffer may not have a buffer capacity beyond the limit data quantity.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing an exemplary MS arrival slot management table for managing states of MS arrival slots.

FIG. 6 is a diagram showing an exemplary write slot management table for managing states of write slots.

FIG. 7 is a diagram showing an exemplary stream management table.

FIG. 8 is a block diagram showing a more detailed structure of a resource management part shown in FIG. 3.

FIG. 9 is a block diagram showing the structure of a file system according to a second embodiment of the present invention.

FIG. 15 is a diagram showing a band preferential layout of deciding ratios for distributing data in proportion to the capacities of storage units.

FIG. 16 is a diagram showing a band setting layout of deciding ratios for distributing data while mixing the band preferential layout and the capacity preferential layout.

DESCRIPTION OF THE PREFERRED EMBODIMENTS (First Embodiment)

Figure 1:
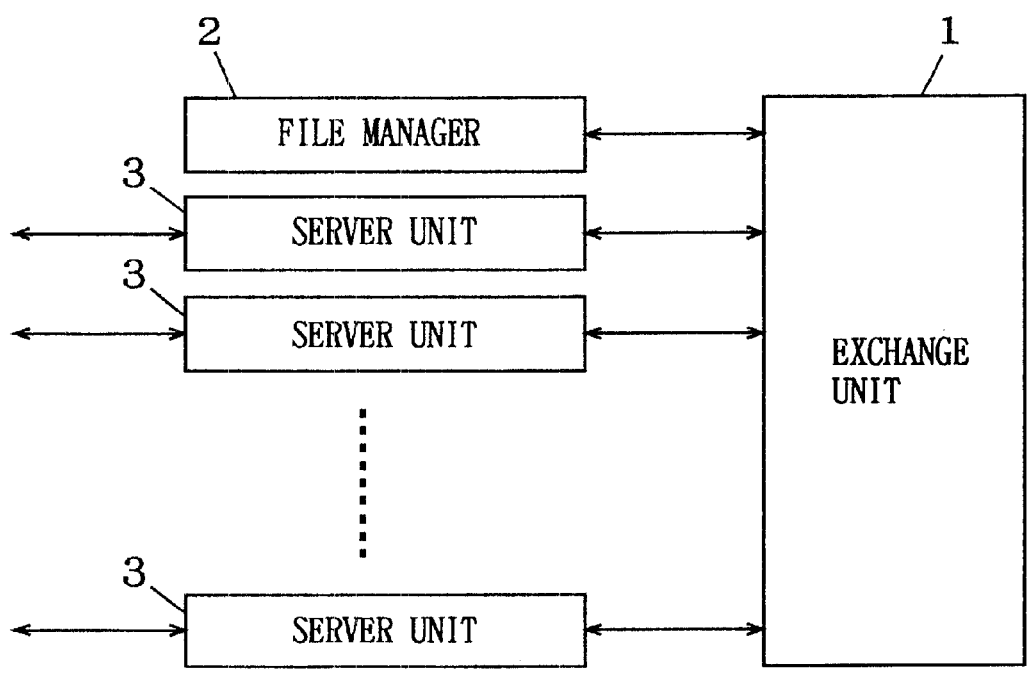
FIG. 1 is a block diagram showing the structure of a file system according to a first embodiment of the present invention.

FIG. 1 is a block diagram showing the structure of a file system according to a first embodiment of the present invention. Referring to FIG. 1, this file system comprises an exchange unit 1, a file manager 2, and a plurality of server units 3.

The file manager 2 manages the overall file system. Each server unit 3 accepts a file read or write request from a user, and transmits data or a message read from a storage unit managed by the file system to the user. Data are transferred between the server units 3 as well as between the server units 3 and the file manager 2 through the exchange unit 1. The data managed by this file system are stored in the storage units which are present in the respective server units 3.

Figure 2:
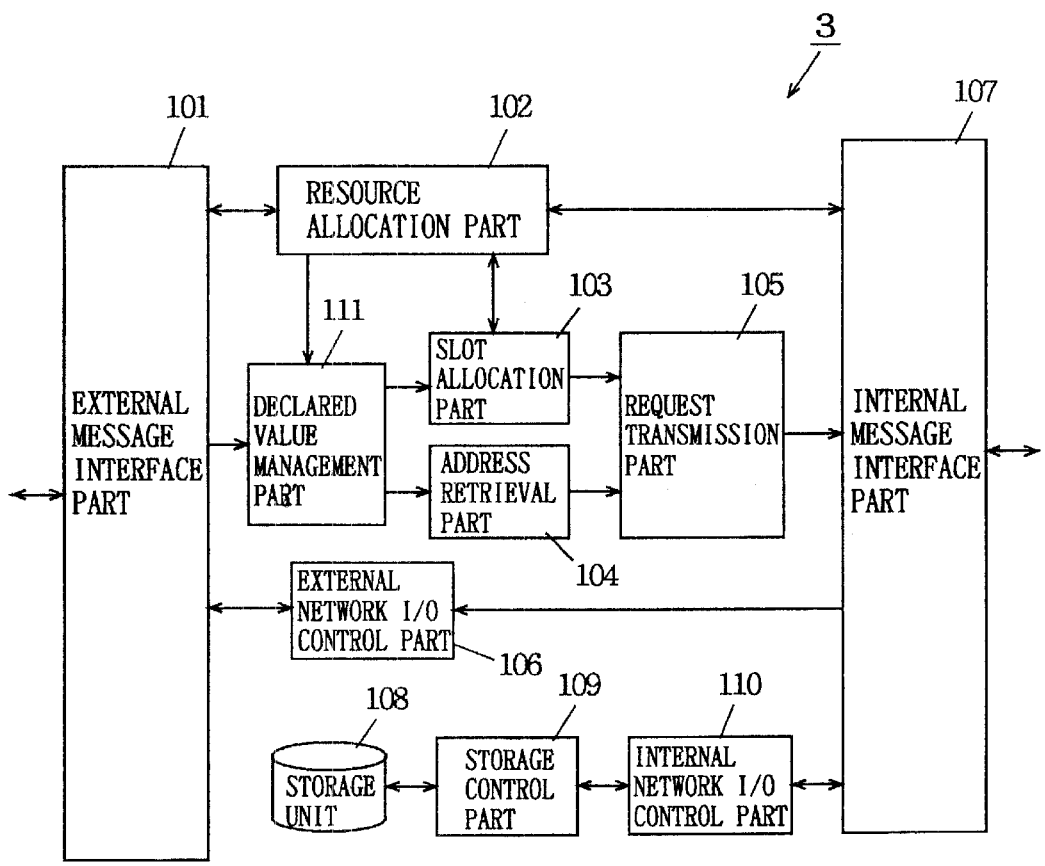
FIG. 2 is a block diagram showing the structure of a part related to file access in each server unit shown in FIG. 1.

FIG. 2 is a block diagram showing the structure of a part related to file access in each server unit 3. Referring to FIG. 2, each server unit 3 includes an external message interface part 101, a resource allocation part 102, a slot allocation part 103, an address retrieval part 104, a request transmission part 105, an external network I/O control part 106, an internal message interface part 107, a storage unit 108, a storage control part 109, an internal network I/O control part 110, and a declared value management part 111.

The external message interface part 101 identifies a message transferred between the same and the exterior, and supplies a processing instruction to each functional block in the server unit. The resource allocation part 102 allocates resources in the file system. The slot allocation part 103 allocates slots managed by the server unit 3. The slots are described later. The address retrieval part 104 retrieves a position storing required data. The request transmission part 105 instructs transmission of a block read request requiring reading of a data block of a fixed length or a block write request requiring writing. The internal message interface part 107 controls transmission/receiving of messages for the file manager 2 in the file system and other server units. The storage unit 108 stores data blocks and data storage position information of every file. The storage control part 109 controls access to the storage unit 108. The internal network I/O control part 110 controls the timing for transmitting a data block required by the block read request to the exchange unit 1. The declared value management part 111 checks whether or not parameters of messages arriving from the exterior are proper.

Figure 3:
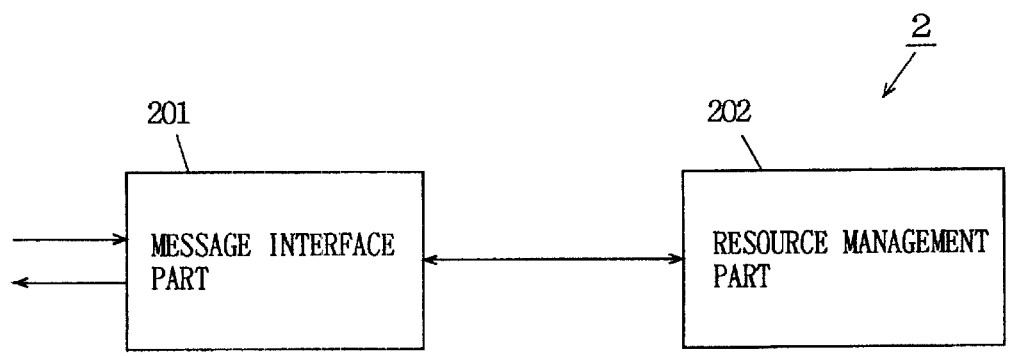
FIG. 3 is a block diagram showing the structure of a part related to file access in a file manager shown in FIG. 1.

FIG. 3 is a block diagram showing the structure of a part of the file manager 2 related to file access. Referring to FIG. 3, the file manager 2 includes a message interface part 201 and a resource management part 202. The message interface part 201 identifies messages transferred between the same and each server unit 3 through the exchange unit 1, and supplies processing instructions to the functions in the file manager 2. The resource management part 202 manages a read band of the storage unit and the capacity and the used quantity of an input/output band of the exchange unit 1 in the file system.

In relation to file access, the following messages arrive at the file system from the exterior:

(1) GetResource
(2) FileOpen
(3) ReadBlock
(4) WriteBlock

Operations of the parts of the file manager 2 and each server unit 3 related to file access in case of receiving the above messages are now described.

When the GetResource message arrives, the external message interface part 101 in the server unit 3 informs the resource allocation part 102 of this arrival. The resource allocation part 102 instructs the internal message interface part 107 to transmit a resource allocation request for the file manager 2. When the resource allocation request arrives at the file manager 2, the resource management part 202 determines whether or not the resource allocation request is acceptable, and transmits the result to the server unit 3. The resource allocation part 102 in the server unit 3 reserves a resource.

When the FileOpen message arrives, the server unit 3 acquires data storage position information in the file from the storage unit 108, and shifts to a file-accessible state.

When the ReadBlock message arrives, the slot allocation part 103 in the server unit 3 allocates the reserved resource, and reads required data.

When the WriteBlock message arrives, the slot allocation part 103 in the server unit 3 allocates the reserved resource, and writes required data.

Figure 4:
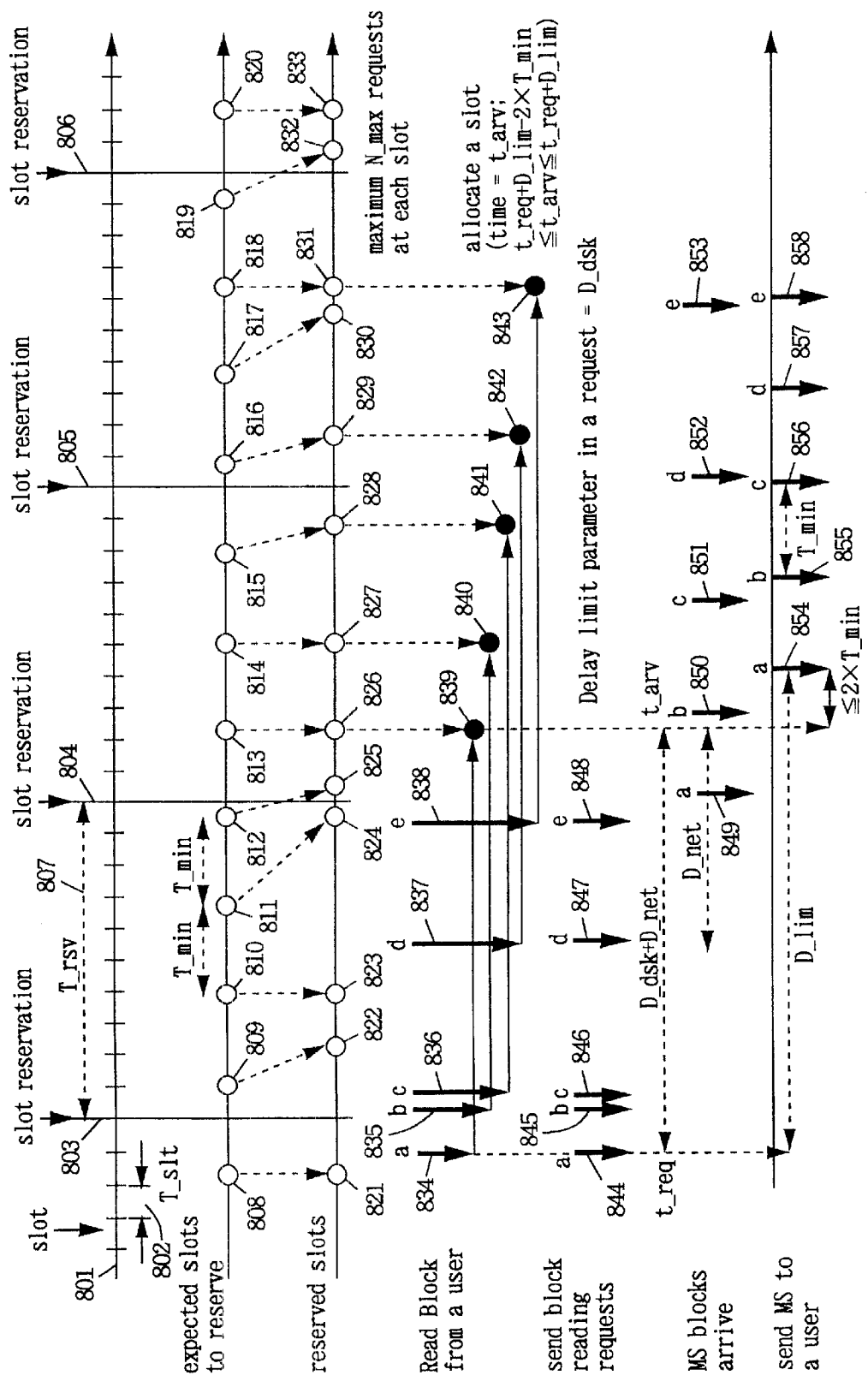
FIG. 4 is a diagram illustrating the relation between reservation and allocation of resources and data read operations in the first embodiment.

FIG. 4 illustrates the relation between reservation and allocation of resources and data read operations. With reference to FIG. 4, the operations of the file system for reserving and allocating resources and reading/writing data are now described. MS arrival slots employed for reservation and allocation of the resources and write slots are first described, followed by description of the operations of the file system.

(1) MS Arrival Slots

In this file system, a concept of "MS arrival slots" divided every several 10 msec. is employed. Referring to FIG. 4, a line 801 indicates that the time is divided into MS arrival slots to be managed. As to data reading, required data is divided into data blocks (MS blocks) of fixed lengths, so that a block read request is transmitted to the storage unit 108 or another server unit every MS block, for reading the data. When a certain server unit transmits a block read request to another server unit, an MS arrival slot is allocated. A maximum value is set for the number of block read requests which can be allocated to a single slot. According to this file system, MS arrival slots are reserved as to a user whose block read requests are accepted, in order to guarantee stream provision to the user. The MS arrival slots allocated to the block read requests are selected from the reserved MS arrival slots. The operation of reserving the MS arrival slots is performed every constant period. Parameters forming the "MS arrival slots" are as follows:

T_slt: time interval between slots

Nmaxl: number of requests allocatable to each slot

T_rsvMS: interval between operations for reserving arrival slots.

Referring to FIG. 4, numeral 802 denotes the interval T_slt. FIG. 5 shows an exemplary MS arrival slot management table for managing the states of the MS arrival slots.

As shown in FIG. 5, the MS arrival slot management table has "slot numbers" for identifying the slots, "reserved user numbers" for identifying presence/absence of slot reservation and the reserving users, "allocation request numbers" for identifying whether or not block read requests are allocated and the allocated requests, and "non-preferential flags" for identifying whether or not non-preferential block read requests may be allocated. A user having a resource allocated by a GetResource message utilizes the preserved slot. With respect to a user requiring block reading with no resource allocation, on the other hand, non-preferential flags are referred to so that an allocatable slot is allocated in case of block reading.

(2) Write Slots

As to block writing, a concept "write slots" is employed. In each server unit 3, a write slot is provided for every destination server unit. Data arriving with a WriteBlock command from the exterior is divided into data blocks (MS blocks) of fixed lengths so that its destination is decided in accordance with a space area list of the storage unit 108, and transmitted as a block write request. The write slot of the destination server unit is invariably allocated to the block write request. FIG. 6 shows an exemplary write slot management table managing states of write slots. As shown in FIG. 6, the write slot management table has "destination unit numbers" for identifying the destination server units, "slot numbers" for specifying the write slots, and "allocated request identification numbers" for identifying presence/absence of requests allocated to the slots and the allocated requests as information.

(3) Resource Management for Every User

In the server unit 3, a "stream management table" manages users whose GetResource messages are accepted with reference to reading and writing and in order of ensured bands (from large to small bands). Due to the ensured band, each user can read a single or a plurality of files. FIG. 7 shows an exemplary stream management table. This stream management table is managed by the resource allocation part 102 in each server unit 3. The "stream management table" has the items shown in FIG. 7 as information, in order to manage the situation of resource acquisition for every user. Referring to FIG. 7, "resource descriptors" are identifiers allocated at every acceptance of a GetResource message. The "stream management table" stores "read or write" for identifying whether the message is for reading or writing and an average reservation interval between slots necessary for providing the request band of every "resource descriptor". Further, the "stream management table" has items such as "ensured file system internal bands" and "currently usable file system internal bands" for storing the quantity of currently unused bands among the ensured bands as information.

(4) Resource Acquisition Acceptance Control

Resource acquisition acceptance control is adapted to determine whether or not each GetResource message from the exterior is acceptable and return the result of the determination to the exterior. This determination is made in the resource management part 202 on the basis of parameters declared by the message. Each GetResource message has the following declared parameters:

read or write a minimum read/write interval T of the block a delay request value D_lim from arrival of a ReadBlock message to block transmission FIG. 8 is a block diagram showing a more detailed structure of the resource management part 202 shown in FIG. 3. Referring to FIG. 8, the resource management part 202 includes a declared parameter processing part 401, a write band calculation part 402, an acceptance determination part 403, and a resource storage part 404. The declared parameter processing part 401 replaces parameters declared by a command with numerical values necessary for acceptance determination. The write band calculation part 402 calculates a write band. The acceptance determination 403 determines whether or not each message is acceptable. The resource storage part 404 stores current resource use situations and a maximum value of providable resources.

The declared parameter processing part 401 first obtains a value T_max satisfying the following expression (1) on the basis of the delay request value D_lim:

$$D\_lim = D\_net + D\_dsk\_min + 2 \times T\_max \qquad (1)$$

In the above expression (1), D_net represents an allowable delay value in the exchange unit 1, and D_dsk_min represents the minimum value of limit delay values in the storage unit 108. In case of comparing T_max with T, the smaller one is assumed to be T_min.

The declared parameter processing part 401 calculates the necessary band width from the value T_min. In case of reading, the declared parameter processing part 401 informs the acceptance determination part 403 of the calculated band width. In case of writing, on the other hand, the declared parameter processing part 401 employs the declared value as the band of an inlet/outlet in/from the exchange unit 1 from/in the server unit 3, and obtains a numerical value (calculated by the write band calculation part 402) by multiplying the declared value by a constant value decided for every storage unit as a peak provision speed. The acceptance determination part 403 determines whether or not the total sum of acquired resources is not more than a constant level in case of accepting GetResource messages on inlet and outlet sides from and in the exchange unit 1 in and from the server unit 3 and the storage unit 108. If the messages are acceptable, the acceptance determination part 403 stores this information in the resource storage part 404, and adds the information to the stream management table managed by the resource allocation part 102. At this time, the information is added to a position not disturbing the description order (the order from smaller T_min to larger one) of the stream management table.

(5) Assurance of Read Resource

MS arrival slots are reserved to be used for users whose GetResource messages are accepted with acquisition of read resources. The MS arrival slots are reserved every constant time. The MS arrival slots between time sections T_rsv are reserved in the order (from that at a higher provision stream speed to that at a lower speed) described in the stream management table. The MS arrival slots are reserved in accordance with respective set values T_min. Referring to FIG. 4, reference numerals 803 to 806 denote timings for reservation, and reference numeral 807 denotes the time section T_rsv. A method of deciding the reserved slots is now described.

1) Slots are selected at the time intervals T_min as to each user, and the respective ones of the selected slots are assumed to be expected slots.

2) At the timings 803 to 806, reserved expected slots are decided within the time section T_rsv at the time intervals T_min.

3) If the expected slots are reservable, the slots are reserved.

4) If the expected slots are unreservable, slots next to the expected slots are referred to. If the referred slots are reservable, these slots are reserved. If these slots are unreservable, on the other hand, next slots are referred to. This operation is repeated.

5) If the process is out of the reservation section, slots in the next time section T__rsv are reserved in accordance with the above rule.

Referring to FIG. 4, reference numerals 808 to 820 denote expected slots for reservation. Reference numerals 821 to 833 denote actually reserved slots. When a GetResource command is newly accepted, slot reservation in an already reserved section is immediately performed in accordance with the set value T__min. It is assumed that the method of slot reservation is identical to the aforementioned one. As to MS arrival slots not reserved at a time when reserving operations have been made as to all users, the non-preferential flags shown in FIG. 5 are brought into ON states.

The MS arrival slots may be reserved in the order from the MS arrival slot whose next expected slot arrives with earlier timing. In this case, the information relating to the users who accept GetResource messages is described in the stream management table in the order from the information in which next expected slot arrives with earlier timing. The order of the description in the stream management table is updated when the MS arrival slots are reserved.

(6) Block Read Operation

When a ReadBlock message arrives from the exterior, the declared value management part 111 is informed of this through the message interface part 101. The ReadBlock message has the following declared parameters:

resource descriptor
block read interval
delay request value D__lim from arrival of ReadBlock message to block transmission
file identifier
position information in the file The declared value management part 111 checks whether or not a block acquisition request interval by the ReadBlock command from the user corresponds to a declaration by the GetResource message. A request arrival time of the block is set by adding a delay request value provided to the command to the arrival time of the ReadBlock command. The declared value management part 111 checks whether or not the interval of the block request arrival time corresponds to the declared value. In case of violation, a violation notice is issued. Further, the declared value management part 111 confirms that the delay request value is not too small. Assuming that D__net represents an allowable delay value in the exchange unit 1 and D__dsk__min represents a minimum limit delay value at the storage unit 108, the declared value management part 111 makes a violation notice to the user if the following expression (2) holds:

$$D\_lim < D\_net + D\_dsk\_min + 2 \times T\_min \quad (2)$$

If the declaration by the GetResource message is satisfied, on the other hand, the slot allocation part 103, the address retrieval part 104 and the external network I/O control part 106 are informed of the arrival of the ReadBlock message. The slot allocation part 103 decides a block read request transmission interval so that data blocks can be continuously provided in a required band. Due to the block read request transmission, an interval (MS arrival interval) for acquiring MS blocks is averaged. When a block read request transmission time is reached, allocation of MS arrival slots and limit delay value calculation are performed on the basis of delay request values of respective commands.

In case of destination to the same server unit, no slot allocation is performed. A delay limit value D__dsk provided to the block read request is defined as follows:

$$D\_dsk = D\_lim \quad (3)$$

In case of destination to another server unit, on the other hand, the allocated slot is selected in the following method: It is assumed that T__req represents the time for transmitting the block read request. The slot reserved for this user is allocated in a time T satisfying the following expression (4). If a plurality of slots are reserved, the earliest time is selected.

$$T\_req + D\_lim - 2 \times T\_min < t \leq T\_req + D\_lim \quad (4)$$

Assuming that t-arv represents the time of the allocated slot and D__net represents the allowed delay value in the exchange unit 1, the delay limit value D__dsk provided to the block read request is obtained as follows:

$$D\_dsk = t\_arv - T\_req - D\_net \quad (5)$$

The slot allocation part 103 instructs the request transmission part 105 to transmit a block read request having the limit delay time as a parameter. The slot allocation part 103 brings arrival slots which have been reserved but not allocated into ON states. Referring to FIG. 4, arrows 834 to 838 indicate arrival of ReadBlock messages. Reference numerals 839 to 843 denote MS arrival slots allocated to the respective ReadBlock messages. Arrows 844 to 848 indicate timings for instructing transmission of block read requests. The request transmission part 105 transmits the block read requests to destinations declared by the address retrieval part 104. The internal message interface part 107 executes transmission of the block read requests. In each destination server unit 3, the block read request arrives at the internal network control part 110 through the internal message interface part 107. The internal network control part 110 calculates the time for instructing transmission of the read MS block on the basis of the limit delay value provided as a parameter, and stores the same. The internal network control part 110 further instructs the storage control part 109 to read the MS block. The storage control part 109 reads the MS block required by the storage unit 108. The internal network I/O control part 110 allows output from the server unit 3 to the exchange unit 1 after a time indicated by the limit delay value from the arrival of the block read request as to the MS block read from the storage unit 108. The read MS block arrives at the external network I/O control part 106 through the internal message interface part 107. The external network I/O control part 106 instructs transmission to the user at a time T__req+D__lim. Referring to FIG. 4, reference numerals 849 to 853 denote timings when MS blocks arrive at the external network I/O control parts 106, and reference numerals 854 to 858 indicates timings for transmitting MS blocks to the users.

As to a ReadBlock message not specified by a resource descriptor, a slot having the non-preferential flag in FIG. 5 in an ON state is allocated so that a block read request is transmitted.

(7) Block Write Operation

As to stream data arriving with a WriteBlock command from the exterior, the declared value management part 111 checks whether or not the data exceeds the band ensured by the GetResource message. In case of violation, a violation notice is issued. If the stream data arrives within the range of the band ensured by the GetResource message, the data is divided into MS blocks in the slot allocation part 103 so that the destination is decided in the address retrieval part 104, and transmitted as a block write request. A write slot of the destination server unit 3 is invariably allocated to the block write request in the slot allocation part 103. The block write request is transmitted at an allocated time.

(Second Embodiment)

FIG. 9 is a block diagram showing the structure of a file system according to a second embodiment of the present invention. Referring to FIG. 9, this file system comprises a file manager 901, a plurality of I/O units 902, a plurality of block storage units 905, and an exchange unit 908.

The file manager 901 manages the overall file system. Namely, this file manager 901 has functions similar to those of the file manager 2 shown in FIG. 1. Each I/O unit 902 accepts a request for file reading or writing from each user, and transmits data or a message read from a storage unit managed by the file system to the user. Each block storage unit 905 holds a storage unit storing data managed by the file system, and controls data reading or writing from the storage unit. The exchange unit 908 is connected with the file manager 901, the respective I/O units 902 and the respective block storage units 905, for controlling transfer of data and messages.

Figure 10:
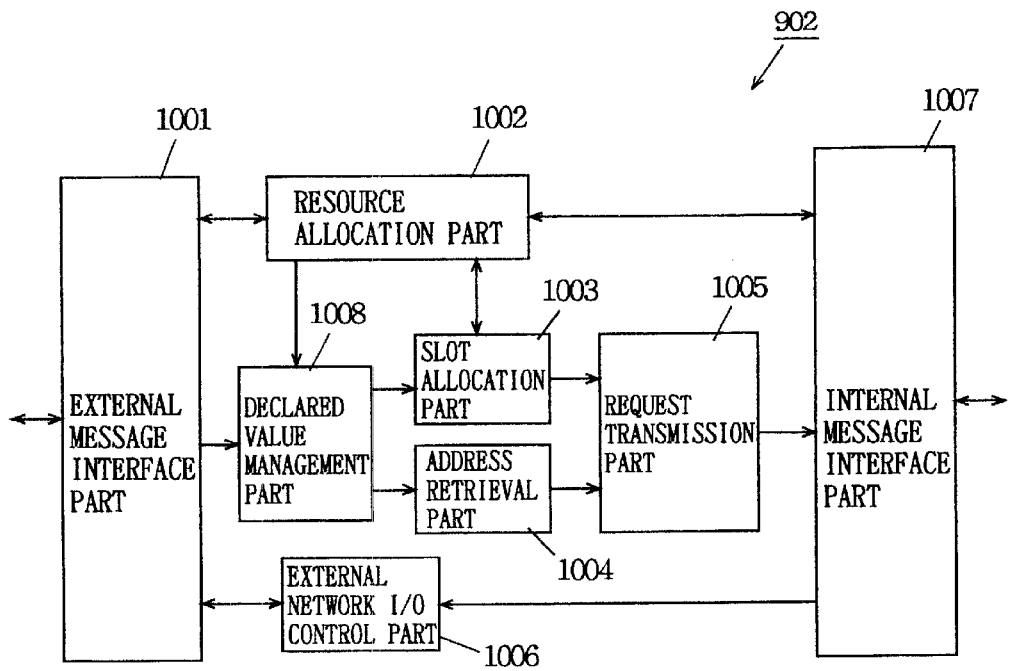
FIG. 10 is a block diagram showing the structure of a file access part in each I/O unit shown in FIG. 9.
Figure 11:
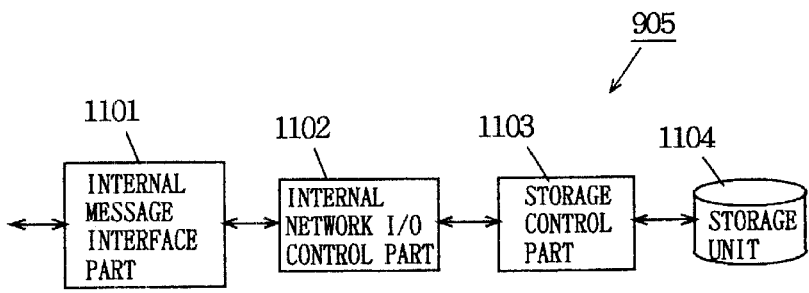
FIG. 11 is a block diagram showing the structure of a file access part in each block storage unit shown in FIG. 9.

The data managed by this file system are stored in the storage units provided in the block storage units 905. FIG. 10 shows the structure of a file access part in each I/O unit 902. Functions of the respective blocks shown in FIG. 10 are similar to those of the blocks of the same names in FIG. 2. FIG. 11 shows the structure of a file access part in each block storage unit 905. Functions of the respective blocks shown in FIG. 11 are also similar to those of the blocks of the same names in FIG. 2. Namely, each I/O unit 902 and each block storage unit 905 cooperate with each other, to serve a function similar to that of each server unit 3 shown in FIG. 1.

(Third Embodiment)

Figure 12:
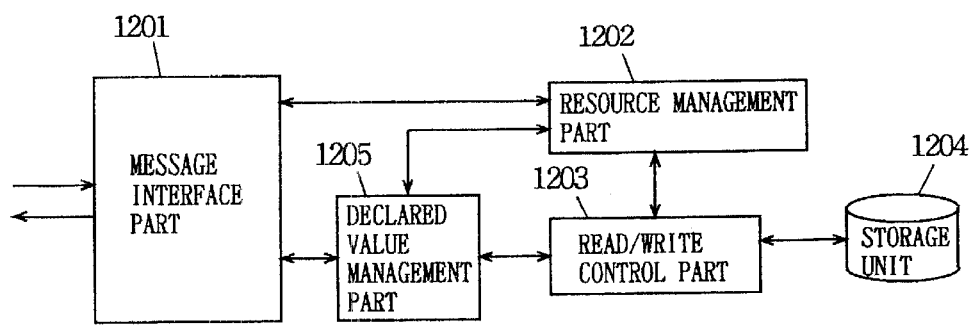
FIG. 12 is a block diagram showing the structure of a file system according to a third embodiment of the present invention.

FIG. 12 is a block diagram showing the structure of a file system according to a third embodiment of the present invention. Referring to FIG. 12, this file system comprises a message interface part 1201, a resource management part 1202, a read/write control part 1203, a storage unit 1204, and a declared value management part 1205.

The message interface part 1201 controls transmission/receiving of messages to/from users. The resource management part 1202 manages used situations of resources. The read/write control part 1203 controls reading and writing from and in the storage unit 1204. The storage unit 1204 stores data. The declared value management part 1205 checks parameters of read and write messages. Similarly to the aforementioned first embodiment, resources are ensured by GetResource messages also in the file system shown in FIG. 12. The resource management part 1202 manages an accessible quantity to the storage unit 1204 and the current used quantity.

While the present invention has been described with reference to some embodiments, the present invention is not restricted to the aforementioned embodiments, as a matter of course. For example, the following matters also hold for the present invention:

(1) The names of the messages are mere examples, and the messages are not restricted to the names employed in the respective embodiments. The order of issuance thereof is not defined either.

(2) The parameters for the respective messages are mere examples of related parts, and not restrictive. When a band width ensured by a GetResource message is previously determined, for example, the value T may not be provided as a parameter but may be stored in the system.

(3) The storage unit 108 may be physically separated into a plurality of parts.

(4) While the maximum handling capacity and the used quantity are assumed to be the read data quantity per unit time as to the resource management part 202, the present invention is not restricted to this method. A method of assuming these to be a write data quantity per unit time, or a method of setting maximum values for reading and writing independently of each other is also conceivable.

According to each of the first to third embodiments, a band in the file system is ensured when each GetResource message is received, whereby delay quality can be guaranteed as to reading and writing of files. Reading or writing of a plurality of files is implemented with the ensured band, whereby the resources in the file system can be effectively utilized with no necessity for ensuring waste bands.

A band obtained by multiplying a request band by a constant value is ensured in writing, whereby the handling capacity of the file system may not be previously divided into those for writing and reading but the ratio can be readily changed in response to a request from a user, and the resources can be efficiently used.

Further, the bands are allocated by determining whether or not a larger one of a band satisfying a delay time declared by every GetResource message and a band to be ensured in accordance with a request from the GetResource message can be ensured, whereby a plurality of delay qualities can be supported.

In addition, the MS arrival slots are allocated with respect to block read requests, whereby the number of blocks inputted from the block storage unit in the exchange unit can be temporally smoothed. Consequently, blocks read from a plurality of block storage units and inputted in the exchange unit can be prevented from colliding with each other on an input side of the I/O unit and being discarded in the exchange unit. Further, fluctuation caused by traffic times of the blocks can be reduced, so that the exchange unit can be efficiently utilized.

Further, the MS arrival slots are reserved in the order from that having a large ensured band to that having a small band, whereby maximum registration numbers of the respective slots can be made constant while guaranteeing delay qualities of all bands so that the slots can be utilized by 100%. At this time, time fluctuation of the request transmission number is eliminated and the exchange unit can be most efficiently utilized.

Further, unused MS arrival slots are allocated to data read requests from users acquiring no resources, whereby the use efficiency of the file system can be further improved.

In a large-scale file system handling data requiring continuity such as a video server, for example, a plurality of storage units are generally provided so that data of a single file are dispersed and stored in the respective storage units. Under such circumstances, control of input/output bands comes into question if a plurality of storage units having different bands and different storage capacities (hereinafter simply referred to as capacities) are provided with respect to a single file system. In general, no control is made in consideration of differences between abilities (bands and capacities) of the respective storage units, and hence it is impossible to make the best use of the abilities of the respective storage units. In relation to this, description is now made on a disk management unit which can simplify control of a plurality of storage units having different capacities and different input/output bands and optimize the use efficiency of each storage unit in response to a required input/output band and a file system employing the same.

(Fourth Embodiment)

Figures 13, 14:
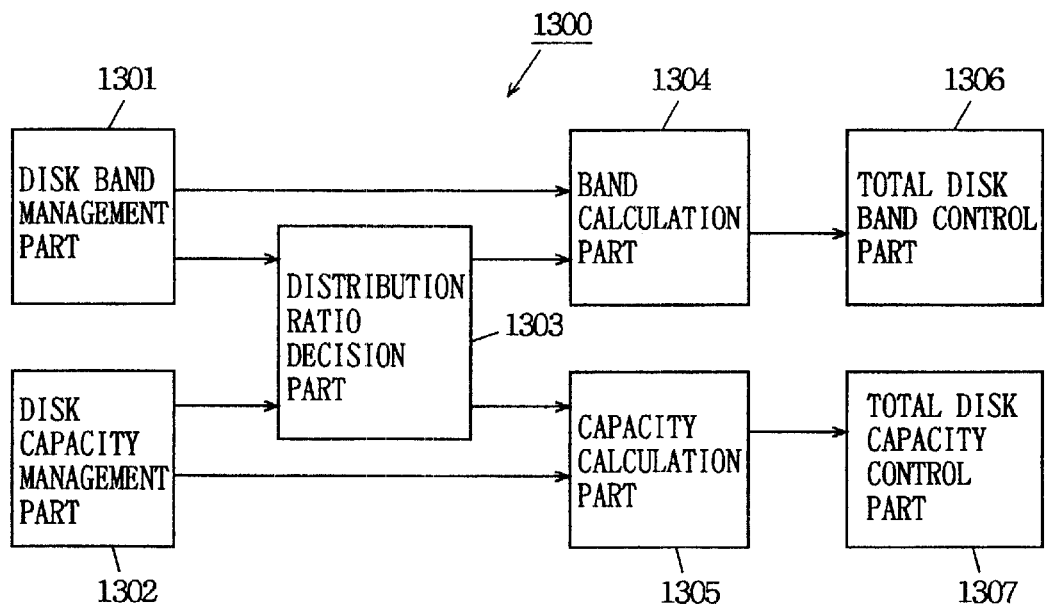
FIG. 13 is a block diagram showing the structure of a disk management unit according to a fourth embodiment of the present invention.
FIG. 14 is a diagram showing a band preferential layout of deciding ratios for distributing data in proportion to the bands of storage units.

FIG. 13 is a block diagram showing the structure of a disk management unit 1300 according to a fourth embodiment of the present invention. Referring to FIG. 13, this disk management unit 1300 comprises a disk band management part 1301, a disk capacity management part 1302, a distribution ratio decision part 1303, a band calculation part 1304, a capacity calculation part 1305, a total disk band control part 1306, and a total disk capacity control part 1307.

The disk band management part 1301 manages input/output bands of respective storage units provided in the file system. The disk capacity management part 1302 manages the capacities of the storage units provided in the file system. The distribution ratio decision part 1303 decides the ratios for distributing data to the storage units in accordance with an algorithm defined by the file system. The band calculation part 1304 calculates the minimum one among values obtained by multiplying the bands of the storage units managed in the disk band management part 130 by inverse numbers of the distribution ratios decided in the distribution ratio decision part 1303 as a band in case of integrating all storage units. The capacity calculation part 1305 calculates the minimum one among values obtained by multiplying the capacities of the storage units managed in the disk capacity management part 1302 by the inverse numbers of the distribution ratios decided in the distribution ratio decision part 1303 as a capacity in case of integrating all storage units. The total disk band control part 1306 performs band control of all storage units on the basis of the input/output band decided by the distribution ratio decision part 1303 and the band calculation part 1304. The total disk capacity control part 1307 performs capacity control of all storage units on the basis of the capacity decided by the distribution ratio decision part 1303 and the capacity calculation part 1305.

The operations of the disk management unit 1300 having the aforementioned structure are now described. First, an exemplary band setting algorithm executed in the distribution ratio decision part 1303 is described.

FIG. 14 illustrates a band preferential layout for deciding the ratios of distributing data in proportion to the bands of the storage units. When the file system is provided with three storage units having different capacities and different bands, for example, data are distributed to the respective storage units in proportion to the bands, in the distribution ratios shown in FIG. 14. Values obtained by multiplying the bands of the respective storage units by the inverse numbers of the distribution ratios are assumed to be effective bands, and those obtained by multiplying the capacities of the respective storage units by the inverse numbers of the distribution ratios are assumed to be effective capacities. In addition, the band in case of integrating all storage units is defined as the minimum value among the effective bands of the respective storage units, while the capacity in case of integrating all storage units is defined as the minimum value among the effective capacities of the respective storage units. Thus, the integrated storage units can be regarded as equivalent to a storage unit having a band of 6 Mbps and a capacity of 6 GB.

FIG. 15 illustrates a capacity preferential layout for deciding the ratios for distributing data in proportion to the capacities of the storage units. When the file system is provided with three storage units having different capacities and different bands, for example, data are distributed to the respective storage units in proportion to the capacities, in the distribution ratios shown in FIG. 15. Values obtained by multiplying the bands of the respective storage units by the inverse numbers of the distribution ratios are assumed to be effective bands, and those obtained by multiplying the capacities of the respective storage units by the inverse numbers of the distribution ratios are assumed to be effective capacities. In addition, the band in case of integrating all storage units is defined as the minimum value among the effective bands of the respective storage units, while the capacity in case of integrating all storage units is defined as the minimum value among the effective capacities of the respective storage units. Thus, the integrated storage units can be regarded as equivalent to a storage unit having a band of 4 Mbps and a capacity of 8 GB.

FIG. 16 illustrates a band setting layout for deciding the ratios for distributing data while mixing the band preferential layout and the capacity preferential layout. When the file system is provided with three storage units having different capacities and different bands, for example, data are distributed to the respective storage units at a band preferential layout ratio of $\alpha$ and a capacity preferential layout ratio of $(1-\alpha)$, in the distribution ratios shown in FIG. 16. Values obtained by multiplying the bands of the respective storage units by the inverse numbers of the distribution ratios are assumed to be effective bands, and those obtained by multiplying the capacities of the respective storage units by the inverse numbers of the distribution ratios are assumed to be effective capacities. In addition, the band in case of integrating all storage units is defined as the minimum value among the effective bands of the respective storage units, while the capacity in case of integrating all storage units is defined as the minimum value among the effective capacities of the respective storage units. If it is instructed that the effective bands of all storage units exceed 5 Mbps in this case, a must be at least 3/5. Assuming that a is set at 3/5, the integrated storage units can be regarded as equivalent to a storage unit having a band of 5 Mbps and a capacity of 20/3 GB.

The operations of the overall disk management unit 1300 shown in FIG. 13 are described. The bands of the respective storage units which are connected with the file system are previously set in the disk band management part 1301. Further, the capacities of the respective storage units which are connected to the file system are previously set in the disk capacity management part 1302. When a band required as the file system is instructed, the distribution ratio decision part 1303 makes the band calculation part 1304 and the capacity calculation part 1305 calculate the band and the capacity of the total storage units in accordance with the aforementioned band setting algorithm, on the basis of the information of the bands and the capacities of the respective storage units set in the disk band management part 1301 and the disk capacity management part 1302 respectively. When a data input/output request is generated in practice, the total disk band control part 1306 performs band control of input/output of each storage unit by the band of the total storage units calculated in the band calculation part 1304. On the other hand, the total disk capacity control part 1307 performs capacity control of the input/output of each storage unit by the capacity of the total storage units calculated in the capacity calculation part 1305.

The plurality of storage units individually handled in the aforementioned fourth embodiment may alternatively be replaced with that logically regarded as a single storage unit.

While all storage units are processed together in the aforementioned fourth embodiment, not all but partial storage units may alternatively be integrated in a limited manner.

In case of combining storage units having different input/output bands and different capacities in the aforementioned manner, the management is simplified and the use efficiency can be optimized in response to the required band by integrating the plurality of storage units for managing the bands and the capacities thereof with no attention to the individual storage units.

(Fifth Embodiment)

Figure 17:
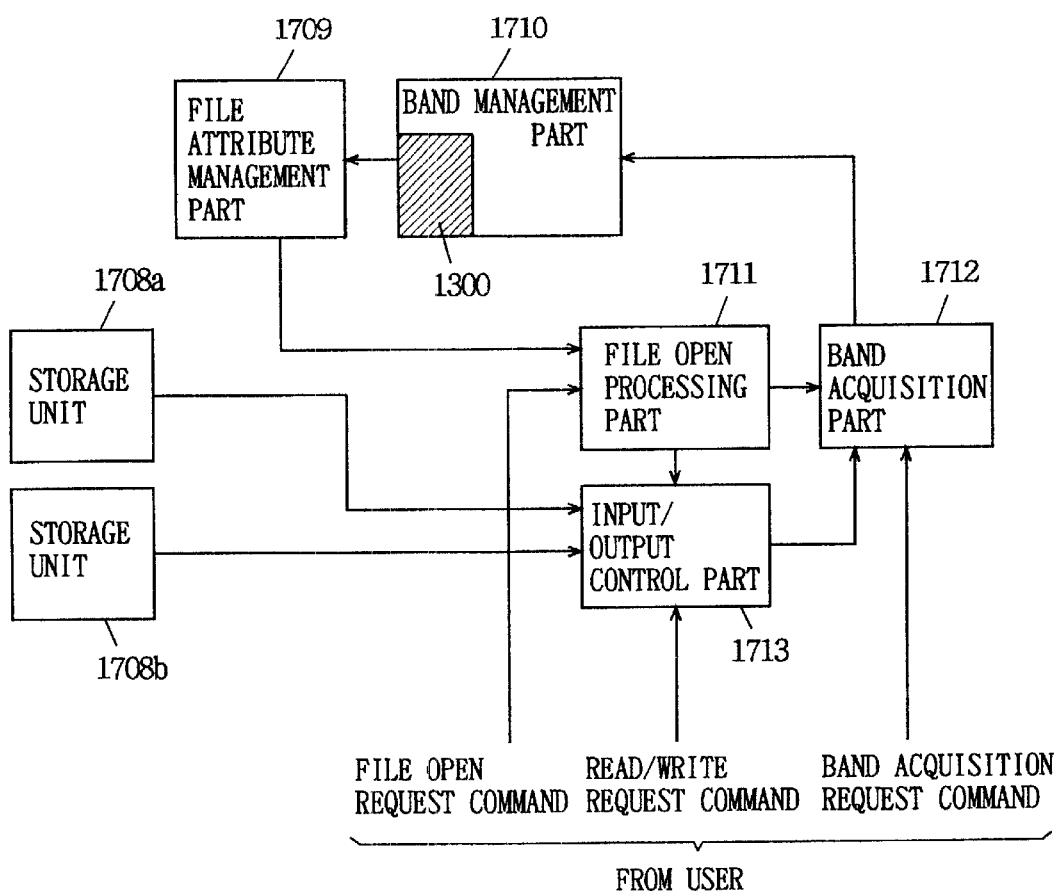
FIG. 17 is a block diagram showing the structure of a file system employing the disk management unit shown in FIG. 13.

FIG. 17 is a block diagram showing the structure of the file system employing the disk management unit shown in FIG. 13. Referring to FIG. 17, this file system comprises storage units 1708a and 1708b, a file attribute management part 1709, a band management part 1710, a file open processing part 1711, a band acquisition part 1712, and an input/output control part 1713.

The storage units 1708a and 1708b including storage media such as hard disks, CD-ROMs, MODs, DVDs or semiconductor memories store data of respective files in a dispersed manner respectively. The file attribute management part 1709 manages band characteristics as attributes of the files. The band management part 1710 includes the function of the disk management unit 1300 shown in FIG. 13 in a part thereof, and manages the input/output band of the file system. The file open processing part 1711 performs open processing of the data files. The band acquisition part 1712 acquires bands employed for data input/output. The input/output control part 1713 combines a plurality of files opened in the file open processing part 1711 with the bands acquired in the band acquisition part 1712, and selects arbitrary file data from the plurality of files for inputting/outputting the same.

While the file system requires various elements such as a function of managing file attributes other than the band characteristics, a function of transmitting/receiving input/output data and the like in practice in addition to the above, the description thereof is omitted since these elements are not directly related to the present invention.

The operations of the file system according to the fifth embodiment having the aforementioned structure are now described.

First, the disk management unit 1300 calculates distribution ratios of the file data to the respective storage units in accordance with the aforementioned band setting algorithm. The distribution ratios are described in layout profile information, and stored in the file attribute management part 1709 as the band characteristics of the file attributes.

It is assumed here that the file system is provided with a first file recording video data and a second file recording sound data. As to the band characteristic of the first file, a band necessary for input/output is 6 Mbps, and its layout profile is equally distributed to the storage units 1708a and 1708b. As to the band characteristic of the second file, on the other hand, a band necessary for input/output is 0.5 Mbps, and its layout profile is equally distributed to the storage units 1708a and 1708b.

In this case, the data of the first and second files are equally distributed to and stored in the storage units 1708a and 1708b respectively. The file attribute management part 1709 manages the band characteristics of the first and second files.

When a file open request command for the first file is received from a user, the file open processing part 1711 performs prescribed open processing, and acquires the corresponding band characteristic from the file attribute management part 1709. When a file open request command for the second file is received from the user, on the other hand, the file open processing part 1711 performs prescribed open processing, and acquires the corresponding band characteristic from the file attribute management part 1709.

When a band acquisition request command is received from the user, the band acquisition part 1712 acquires a band necessary for simultaneously reading the first and second files from the band management part 1710 in accordance with the band characteristics acquired by the file open processing part 1711.

When a read request command is received from the user, the input/output control part 1713 divides the band acquired by the band acquisition part 1712 and individually allocates the same to the first and second files opened by the file open processing part 1711, and simultaneously reads the video data of the first file and the sound data of the second file in synchronization with each other from the storage units 1708a and 1708b. Thus, stream data synchronizing pictures and sounds is produced.

While the data of the respective files are equally distributed to the storage units 1708a and 1708b in the aforementioned fifth embodiment, the data can alternatively be distributed in a biased manner, in response to the bands and the capacities of the storage units.

While the data of two files having different band characteristics are simultaneously read through the band obtained by adding up the band characteristics of the two files in the aforementioned fifth embodiment, data of a plurality of files may be alternately read through a band (maximum band) decided by the band characteristic of any one file. When data of a plurality of files are alternately read through a single band, formation of an application such as AV synchronization can be simplified.

In a video information providing system for providing video information to a plurality of clients as an exemplary file system, each client generally has a buffer for temporarily storing transmitted information. Each client transmits a service request to a server in the file system in a cycle which is set by the capacity of each buffer and bit rates of the pictures to be received, and the server transmits video information of a prescribed quantity in response to the service request. However, the server generally has an upper limit quantity of transmittable information, and hence the service requests from the respective clients must be scheduled to cause no discontinuity of pictures even if the service requests compete with each other.

Therefore, the server provided in the conventional video information providing system has a scheduling unit for scheduling service requests which must be periodically processed. A unit described in Japanese Patent Publication No. 7-104792 is known as a conventional scheduling unit. In this unit, a schedule control program is provided with a precedence processing queue of every task and every precedence, so that processing of higher precedence can be executed in advance.

When the aforementioned conventional scheduling unit is so employed that a service request from a client having higher precedence, i.e., a client having a shorter cycle for transmitting the service request, is preferentially executed, the number of times of delay occurrence can be reduced thereby reducing the frequency of occurrence of picture discontinuity.

However, the aforementioned conventional scheduling unit regularly preferentially executes the service request from the client of the higher precedence transmitted in a shorter cycle, and hence that from a lower client may not be executed for a long time.

Further, the time up to execution of the service request from the lower client varies with the number of service requests from the remaining clients. Therefore, it is impossible to prevent occurrence of picture discontinuity on the lower client side by transmitting the service request in a cycle in consideration of a delay time.

If a temporal average of the number of service requests transmitted from all clients exceeds the handling capacity of the server, the number of service requests left unprocessed is increased with time. In this case, occurrence of picture discontinuity cannot be prevented in whatever order the service requests are executed.

In a video information providing system provided with a plurality of servers for providing video information to clients through a common transmission path, on the other hand, service requests to the respective servers must be scheduled since the transmission path has an upper limit quantity of information which is transmittable at once. If the service requests are scheduled by the aforementioned conventional scheduling unit, however, problems similar to the above are caused.

In relation to this, description is now made on a scheduling unit which can schedule service requests from respective clients so that no information discontinuity is caused when a server provides continuous information such as video information to a plurality of clients in a divided manner.

Description is also made on a scheduling unit which can schedule service requests to respective servers so that no information discontinuity is caused when a plurality of servers provide continuous information to a client in a divided manner.

(Sixth Embodiment)

A sixth embodiment of the present invention is now described with reference to drawings.

Figure 18:
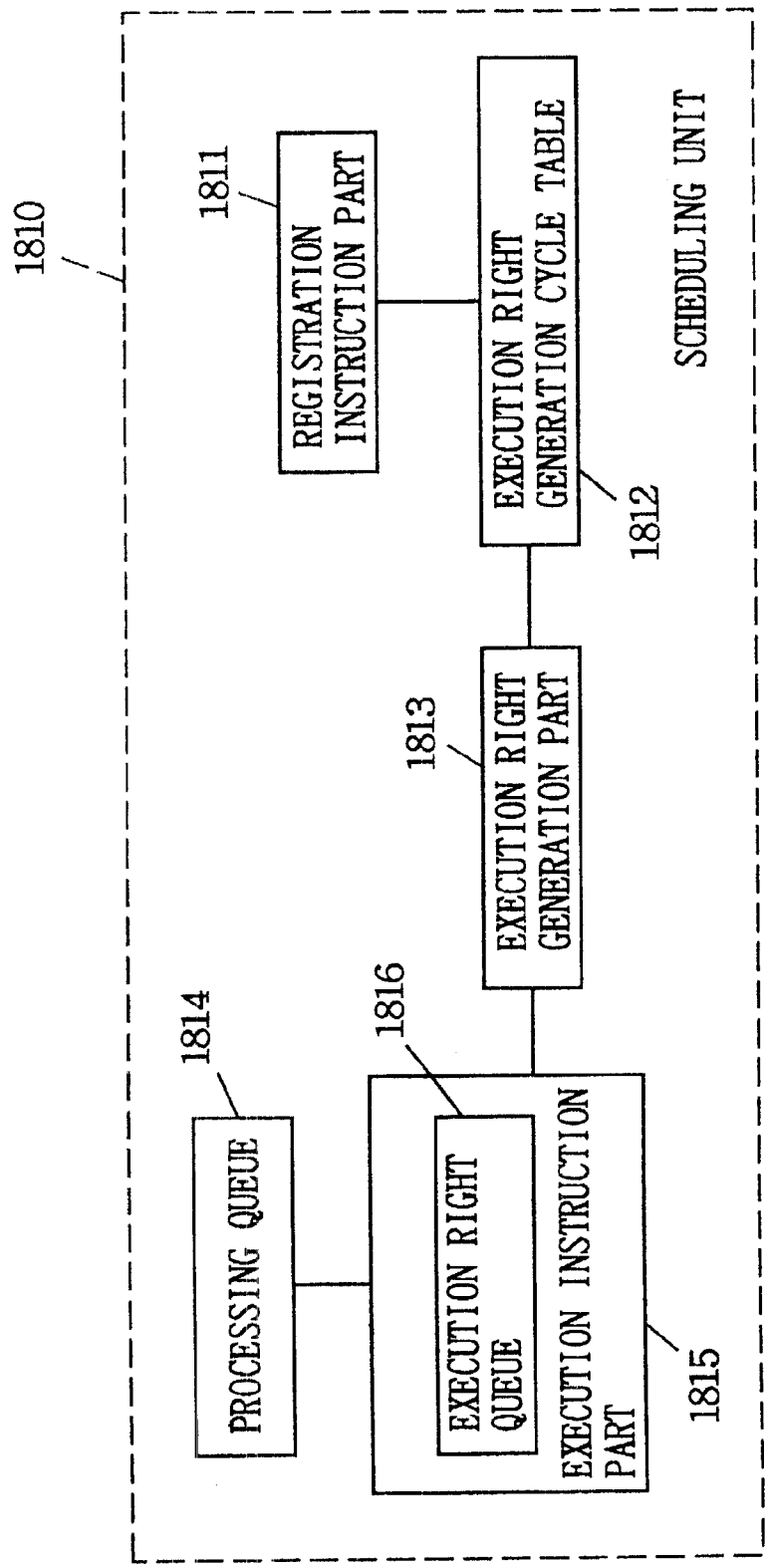
FIG. 18 is a block diagram showing the structure of a scheduling unit according to a sixth embodiment of the present invention.

FIG. 18 is a block diagram showing the structure of a scheduling unit according to the sixth embodiment of the present invention. The unit shown in FIG. 18 comprises a registration instruction part 1811, an execution right generation cycle table 1812, an execution right generation part 1813, a processing queue 1814 and an execution instruction part 1815. The execution instruction part 1815 includes an execution right queue 1816.

Figure 19:
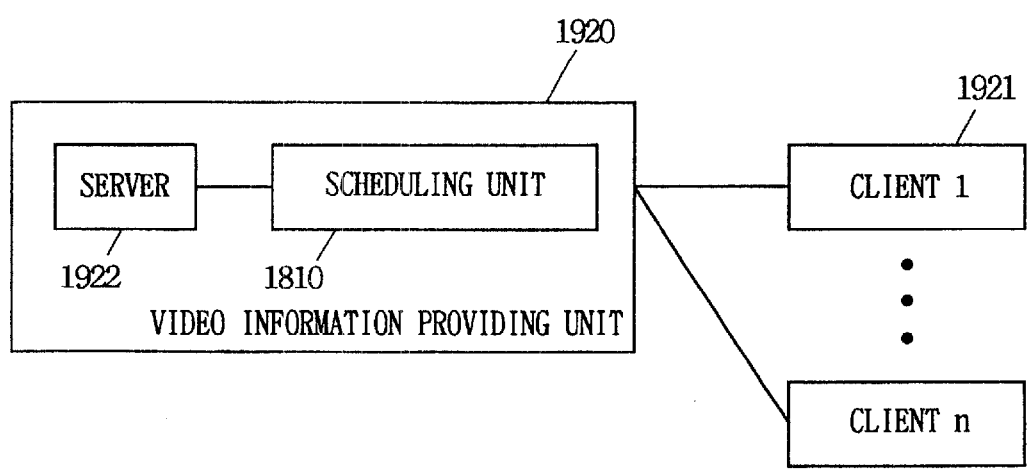
FIG. 19 is a block diagram showing the structure of a video information providing system employing the scheduling unit shown in FIG. 18.

FIG. 19 is a block diagram showing the structure of a video information providing system employing the scheduling unit shown in FIG. 18. The system shown in FIG. 19 is formed by a video information providing unit 1920 which is an exemplary file system, and a plurality of clients (1 to n) 1921. The video information providing unit 1920 includes a scheduling unit 1810 and a server 1922.

Each of the clients (1 to n) 1921 shown in FIG. 19 cyclically transmits read requests to the server 1922 of the video information providing unit 1920. The client (1 to n) 1921 has a buffer and a monitor, for temporarily storing provided video information in the buffer and displaying pictures on the monitor while reading the stored information. The scheduling unit 1810 schedules the read requests so that the server 1922 cyclically provides video information to the client (1 to n) 1921. The server 1922 transmits the video information to the client (1 to n) 1921 by a prescribed quantity in response to an instruction from the scheduling unit 1810.

The registration instruction part 1811 shown in FIG. 18 receives a declaration from the client (1 to n) 1921 shown in FIG. 19, and instructs the execution right generation cycle table 1812 to register a cycle for generating an execution right for every client (1 to n) 1921. The execution right generation cycle table 1812 registers the cycle for generating the execution right. The execution right generation part 1813 is started in a prescribed cycle (hereinafter referred to as Tslt) to generate the execution right for every client (1 to n) 1921 on the basis of the cycle registered in the execution right generation cycle table 1812. The execution right generation part 1813 further provides an evaluation index (hereinafter referred to as Nsft) indicating precedence to the generated execution right. The processing queue 1814 queues read requests from the clients (1 to n) 1921. The execution instruction part 1815 is started in the cycle Tslt, and instructs the server 1922 to acquire a read request from a client 1921 corresponding to the execution right generated by the execution right generation part 1813 among those queued in the execution right queue 1814 and execute this read request.

Figure 20:
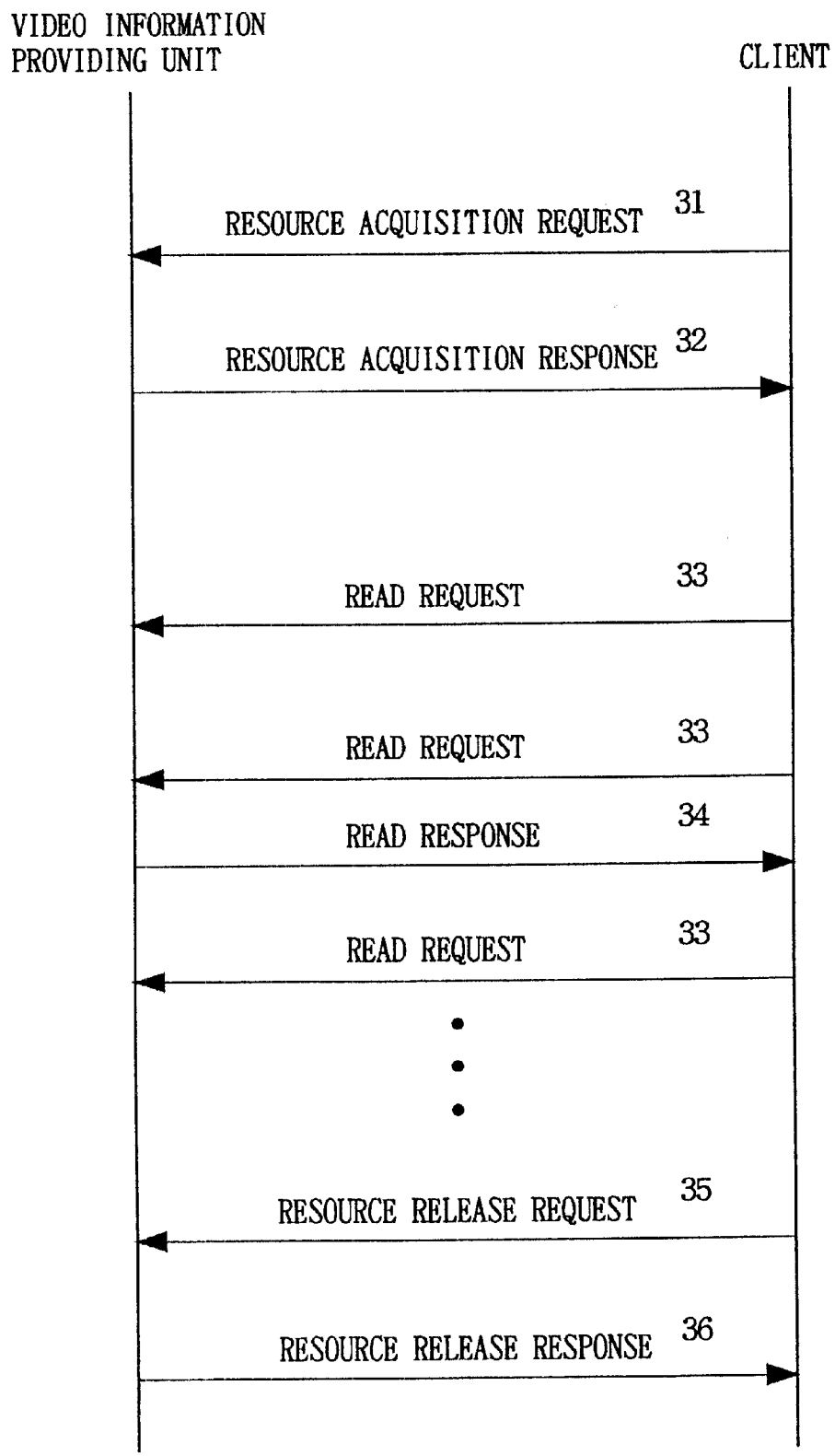
FIG. 20 is a sequence diagram showing a state of signals transmitted/received between a video information provider 1920 shown in FIG. 19 and clients (1 to n) 1921.

FIG. 20 is a sequence diagram showing a state of transmission/receiving of signals between the video information providing unit 1920 and the clients (1 to n) 1921 shown in FIG. 19. A resource acquisition request 31 shown in FIG. 20 is a signal transmitted from each client (1 to n) 1921 to the video information providing unit 1920 for informing the unit 1920 of information (hereinafter referred to as a client ID) for identifying the client 1921, the name of video information to be read and the read position. The resource acquisition request 31 further includes a cycle for transmitting a read request, i. e., a cycle (hereinafter referred to as Treq) for generating the execution right, desired by the client (1 to n) 1921. A resource acquisition response 32 is a signal transmitted from the video information providing unit 1920 to the client (1 to n) 1920 for informing the client of whether or not the video information can be provided in the desired cycle Treq.

Read requests 33 are signals transmitted from the client (1 to n) 1921 to the video information providing unit 1920 in case of requesting reading. A read response 34 is video information transmitted from the video information providing unit 1920 to the client (1 to n) 1921 in response to the read requests 33. A resource release request 35 is a signal transmitted from the client (1 to n) 1921 to the video information providing unit 1920 to inform the unit 1920 of the fact that the desired video information is completely read, and includes the client ID. A resource release response 36 is a signal transmitted from the video information providing unit 1920 to the client (1 to n) 1921 to inform the client 1921 of that provision of the video information is stopped in response to the resource release request 35.

Figures 21, 22:
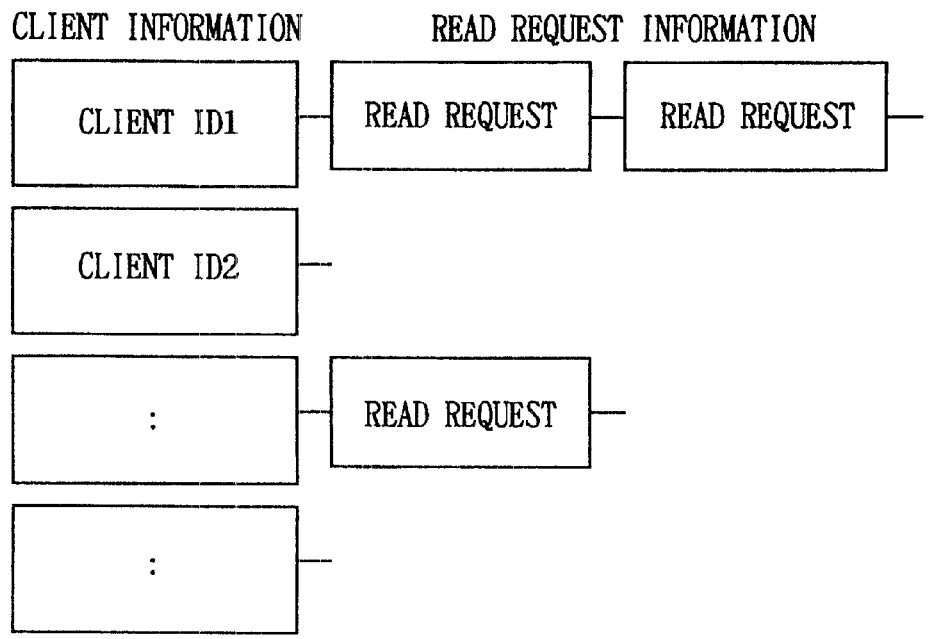
FIG. 21 is a diagram showing registered contents of an execution right generation cycle table 1812 shown in FIG. 18.
FIG. 22 is a diagram showing queuing contents of a processing queue 1814 shown in FIG. 18.

FIG. 21 illustrates registered contents of the execution right generation cycle table 1812 shown in FIG. 18. As shown in FIG. 21, the execution right generation cycle table 1812 registers the client ID, Treq and an execution right generation cycle offset (hereinafter referred to as Tofs) for every client (1 to n) 1921.

FIG. 22 illustrates queuing contents of the processing queue 1814 shown in FIG. 18. As shown in FIG. 22, the processing queue 1814 queues the read requests from the clients (1 to n) 1921 for every client (1 to n) 1921.

Figure 23:
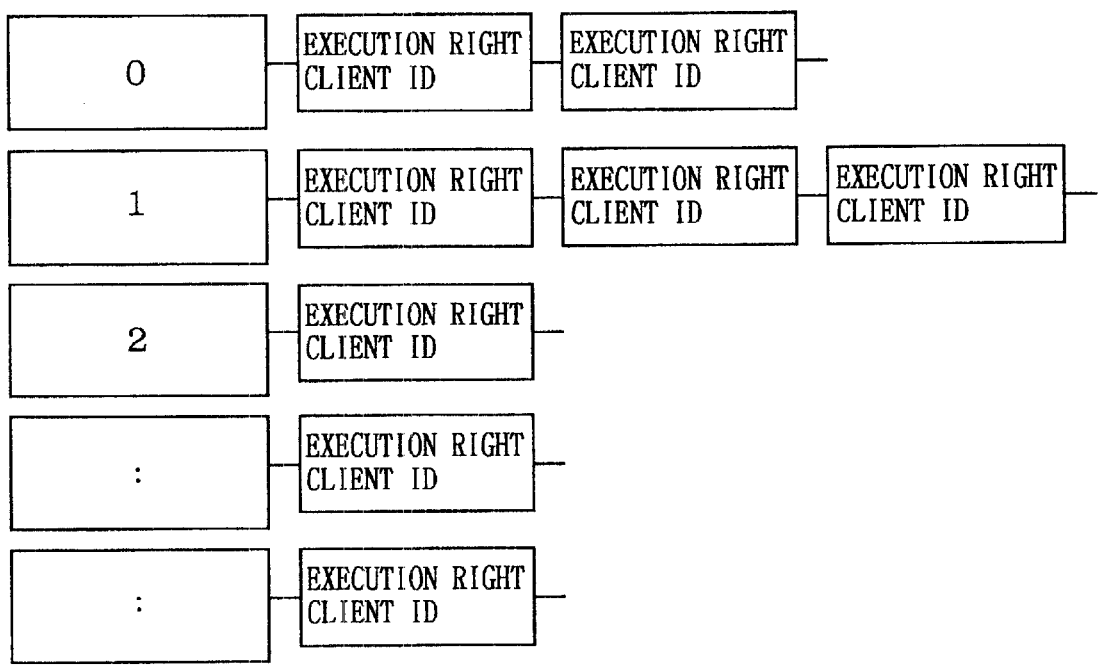
FIG. 23 is a diagram showing queuing contents of an execution right queue 1816 shown in FIG. 18.

FIG. 23 illustrates queuing contents of the execution right queue 1816 shown in FIG. 18. As shown in FIG. 23, the execution right queue 1816 queues the generated execution rights for every provided Nsft.

Figure 24:
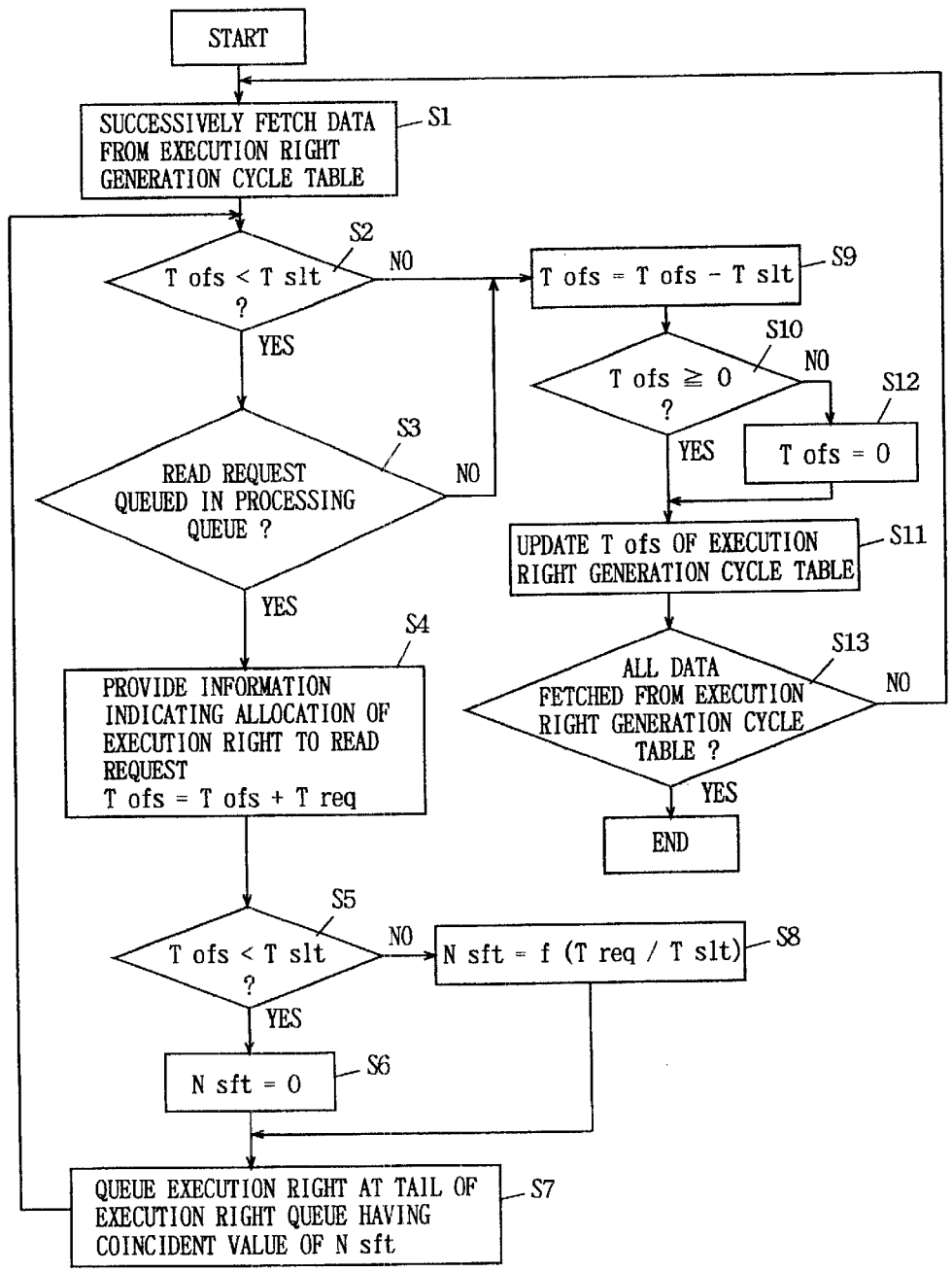
FIG. 24 is a flow chart for illustrating an operation of an execution right generation part 1813 generating an execution right.

FIG. 24 is a flow chart for illustrating the operation of the execution right generation part 1813 shown in FIG. 18 for generating the execution right.

Figure 25:
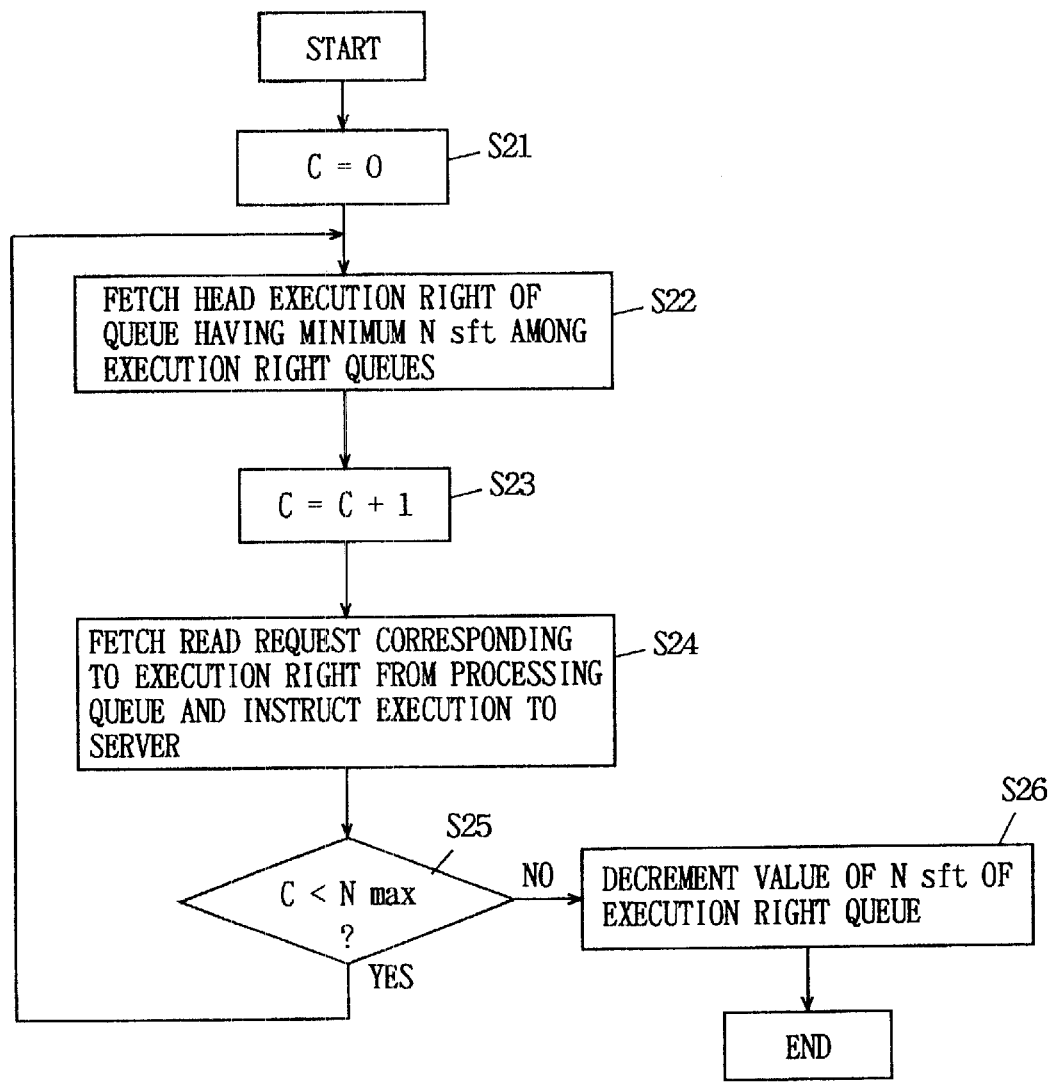
FIG. 25 is a flow chart for illustrating an operation of an execution instruction part 1815 shown in FIG. 18 instructing execution of a read request.

FIG. 25 is a flow chart for illustrating the operation of the execution instruction part 1815 shown in FIG. 18 for instructing the server 1922 of FIG. 19 to execute a read request.

Description is now made on an operation of the scheduling unit 1810 shown in FIG. 19 for scheduling read requests so that video information is cyclically provided from the server 1922 to the plurality of clients (1 to n) 1921 respectively, with reference to FIGS. 18 to 25.

First, the operation of the registration instruction part 1811 shown in FIG. 18 for instructing the execution right generation cycle table 1812 to register the client ID, Treq and Tofs is described.

It is assumed that client IDs, Treq and Tofs of the plurality of clients 1921 are already registered in the execution right generation cycle table 1812. At this time, an additional client 1921 transmits the resource acquisition request 31 shown in FIG. 20, thereby declaring the client ID and Treq thereof to the video information providing unit 1920.

The registration instruction part 1811 recognizes information providability of the server 1922, i.e., the maximum number (hereinafter referred to as Nmax) of read requests executable by the server 1922 in a time equal to the cycle Tslt, and compares an average number of generated executed rights per Tslt with Nmax if the declared Treq is registered in addition to the already registered ones, thereby determining whether or not the server 1922 can provide information temporally on the average.

If the determination is of YES, the registration instruction part 1811 instructs the execution right generation cycle table 1812 to register the declared client ID and Treq, and makes "0" registered as an initial value of Tofs. Further, the registration instruction part 1811 transmits the resource acquisition response 32, thereby informing the client 1921 transmitting the resource acquisition request 31 of the fact that the video information can be provided in the declared Treq.

If the determination is of NO, on the other hand, the registration instruction part 1811 transmits the resource acquisition response 32, thereby informing the client 1921 of the fact that information cannot be provided in the declared Treq.

An operation of the execution right generation part 1813 shown in FIG. 18 for generating an execution right on the basis of Treq and Tofs registered in the execution right generation cycle table 1812 is now described with reference to FIG. 24. It is assumed that client IDs, Treq and Tofs of a plurality of clients 1921 are registered in the execution right generation cycle table 1812 in the aforementioned manner.

The execution right generation part 1813 first fetches a set of a client ID, Treq and Tofs registered in the execution right cycle table 1812 (step S1). Then, the execution right generation part 1813 compares the fetched Tofs with the cycle Tslt of its operation (step S2).

If Tofs≧Tslt, the execution right generation part 1813 advances to a step S9.

If Tofs<Tslt, on the other hand, the execution right generation part 1813 determines whether or not a read request from the client 1921 corresponding to the read client ID is queued in the processing queue 1814 (step S3).

If the determination is of YES, the execution right generation part 1813 generates an execution right, provides information indicating that the execution right is allocated to the read request, and calculates a new Tofs by the following expression (6) (step S4):

$$Tofs=Tofs+Treq \tag{6}$$

If the determination is of NO, on the other hand, the execution right generation part 1813 advances to a step S9.

Then, the execution right generation part 1813 compares the new Tofs obtained by calculation with Tslt (step S5).

If Tofs<Tslt, the execution right generation part 1813 provides the generated execution right with Nsft=0 as an evaluation index (step S6). The execution instruction part 1815 instructs the execution right queue 1816 to queue the generated execution right in the tail of the queue having a matched value of Nsft (step S7), and then the execution right generation part 1813 returns to the step S2.

If Tofs≧Tslt, on the other hand, the execution right generation part 1813 provides the generated execution right with Nsft calculated by the following expression (7) as an evaluation index (step S8), and advances to the step S7:

$$Nsft=f(Treq/Tslt) \tag{7}$$

where f(x) represents the minimum integer exceeding x.

If Tofs≧Tslt at the step S2, the execution right generation part 1813 calculates a new Tofs by the following expression (8) (step S9):

$$Tofs=Tofs-Tslt \tag{8}$$

Then, the execution right generation part 1813 determines whether or not the new Tofs obtained by calculation is greater than or equal to zero (Tofs≧0) (step S10).

If Tofs≧0, the execution right generation part 1813 instructs the execution right generation cycle table 1812 to update Tofs to the new Tofs obtained by calculation (step S11).

If Tofs<0, on the other hand, the execution right generation part 1813 updates Tofs to zero (step S12).

Then, the execution right generation part 1813 determines whether or not all client IDs, Treq and Tofs registered in the execution right generation cycle table 1812 are fetched (step S13).

If the determination is of YES, the execution right generation part 1813 stops its operation, while returning to the step S1 if the determination is of NO.

An operation of the execution instruction part 1815 shown in FIG. 18 for instructing the server 1922 to execute the queued read request on the basis of the execution right generated in the aforementioned manner is described with reference to FIG. 25.

The execution instruction part 1815 counts the number ofttimes instructing execution to the server 1922, and stores a count value C obtained by this counting. The execution instruction part 1815 first initializes this count value C (step S21).

Then, the execution instruction part 1815 fetches the head of execution rights queued in a queue having the minimum Nsft value, i.e., that having the minimum provided Nsft and the longest elapsed time from generation, among those queued in the execution right queue 1816 (step S22), and then increments the count value C (step S23).

Then, the execution instruction part 1815 refers to the client ID given to the fetched execution right, fetches the read request from the client 1921 corresponding to the execution right from the processing queue 1814, and instructs the server 1922 to execute the same (step S24). Then, the execution instruction part 1815 compares the count value C obtained by increment with Nmax (step S25).

The execution instruction part 1815 returns to the step S22 if C<Nmax while instructing the execution right queue 1816 to decrement the values of Nsft of the remaining execution rights respectively if C≧Nmax (step S26), and thereafter completes the processing.

The server 1922 receiving the execution instruction in the aforementioned manner transmits the specified video information to the client 1921 transmitting the read request after a lapse of a certain constant time from receiving of the instruction. The client 1921 completely receiving the necessary video information transmits the resource release request 35 shown in FIG. 20, thereby informing the video information providing unit 1920 of the completion of receiving. The resource release request 35 is provided with the client ID of this client 1921, and the registration instruction part 1811 receiving the resource release request 35 deletes the provided client ID as well as Treq and Tofs corresponding to this client ID from the execution right generation cycle table 1812.

According to this embodiment, as hereinabove described, the processing queue 1814 queues read requests from the respective clients (1 to n) 1921 in case of scheduling the read requests so that the server 1922 cyclically provides video information to the plurality of clients (1 to n) 1921. The execution right generation cycle table 1812 registers the cycle Treq for generating the execution right for every client (1 to n) 1921, and the execution right generation part 1813 generates the execution right on the basis of the cycle registered in the execution right generation cycle table 1812. The execution instruction part 1815 acquires the read request from the client 1921 corresponding to the execution right generated by the execution right generation part 1813 among those queued in the processing queue 1814, and instructs the server 1922 to execute the same.

Thus, the read request from each client (1 to n) 1921 is queued while the cycle for generating the execution right for every client (1 to n) 1921 is registered, for generating the execution right on the basis of this cycle. The server 1922 is instructed to execute the request from the client 1921 corresponding to the generated execution right among the queued read requests. Thus, the time up to execution of a read request from a certain client 1921 is not influenced by situations of transmission of read requests from the remaining clients 1921, whereby indetermination of times up to execution of transmitted read requests can be prevented.

Further, the execution right generation part 1813 is started in the cycle Tslt and refers to the execution right generation cycle table 1812, to generate the execution right of the client 1921 having the time Tofs between the current started time and the time for generating the next execution right is less than Tslt. Further, Treq is added to Tofs of this client 1921 and a new Tofs is calculated by an expression Tofs=Tofs−Tslt with respect to this Tofs if the Tofs obtained by such addition is greater than or equal to Tslt (Tofs≧Tslt), so that the execution right generation cycle table 1812 is instructed to register the Tofs obtained by this calculation.

If the Tofs obtained by addition is less than Tslt (Tofs<Tslt), the execution right generation part 1813 further generates an execution right, while repeating the operation of adding Treq to Tofs and comparing the result with Tslt. When the Tofs obtained by addition becomes greater than or equal to Tslt (Tofs≧Tslt), a new Tofs is calculated with respect to this Tofs by the expression Tofs=Tofs−Tslt, so that the execution right generation cycle table 1812 is instructed to register the Tofs obtained by this calculation.

As to a client 1921 having the time Tofs from the current started time to a time for generating the next execution right is greater than or equal to Tslt or having a read request not queued in the processing queue 1814, no execution right is generated but a new Tofs is calculated with respect to the Tofs by the expression Tofs=Tofs−Tslt, so that the execution right generation cycle table 1812 is instructed to register the Tofs obtained by the calculation.

If the Tofs obtained by calculation is less than zero, the execution right generation part 1813 instructs the execution right generation cycle table 1812 to register Tofs=0.

Thus, the execution right generation part 1813 is started in the cycle Tslt to calculate Tofs, i.e., the time between the current started time and the time for generating the next execution right, on the basis of Treq and Tslt registered in the execution right generation cycle table 1812 and compares the Tofs obtained by the calculation with Tslt, thereby determining the client 1921 for whom the execution right is to be generated and generating the execution right. Further, the execution right generation part 1813 repeats the operation of adding Treq to Tofs and comparing the result with the Tslt, thereby determining a plurality of clients 1921 for whom execution rights are to be generated, and generates execution rights in the necessary number. The execution right generation part 1813 performs these operations at once in starting, whereby the processing operations of the execution right generation part 1813 can be reduced as compared with the case of generating the execution rights in the cycle Treq registered in the execution right generation cycle table 1812.

As to a client 1921 whose read request is not queued, no execution right is generated so that no video information is supplied to the client 1921 transmitting no read request.

If the new Tofs obtained by calculation is less than zero, Tofs=0 is registered so that Tofs of the client 1921 whose read request is not queued is reduced by repeated subtraction of Tslt. Thus, it is possible to prevent generation of a number of execution rights for this client 1921 at a point of time when a read request is queued.

Further, the execution right generation part 1813 provides the evaluation index Nsft calculated by the above expression (7) to the executed right generated in the aforementioned manner. The execution instruction part 1815 includes the execution right queue 1816 for queuing the execution rights generated by the execution right generation part 1813, and instructs this queue to queue the generated execution rights for every evaluation index in the order of generation. The execution instruction part 1815 selects the execution right having a smaller evaluation index Nsft and generated in advance among the queued ones, and instructs the server 1922 to execute the read request from the client 1921 corresponding to this execution right.

The execution instruction part 1815 recognizes the maximum number Nmax of the read requests executable by the server 1922 in the time equal to the cycle Tslt, stops the instruction of execution when execution is instructed by a number equal to this Nmax, and instructs the execution right queue 1816 to decrement the evaluation indices Nsft of the remaining execution rights.

Thus, the evaluation indices indicating precedence calculated as functions of the cycle for generating the execution rights are provided to the execution rights generated by the execution right generation part 1813, and the execution instruction part 1815 selects the execution right to take precedence on the basis of the provided evaluation index, and instructs execution. The execution instruction part 1815 temporarily stops instruction of execution when execution of Nmax read requests is instructed, and decrements the evaluation indices of the remaining execution rights for improving the precedence.

Thus, the execution instruction part 1815 can select the execution right for the client 1921 having a shorter time between the current started time up to the time for generating the next execution right to take precedence, whereby the number of times causing delays can be reduced. Further, it is possible to prevent the server 1922 from executing read requests in a number beyond its handling capacity, while the evaluation indices of the remaining execution rights are decremented every Tslt, whereby the execution rights can be selected at least until after Treq+Tslt from generation. Therefore, the clients (1 to n) 1921 transmit read requests in cycles taking the maximum delay time in consideration, whereby occurrence of discontinuous video information can be prevented.

When execution rights are generated in a number beyond the handling capacity of the server 1922 temporarily on the average, however, the number of remaining execution rights is increased as the time elapses. In this case, occurrence of picture discontinuity cannot be prevented by the aforementioned processing.

When a declaration for registration of Treq is received, therefore, the registration instruction part 1811 instructs the execution right generation cycle table 1812 to register the declared Treq only when a determination is made that an average number of the generated execution rights per Tslt is not in excess of Nmax even if the declared Treq is further registered in addition to the already registered ones.

Thus, it is possible to prevent occurrence of picture discontinuity due to increase of the number of the remaining execution rights with the lapse of time resulting from the total number of the execution rights exceeding the handling capacity of the server 1922 temporally on the average.

The execution right queue 1816 is provided on the execution instruction part 1815 to queue the execution rights for every evaluation index in the order of generation, whereby the execution instruction part 1815 may select the execution rights from the head of the queue having the minimum evaluation index. Thus, the processing operations of the execution instruction part 1815 can be reduced.

(Seventh Embodiment)

A seventh embodiment of the present invention is now described with reference to the drawings.

Figure 26:
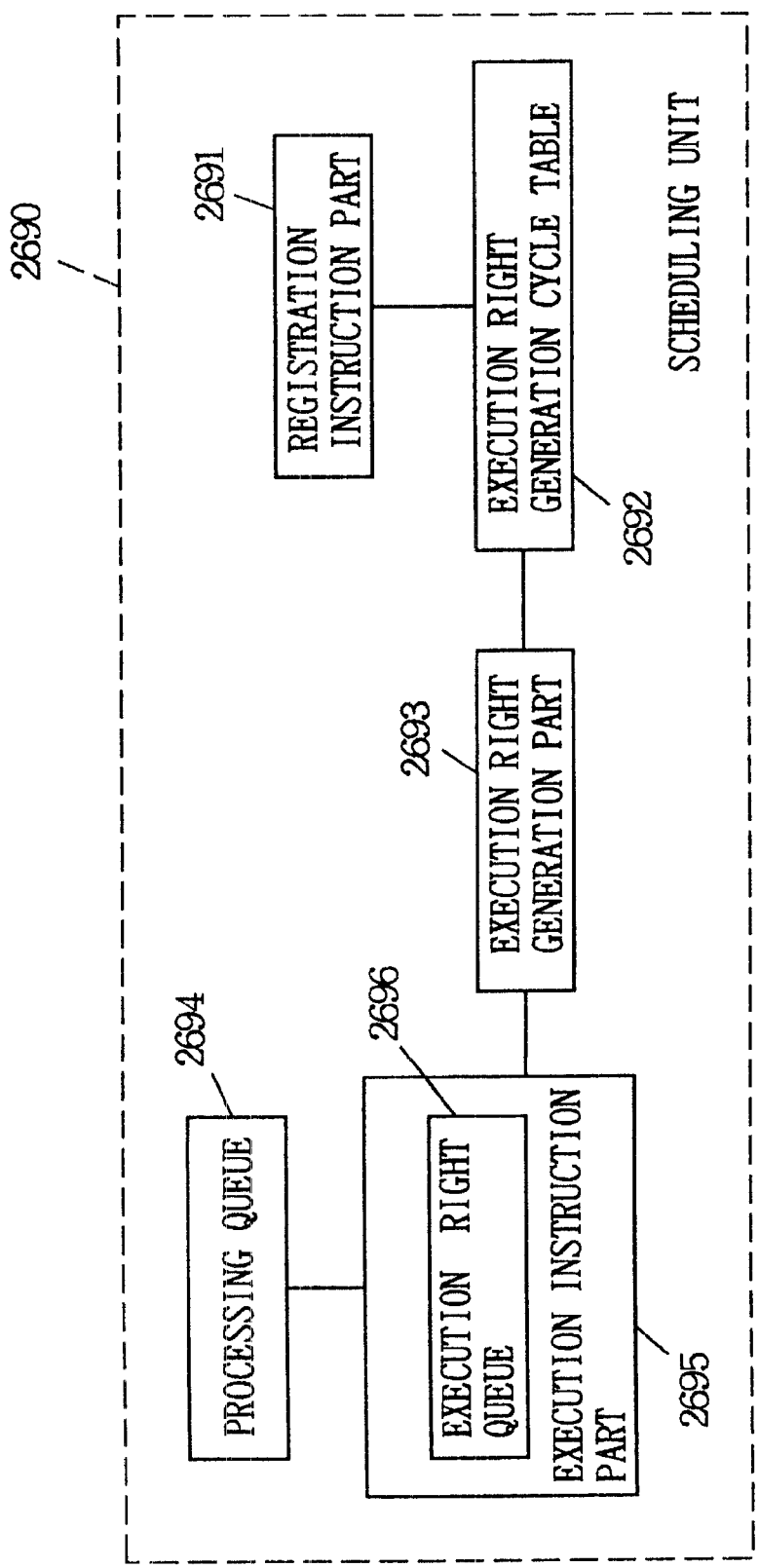
FIG. 26 is a block diagram showing the structure of a scheduling unit according to a seventh embodiment of the present invention.

FIG. 26 is a block diagram showing the structure of a scheduling unit according to the seventh embodiment of the present invention. The unit shown in FIG. 26 comprises a registration instruction part 2691, an execution right generation cycle table 2692, an execution right generation part 2693, a processing queue 2694 and an execution instruction part 2695. The execution instruction part 2695 includes an execution right queue 2696.

Figures 27, 28:
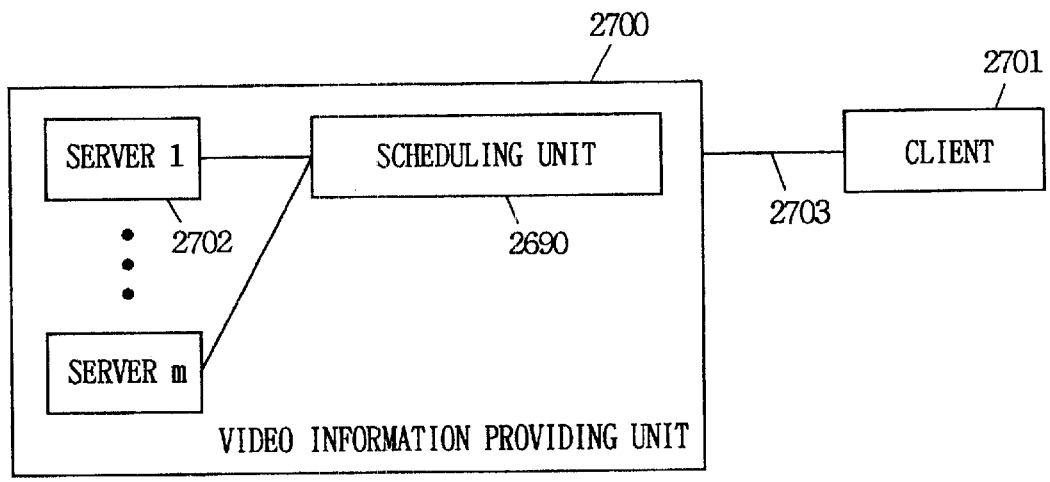
FIG. 27 is a block diagram showing the structure of a video information providing system employing the scheduling unit shown in FIG. 26.
FIG. 28 is a diagram showing registered contents of an execution right generation cycle table 2692 shown in FIG. 26.

FIG. 27 is a block diagram showing the structure of a video information providing system employing the scheduling unit shown in FIG. 26. The system shown in FIG. 27 is formed by a video information providing unit 2700 and a client 2701, which are connected with each other by a transmission path 2703. The video information providing unit 2700 includes a scheduling unit 2690 and a plurality of servers (1 to m) 2702.

The client 2701 shown in FIG. 27 cyclically transmits read requests to the plurality of servers (1 to m) 2702 of the video information providing unit 2700 respectively. The client 2701 has a plurality of buffers and a plurality of monitors, and temporarily stores provided information from the servers (1 to m) 2702 in each buffer, respectively, for displaying pictures on each monitor while reading the stored information. The scheduling unit 2690 schedules the read requests so that video information is cyclically provided from the servers (1 to m) 2702 to the client 2701. The servers (1 to m) 2702 transmit video information to the client 2701 by prescribed quantities in response to instructions from the scheduling unit 2690. It is assumed that the total information providability of the servers (1 to m) 2702 included in the video information providing unit 2700 is in excess of the transmittability of the transmission path 2703.

The registration instruction part 2691 shown in FIG. 26 receives a declaration from the client 2701 shown in FIG. 27, and instructs the execution right generation cycle table 2692 to register a cycle for generating an execution right every server (1 to m) 2702. The execution right generation cycle table 2692 registers the cycle for generating the execution right. The execution right generation part 2693 is started in a prescribed cycle (hereinafter referred to as Tslt), and generates the execution right of every server (1 to m) 2702 on the basis of the cycle registered in the execution right generation cycle table 2692. The execution right generation part 2693 also provides an evaluation index (hereinafter referred to as Nsft) indicating precedence to the generated execution right. The processing queue 2694 queues the read requests to the servers (1 to m) 2702. The execution instruction part 2695 is started in the cycle Tslt, acquires a read request to a server 2702 corresponding to the execution right generated by the execution right generation part 2693 among those queued in the processing queue 2694, and instructs the corresponding server 2702 to execute the read request.

Signals similar to those described in the sixth embodiment with reference to FIG. 20 are transmitted/received to/from the video information providing unit 2700 and the client 2701 shown in FIG. 27. A resource acquisition request 31 includes a server ID, in place of the client ID.

FIG. 28 illustrates the registered contents of the execution right generation cycle table 2692 shown in FIG. 26. As shown in FIG. 28, the execution right generation cycle table 2692 registers the server ID, Titv and an execution right generation cycle offset (hereinafter referred to as Tofs) for every server (1 to m) 2602. While the cycles Treq in the table shown in FIG. 21 are values declared by the clients (1 to n) 1921 shown in FIG. 19, values Titv shown in FIG. 28 are calculated by a prescribed method on the basis of Treq declared by the client 2701 shown in FIG. 27.

Figure 29:
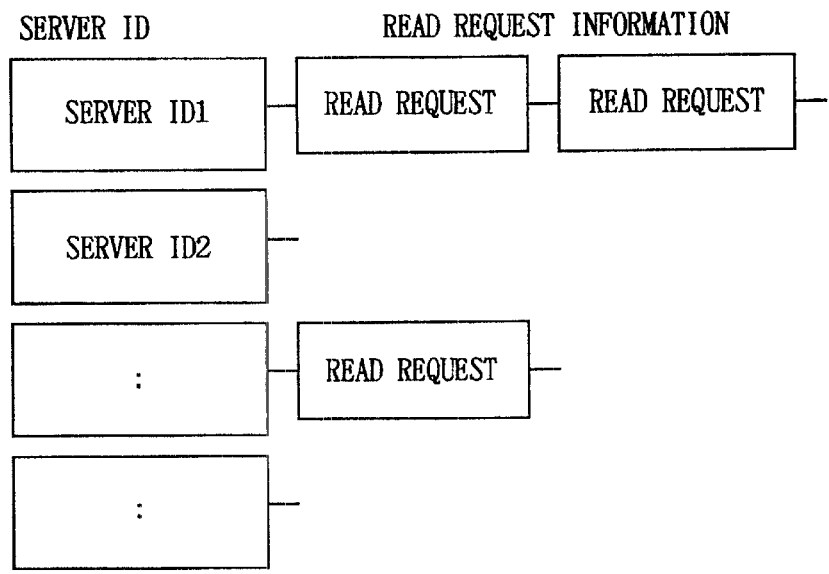
FIG. 29 is a diagram showing queuing contents of a processing queue 2694 shown in FIG. 26.

FIG. 29 illustrates queuing contents of the processing queue 2694 shown in FIG. 26. As shown in FIG. 29, the processing queue 2694 queues the read requests to the servers (1 to m) 2702 for every server (1 to m) 2702.

Figure 30:
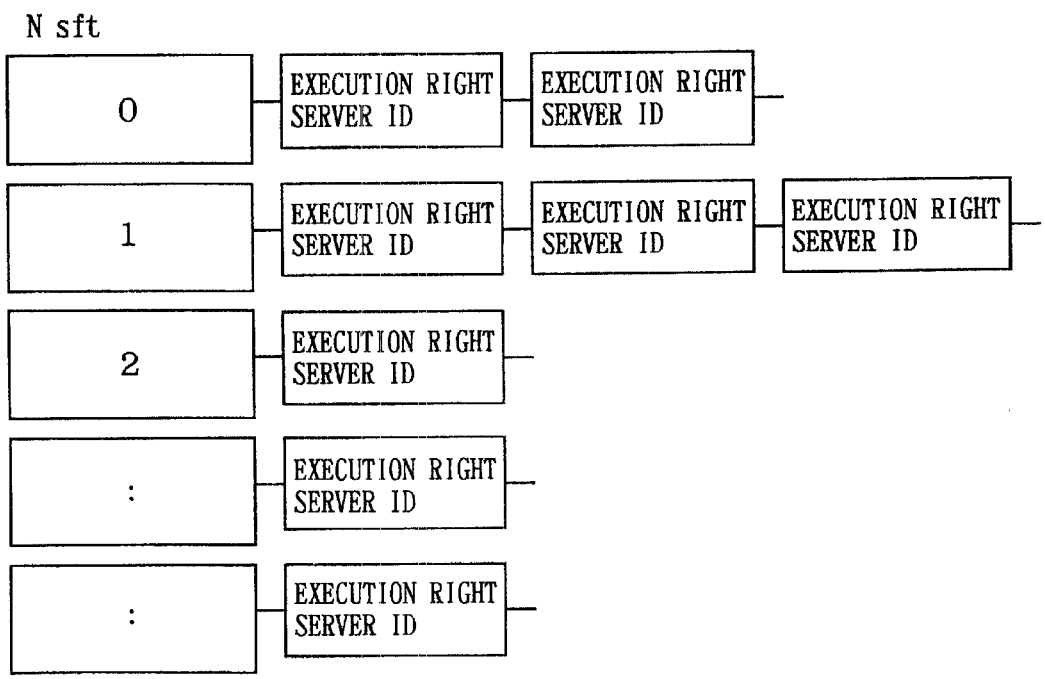
FIG. 30 is a diagram showing queuing contents of an execution right queue 2696 shown in FIG. 26.

FIG. 30 illustrates the queuing contents of the execution right queue 2696 shown in FIG. 26. As shown in FIG. 30, the execution right queue 2696 queues the generated execution rights every provided Nsft.

Description is now made on an operation of the scheduling unit 2690 shown in FIG. 27 for scheduling the read requests so that video information is cyclically provided from the plurality of servers (1 to m) 2702 to the client 2701 through the transmission path 27043 respectively, with reference to FIGS. 20 and 24 to 30.

First, an operation of the registration instruction part 2691 shown in FIG. 26 for instructing the execution right generation cycle table 2692 to register the server ID, Titv and Tofs.

It is assumed here that the execution right generation cycle table 2692 already registers the server IDs, Titv and Tofs of the plurality of servers 2602. At this time, the client 2701 transmits the resource acquisition request 31 shown in FIG. 20, to declare the server ID and Treq of a desired server 2702 to the video information providing unit 2700.

The registration instruction part 2691 recognizes the information providability of the servers (1 to m) 2702 and the transmittability of the transmission path 2703, and makes determinations as to the following items (a) and (b):

(a) whether or not the information providability of the specified server 2702 is capable of providing information when already registered Titv is updated to a new Titv including the declared Treq; and (b) whether or not the transmittability of the transmission path 2703 is capable of transmitting information provided from the servers (1 to m) 2702 when the already registered Titv is updated to the new Titv including the declared Treq.

If determinations of YES are made as to both of the above items (a) and (b), the registration instruction part 2691 instructs the execution right generation cycle table 2692 to update the already registered Titv of the specified server 2702 to a new Titv calculated by the following expression (9), and transmits the resource acquisition response 32 to the client 2701, thereby informing the client 2701 of acceptance of the request:

$$Titv=1/(1/Titv+1/Treq) \qquad (9)$$

The registration instruction part 2691 further instructs the execution right generation cycle table 2692 to update the Tofs to a new Tofs calculated by the following expression (10):

$$Tofs=Tofs+(Titv(new)-Titv(old)) \qquad (10)$$

where Titv(new) and Titv(old) represent the updated Titv and the Titv not yet updated respectively.

If at least one of the determinations is of NO, on the other hand, the registration instruction part 2691 transmits the resource acquisition response 32 to the client 2701, to inform the client 2701 of no acceptance of the request.

When the determinations are of YES as to both of the above items (a) and (b) while the server ID of the specified server 2702 is not registered in the execution right generation cycle table 2692, the registration instruction part 2691 instructs the execution right generation cycle table 2692 to newly register the server ID, Titv and Tofs. In this case, the declared Treq and "O" are registered as the Titv and the Tofs respectively.

The operation of the execution right generation part 2693 for generating the execution right on the basis of the Titv and the Tofs registered in the execution right generation cycle table 2692 is similar to that described in the sixth embodiment with reference to FIG. 24. However, the execution right generation cycle table 2692 registers the server IDs, Titv and Tofs of the plurality of servers (1 to m) 2702 in the aforementioned manner, dissimilarly to that in the sixth embodiment.

This embodiment is different from the sixth embodiment also in a point that the new Tofs is calculated by the following expression (11) at the step S4 in FIG. 24, in place of the expression (6):

$$Tofs=Tofs+Titv \qquad (11)$$

Similarly, this embodiment is different from the sixth embodiment also in a point that the Nsft is calculated by the following expression (12) at the step S8, in place of the expression (7)

$$Nsft=f(Titv/Tslt) \qquad (12)$$

where f(x) represents the minimum integer exceeding x.

Then, the execution instruction part 2695 selects the execution right on the basis of the provided evaluation index, acquires the read request to the server 2702 corresponding to the selected execution right among those queued in the processing queue 2694, and instructs the corresponding server 2702 to execute the read request. The operation of the execution instruction part 2695 at this time is similar to that described in the sixth embodiment with reference to FIG. 25. However, a count value C is a total number of times of the execution instruction part 2695 instructing execution to all servers (1 to m) 2702, and Nmax is the number of read requests corresponding to the maximum information quantity transmittable through the transmission path 2703 within a time equal to the cycle Tslt.

When video information is provided in the aforementioned manner and the provision is completed, the client 2701 transmits the resource release request 35 shown in FIG. 20 similarly to the client 1921 in the sixth embodiment, thereby informing the video information providing unit 2700 of the fact that the desired video information has been completely received. However, the server ID and Treq are added to the resource release request 35 transmitted by the client 2701, and the registration instruction part 2691 shown in FIG. 26 instructs the execution right generation cycle table 2692 to update the registered Titv to a new Titv calculated by the following expression (13):

$$Titv=1/(1/Titv-1/Treq) \qquad (13)$$

The registration instruction part 2691 instructs the execution right generation cycle table 2692 to update the Tofs to a new Tofs calculated by the above expression (10).

According to this embodiment, as hereinabove described, operations similar to those in the sixth embodiment are performed in case of scheduling read requests so that video information is cyclically provided from the plurality of servers (1 to m) 2702 to the client 2701. When the client declares updating of an already registered cycle Titv for generating the execution right of a certain server 2702 to that for generating the execution right in the cycle Treq, further, the registration instruction part 2691 instructs the execution right generation cycle table 2692 to update the registered Titv to the new cycle Titv calculated by the above expression (9) only when the transmittability of the transmission path 2703 is capable of transmitting the information provided from all servers (1 to m) 2702 even if the already registered Titv is updated to the new Titv including the declared Treq.

Thus, it is possible to prevent increase of the number of the remaining execution rights with time due to the average number of the generated execution rights Tslt exceeding the transmittability of the transmission path when the registered cycle is updated.

When the client 2701 declares updating of an already registered cycle Titv for generating the execution right of a certain server 2702 to that for generating the execution right excluding the cycle Treq, the registration instruction part 2691 instructs the execution right generation cycle table 2692 to update the registered Titv to the new cycle Titv calculated by the above expression (13).

Thus, when the client 2701 declares updating of an already registered cycle for generating the execution right to that for generating the execution right excluding that generated in the cycle Treq, the already registered cycle can be updated to the new one.

While only a single client 2701 having a plurality of buffers and a plurality of monitors is included in this embodiment, a plurality of clients 2701 each having a single buffer and a single monitor may alternatively be included through the common transmission path 2703. In this case, however, the respective clients 2701 must transmit read requests in determined cycles respectively.

While the requests are scheduled due to the limit of the transmittability of the transmission path 2703 in this embodiment, the requests may alternatively be scheduled due to a limit of receivability (capacities and processing speeds of the buffers etc.) of the client 2701.

While the execution right generation parts 1813 and 2693 and the execution instruction parts 1815 and 2695 are started in the cycles Tslt in the sixth and seventh embodiments, these parts may alternatively be started in different cycles.

While Nmax represents the maximum number of read requests executable by the server 1922 in the time equal to the cycle Tslt in the sixth embodiment, Nmax may alternatively represent the maximum number of read requests executable by the server 1922 in a unit time. While Nmax similarly represents the maximum number of read requests corresponding to the information quantity transmittable through the transmission path 2703 in the time equal to the cycle Tslt in the seventh embodiment, Nmax may alternatively represent the maximum number of read requests corresponding to the information quantity transmittable through the transmission path 2703 in a unit time.

Scheduling may be so performed that a plurality of servers cyclically provide video information to a plurality of clients respectively by employing still another scheduling unit including the scheduling units shown in FIGS. 18 and 26. Namely, the scheduling unit shown in FIG. 18 first generates the execution rights for the respective clients, then selects the execution right of a certain client among the generated ones, and inputs the read request corresponding to this execution right in the scheduling unit shown in FIG. 26. Then, the scheduling unit shown in FIG. 26 generates execution rights for the respective servers, selects the execution right of a certain server among the generated ones, and instructs the server to execute the inputted read request.

While the execution right generation parts 1813 and 2693 calculate Nsft by the above expressions (7) and (12) respectively in the sixth and seventh embodiments, Nsft may be defined by integer parts of values obtained by dividing Treq by Tslt.

Further, the execution right generation cycle tables 1812 and 2692 may register Tnext indicating times for generating the next execution rights in place of the execution right generation cycle offsets Tofs so that the execution right generation parts 1813 and 2693 generate execution rights when the current times match with Tnext.

While the execution right generation parts 1813 and 2693 calculate Nsft and the execution instruction parts 1815 and 2695 select execution rights having smaller Nsft, the execution right generation parts 1813 and 2693 may alternatively calculate the aforementioned Tnext so that the execution instruction parts 1815 and 2695 select execution rights having Tnext closer to the current times.

Figure 31:
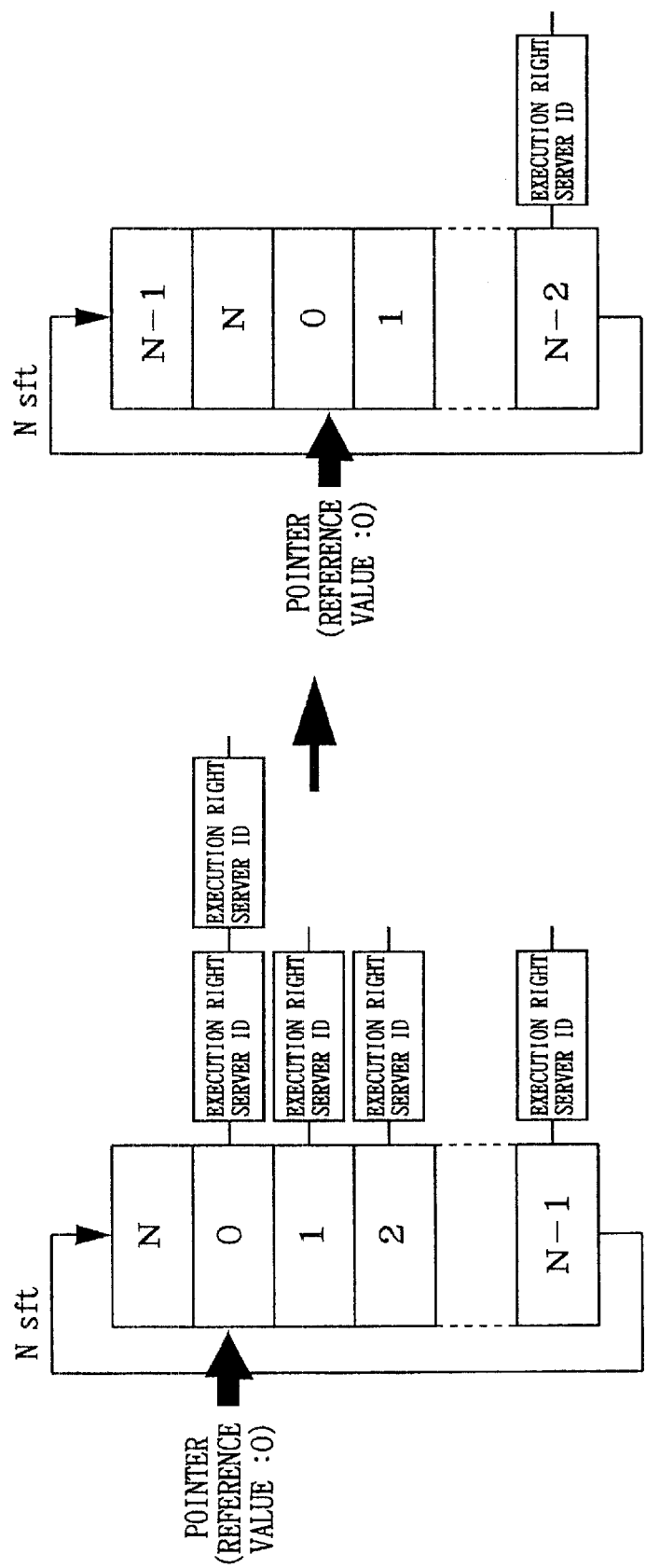
FIG. 31 is a diagram for illustrating operations of another execution right queue.

While the execution instruction parts 1815 and 2695 instruct the execution right queues 1816 and 2696 to decrement Nsft of the remaining execution rights when the count values are greater than or equal to Nmax, still another execution right queue shown in FIG. 31 may alternatively be employed in place of the execution right queues 1816 and 2696 so that the execution instruction parts 1815 and 2695 instruct this execution right queue to displace a pointer when the count values C are greater than or equal to Nmax. As shown in FIG. 31, this execution right queue has a ring structure, so that the values of Nsft are successively exchanged following movement of the position of the pointer.

As hereinabove described, a file system such as a video-on-demand system in a CATV network or a video edition system in a broadcast station is provided with a server unit handling data of pictures, sounds and the like. This server unit has a function of reading data retrieving an internal storage unit and reading data corresponding to a data read request received from a user terminal or a client, and transmitting the data to the user terminal or the client requiring reading.

In order to guarantee continuity of the transmitted data, the conventional server unit executes data transmission after ensuring an execution right for a resource (ability for processing or transmitting data per unit time) in the server unit and a use right for a communication resource (ability capable of transmitting data per-unit time) between the server unit and the user terminal requiring data acquisition matching with the quantity of the transmitted data.

However, the aforementioned conventional server unit ensures the resource use right before data transmission, not only for data such as dynamic images and sounds requiring continuity but for data such as still pictures requiring no continuity. Thus, it is difficult to ensure the resource for the data requiring continuity as the transmission quantity of the data requiring no continuity is increased, leading to incapability of data transmission at the worst.

Description is now made on a server unit which can efficiently use resources in case of transmitting data requiring no continuity while exerting no influence on resource assurance for transmitting data requiring continuity even if the transmission quantity of the data requiring no continuity is increased.

(Eighth Embodiment)

Figure 32:
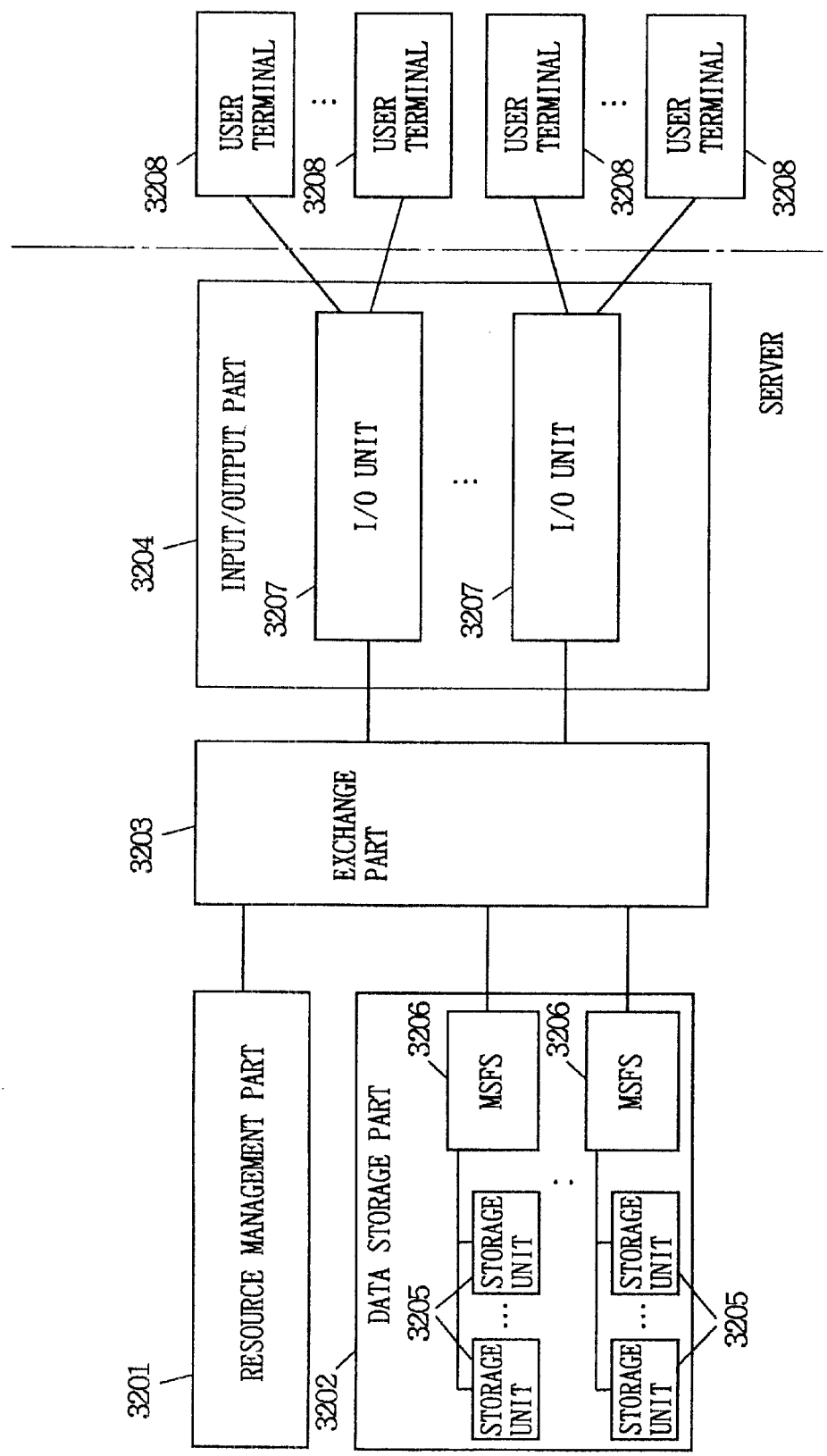
FIG. 32 is a block diagram showing the structure of a data transmission system employing a server unit according to an eighth embodiment of the present invention.

FIG. 32 is a block diagram showing the structure of a data transmission system employing a server unit according to an eighth embodiment of the present invention. Referring to FIG. 32, this data transmission system comprises a resource management part 3201, a data storage part 3202, an exchange part 3203, an input/output part 3204, and a plurality of user terminals 3208. The server unit according to this embodiment is formed by the resource management part 3201, the data storage part 3202, the exchange part 3203 and the input/output part 3204. This server unit is connected with the respective terminals 3208 through wire or wireless transmission paths.

The resource management part 3201 manages resources necessary for transmitting data to the respective user terminals 3208. The data storage part 3202 includes a plurality of random-accessible storage units (such as hard disk drives or optical disk drivers provided with auto changers, for example) 3205, and a plurality of MSFSs 3206 connected with the respective storage units 3205 for controlling data reading. The exchange part 3203 exchanges data between the input/output part 3204 and the data storage part 3202. According to this embodiment, ATM switches are employed for the exchange part 3203, for example. The input/output part 3204 includes a plurality of I/O units 3207, and controls data input/output between the server unit and the respective user terminals 3208. Each user terminal 3208 is connected to any I/O unit 3207.

In the aforementioned structure, the exchange part 3203 sets a connection in the form of a mesh between each I/O unit 3207 and each MSFS 3206. The band of each connection is managed by the resource management part 3201.

Figure 33:
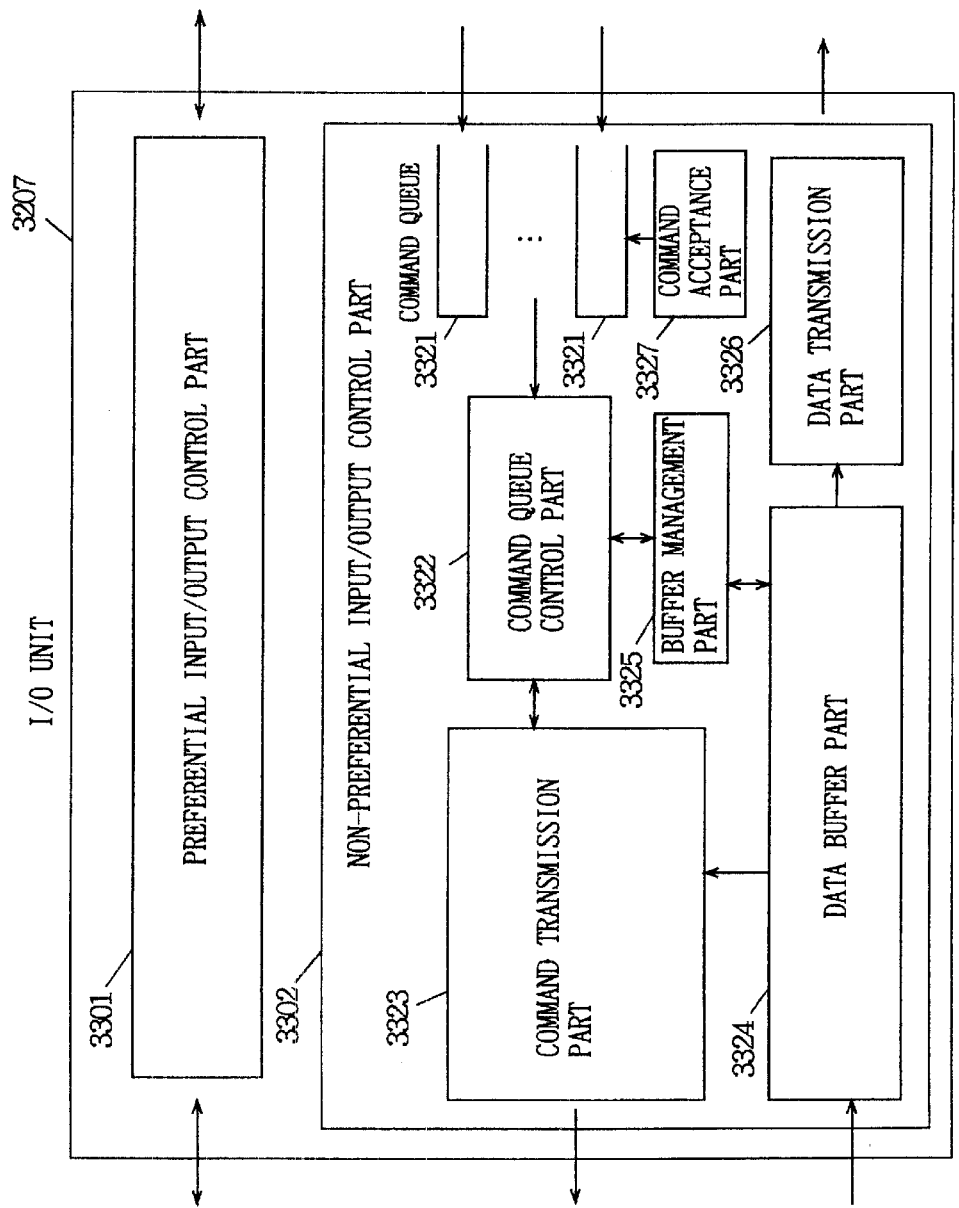
FIG. 33 is a block diagram showing a more detailed structure of an I/O unit 3207 shown in FIG. 32.

FIG. 33 is a block diagram showing a more detailed structure of each I/O unit 3207 shown in FIG. 32. Referring to FIG. 33, the I/O unit 3207 comprises a preferential input/output control part 3301 and a non-preferential input/output control part 3302. The non-preferential input/output control part 3302 includes a command queue 3321, a command queue control part 3322, a command transmission part 3323, a data buffer part 3324, a buffer management part 3325, a data transmission part 3326, and a command acceptance part 3327.

The preferential input/output control part 3301 controls input/output of data (hereinafter referred to as preferential data) such as dynamic image data, for example, requiring continuity. On the other hand, the non-preferential input/output control part 3302 controls input/output of data (hereinafter referred to as non-preferential data) such as still picture data, for example, requiring no continuity.

In the non-preferential input/output control part 3302, the command queue 3321 stores commands requiring reading of non-preferential data from the user terminals 3208 for every user terminal 3208. The command queue control part 3322 controls fetch of the command from the command queue 3321. The command transmission part 3323 transmits the command fetched by the command queue control part 3322 to the corresponding destination MSFS 3206. The data buffer part 3324 stores data read by the MSFS 3206 from the storage unit 3205. The buffer management part 3325 counts data stored (or reserved to be stored) in the data buffer part 3324 every user terminal 3208 requiring reading. The data transmission part 3326 transmits the data stored in the data buffer part 3324 to the corresponding destination user terminal 3208, and sets the area of the data buffer part 3324 completing transmission in a space state. The command acceptance part 3327 manages whether or not the command arriving from the user terminal 3208 is registered in the command queue 3321.

The operation of the server unit having the aforementioned structure is now described.

First, description is made on resource initialization performed in starting of the system. In starting of the system, the resource management part 3201 separates and allocates resources of the respective parts in the data transmission system, i.e., the data read band of each MSFS 3206, the communication band between each I/O unit 3207 and the exterior, the communication band of each ATM switch in the exchange part 3203 etc. into:

(1) resources (hereinafter referred to as preferential resources) used for outputting the preferential data; and (2) resources (hereinafter referred to as non-preferential resources) used for outputting the non-preferential data. Thereafter the resource management part 3201 individually manages the respective separated resources.

The data read band of the MSFS 3206 is defined as the maximum speed of data readable in a predetermined delay time below a predetermined waste ratio when read data are stored at random and the data are read in response to read requests received from the MSFS 3206 at random intervals.

A preferential data output operation is now described. In case of requiring output of preferential data to the server unit, each user terminal 3208 requires assurance of a resource in a band necessary for transmitting the preferential data. The preferential input/output control part 3301 receiving the request for resource assurance requests the resource management part 3201 to ensure the resource while specifying the band width. The resource management part 3201 ensures the communication band of the ATM switch, the data read band of the MSFS 3206 and the communication band of the I/O unit 3207 from the band width previously allocated as the preferential resource, in order to transmit the data of the required band width.

If the preferential resource is currently in use with no allowance for the required band width, assurance of the resource is in fail and the server unit cannot output the preferential data. If the resource is successfully ensured, on the other hand, the communication band of the I/O unit 3207, the data read band of the MSFS 3206 and the communication band of the ATM switch of the exchange part 3203 are set in each device for the data required to be outputted by the user terminal 3208.

When a resource assurance completion notice is received from the preferential input/output control part 3301, the user terminal 3208 issues a command requiring output of the preferential data. The preferential input/output control part 3301 of the I/O unit 3207 receiving the command executes data output through the resource ensured for the preferential data to be outputted.

Figure 34:
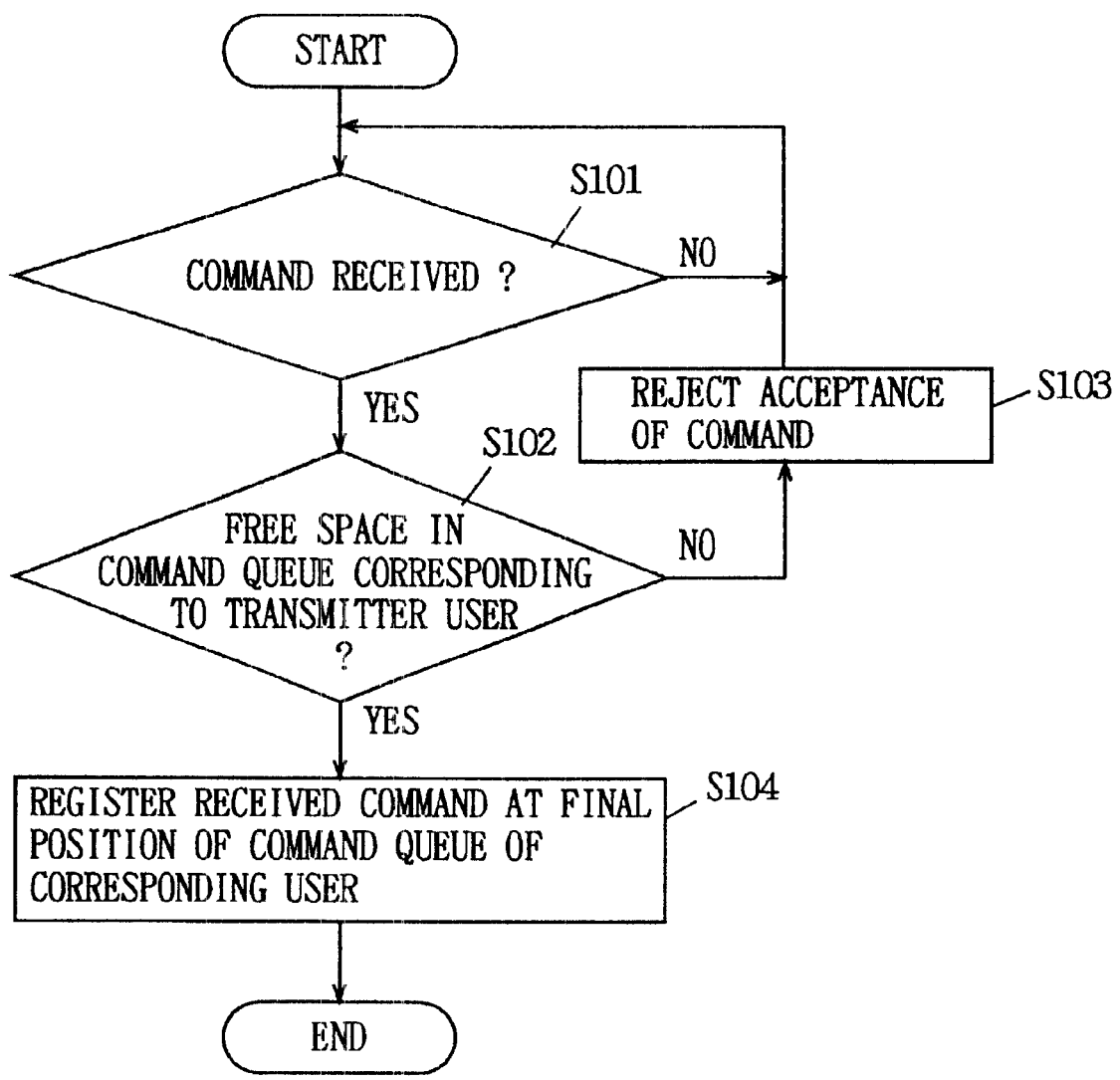
FIG. 34 is a flow chart showing operations of a command acceptance part 3327 shown in FIG. 33.
Figure 35:
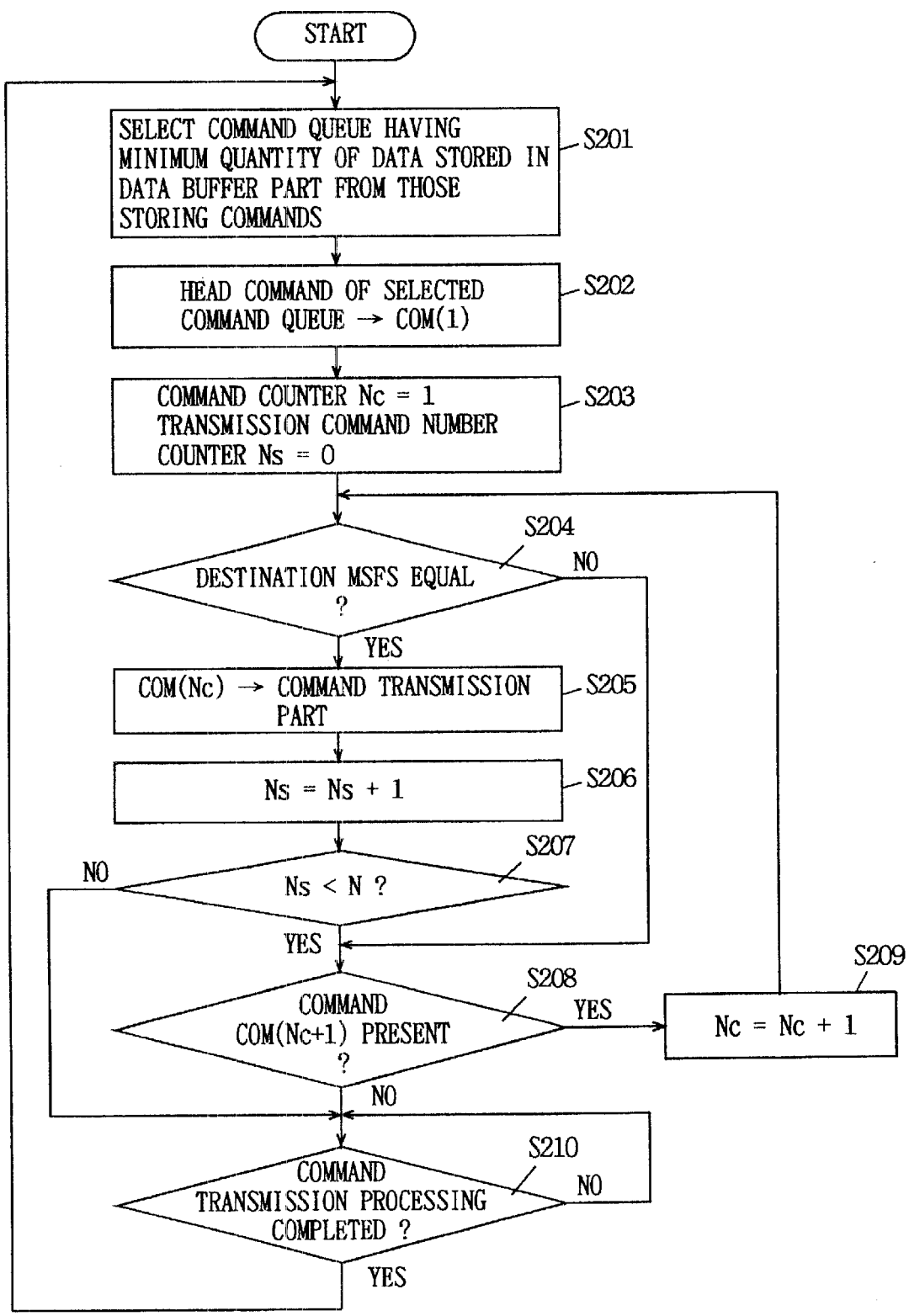
FIG. 35 is a flow chart showing operations of a command queue control part 3322 shown in FIG. 33.
Figure 36:
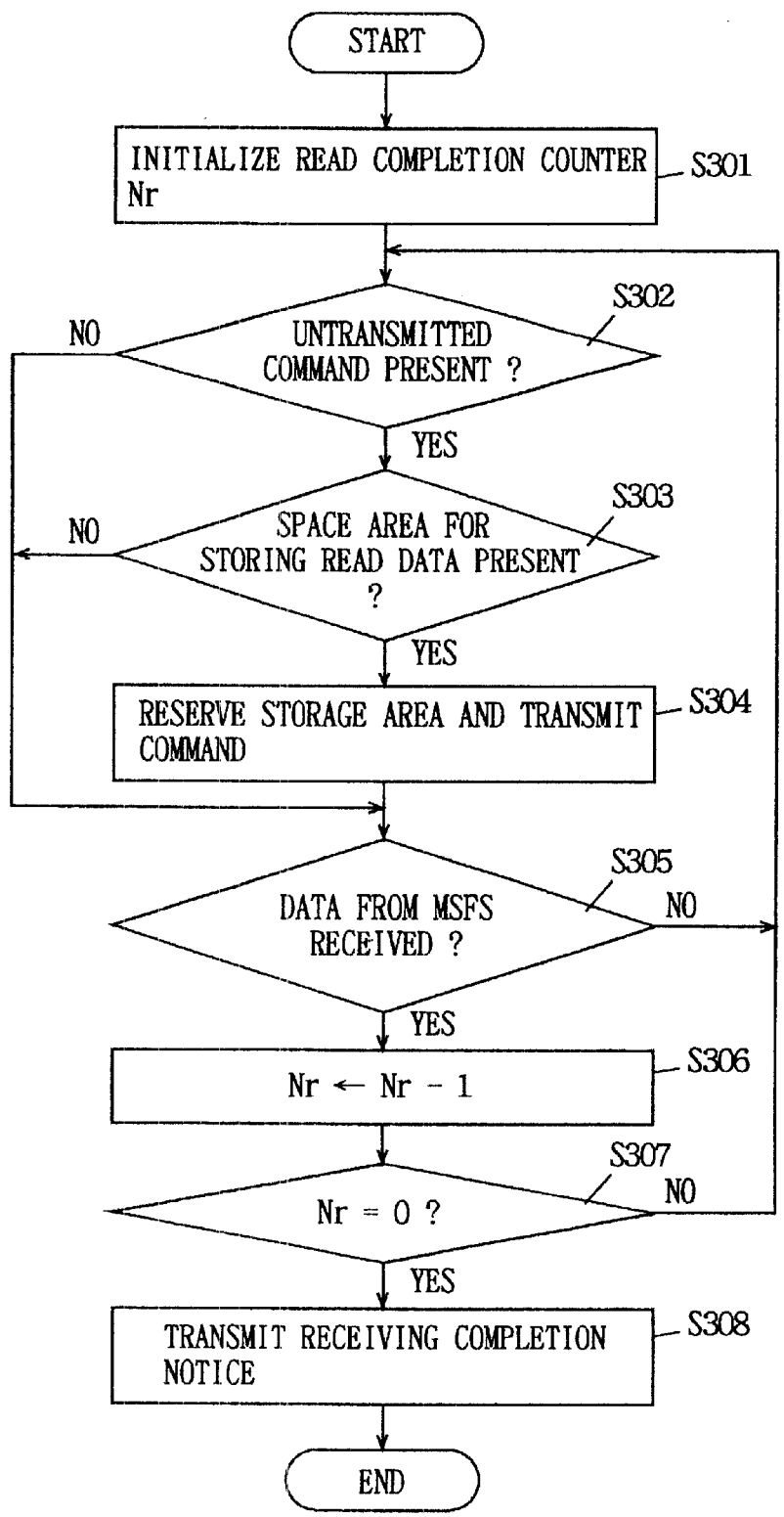
FIG. 36 is a flow chart showing operations of a command transmission part 3323 shown in FIG. 33.

FIG. 34 is a flow chart showing the operation of the command acceptance part 3327 shown in FIG. 33. FIG. 35 is a flow chart showing the operation of the command queue control part 3322 shown in FIG. 33. FIG. 36 is a flow chart showing the operation of the command transmission part 3323 shown in FIG. 33. With reference to FIGS. 34 to 36, the non-preferential data output operation is now described.

As shown in FIG. 34, the command acceptance part 3327 receives a command requiring reading of non-preferential data from the user terminal 3208 (step S101), and determines whether or not the command queue 3321 corresponding to the user terminal 3208 transmitting this command has a space area (step S102). If the corresponding command queue 3321 has no space area, the command acceptance part 3327 rejects acceptance of the command (step S103), and returns to the operation at the step S101. If the corresponding command queue 3321 has a space area, on the other hand, the command acceptance part 3327 stores the received command in the final part of the corresponding command queue 3321 (step S104), and completes its operation. The non-preferential input/output control part 3302 may not ensure the resource for transmitting data to the user terminal 3208, dissimilarly to the aforementioned preferential input/output control part 3301.

As shown in FIG. 35, the command queue control part 3322 refers to management information stored in the buffer management part 3325, thereby selecting a command queue corresponding to a user terminal 3208 having the minimum or no data quantity stored in the data buffer part 3324 (including not only the quantity of actually stored data but the quantity of data reserved to be stored) from the command queue 3321 of every user terminal 3208 storing commands. If there are a plurality of user terminals having data of the same minimum quantities stored in the data buffer part 3324, a command queue having the maximum queue length (i.e., storing the largest number of commands) is selected. If there are a plurality of command queues having the same queue lengths in this case, further, the command queues are cyclically selected along order determined by default.

Then, the command queue control part 3322 notes the selected command queue, and defines the command stored in its head part as COM(1) (step S202). Then, the command queue control part 3322 sets initial values 1 and 0 in a command counter Nc and a transmission command counter Ns respectively (step S203). Then, the command queue control part 3322 determines whether or not the destination MSFS 3206 for a command COM(Nc) is equal to that for the command COM(1) (step S204). If the destination MSFSs 3206 for these commands are equal to each other, the command queue control part 3322 fetches the command COM(Nc) from the selected command queue, and outputs the same to the command transmission part 3323 (step S205). Since the initial count value of the command counter Nc is 1, the command COM(Nc) is equal to the command COM(1) at first. Therefore, the head command COM(1) is first fetched from the selected command queue, and outputted to the command transmission part 3323.

Then, the command queue control part 3322 increments the transmission command counter Ns (step S206). Then, the command queue control part 3322 determines whether or not the count value of the transmission command counter Ns is less than a predetermined threshold value N (step S207). The count value of the transmission command counter Ns corresponds to the number of commands transmitted by the command queue control part 3322 to a single MSFS 3206 from the selected command queue. If a number of commands are substantially simultaneously transmitted to a single MSFS 3206, congestion results in the MSFS 3206 receiving the commands, and hence N or more commands are not simultaneously transmitted from a single command queue 3321 according to this embodiment. In other words, the command queue control part 3322 can shift to transmission processing for the next command in the selected command queue only when the count value of the transmission command counter Ns is less than the predetermined threshold value N.

If the count value of the transmission command counter Ns is less than the predetermined threshold value N at the step S207, the command queue control part 3322 determines whether or not a command represented by COM(Nc+1) is present in the selected command queue, i.e., whether or not a command to be transmitted still exists in the selected command queue (step S208). If the command COM(Nc+1) is present in the selected command queue, i.e., if a command to be transmitted still exists in the selected command queue, the command queue control part 3322 increments the command counter Nc (step S209), and thereafter returns to the operation at the step S204. In the selected command queue, therefore, the command stored in the next position is subjected to transmission processing to the command transmission part 3323. Considering a command COM(2) stored in the second position in the selected command queue, for example, this command COM(2) is outputted to the command transmission part 3323 at the step S205 if the same is equal to the command COM(1) in the head position. If the command(2) is unequal to the command COM(1) of the head position, on the other hand, the steps S205 to S207 are skipped after the step S204, so that the command COM(2) is not outputted to the command transmission part 3323.

If no command COM(Nc+1) exists in the selected command queue, on the other hand, the command queue control part 3322 determines whether or not the command transmission processing is completed, i.e., whether or not the data corresponding to the commands outputted to the command transmission part 3323 arrive from the MSFS 3206 at the data buffer part 3324 (step S210), and returns to the operation at the step S201 if the determination is of YES. The command queue control part 3322 determines that the command transmission processing is completed when a receiving completion notice (refer to a step S308 in FIG. 36 described later) is received from the command transmission part 3323.

If the count value of the transmission command counterNs exceeds the predetermined threshold value N at the aforementioned step S207, the command queue control part 3322 advances to the operation at the step S210, and executes no transmission processing for the next command.

As shown in FIG. 36, the command transmission part 3323 receives commands requiring reading of non-preferential data from the command queue control part 3322 and initializes a read completion counter Nr (step S301). In other words, the command transmission part 3323 sets the number of all commands received from the command queue control part 3322 in the read completion counter Nr as an initial value. Then, the command transmission part 3323 determines whether or not commands not transmitted to the MSFS 3206 are held in the interior (step S302). If untransmitted commands are held, the command transmission part 3323 selects and notes any one command (the next command, in general) from the untransmitted commands as held, and determines whether or not a space area capable of storing data corresponding to this command is present in the data buffer part 3324 when this data is read from the storage unit 3205 (step S303). Whether or not a space area is present in the data buffer part 3324 can be determined by referring to the management information (in more concrete terms, the count value of each counter) in the buffer management part 3325.

If a space area is present in the data buffer part 3324, the command transmission part 3323 reserves an area for storing the data in the data buffer part 3324, informs the buffer management part 3325 of this reservation, and transmits the selected command to the destination MSFS 3206 (step S304). If the area cannot be reserved, the command transmission part 3323 does not transmit the command requiring reading of non-preferential data to the MSFS 3206 until a reservable state is attained. By virtue of this processing, it is possible to prevent data received from the MSFS 3206 from being disposed due to presence of no storage area in the data buffer part 3324.

The buffer management part 3325 has a counter every user terminal 3208, and increments the count value of the counter corresponding to the user terminal 3208 transmitting the command for reading the data whose storage area is reserved in the data buffer part 3324 when the notice of reservation is received from the command transmission part 3323.

Then, the command transmission part 3323 determines whether or not the data buffer part 3324 receives data from the MSFS 3206 (step S305). If the data buffer part 3324 receives no data from the MSFS 3206, the command transmission part 3323 returns to the operation at the step S302, and performs transmission processing for the next untransmitted command. If the data buffer part 3324 receives data from the MSFS 3206, on the other hand, the command transmission part 3323 decrements the read completion counter Nr (step S306). Thus, it comes to that the count value of the read completion counter Nr indicates the number of commands for which data are not yet completely transmitted from the MSFS 3206 among the commands (i.e., all commands received from the command queue control part 3322 this time) subjected to transmission processing this time.

Thereafter the command transmission part 3323 determines whether or not the count value of the read completion counter Nr reaches zero (step S307). If the count value of the read completion counter Nr is not zero, the command transmission part 3323 returns to the operation at the step S302, and performs transmission processing for the next untransmitted command. If the count value of the read completion counter Nr is zeroed, on the other hand, the command transmission part 3323 transmits a receiving completion notice to the command queue control part 3322 (step S308), and completes its operation.

As clearly understood from the above description, it comes to that the command transmission part 3323 does not receive the next command from the command queue control part 3322 until all data corresponding to the transmitted commands are completely received from the MSFS 3206 after transmitting all commands transmitted from the command queue control part 3322.

The MSFS 3206 receiving the commands requiring reading of non-preferential data temporarily stores the commands in a non-preferential command queue provided in its interior. The MSFS 3206 fetches the commands from the non-preferential command queue in the read band ensured as a non-preferential resource, and executes data reading from the storage unit 3205. The read data are transmitted through the communication band ensured between the I/O unit 3207 requiring this reading and the MSFS 3206 for serving as a non-preferential resource. At this time, this I/O unit 3207 does not simultaneously communicate with a plurality of MSFSs 3206 as to the receiving of the non-preferential data, whereby the MSFS 3206 can transmit the data through the whole communication bands of the non-preferential resources provided in the I/O unit 3207.

The data arriving at the I/O unit 3207 from the MSFS 3206 are stored in the already reserved area of the data buffer part 3324. The data transmission part 3326 fetches the data from the data buffer part 3324 in a communication band with the exterior of the server unit ensured as a non-preferential resource, to make the area having stored the data free. At the same time, the data transmission part 3326 informs the buffer management part 3325 of the data fetch. The buffer management part 3325 receiving this information decrements the counter corresponding to the user terminal 3208 transmitting the data read commands fetched from the data buffer part 3324. Then, the data transmission part 3326 transmits the fetched data to the corresponding user terminal 3208.

According to the eighth embodiment, as hereinabove described, the resources of the respective parts of the system are previously separated to those (preferential resources) used for outputting the preferential data and those (non-preferential resources) used for outputting the non-preferential data and managed, whereby the resources employed for reading the non-preferential data can be ensured independently of the preferential resources. Consequently, no influence is exerted on output of the preferential data even if the read quantity of the non-preferential data is increased.

The receivability of each user terminal 3208 for the non-preferential data from the server unit is limited. If a certain user terminal 3208 still requires reading of non-preferential data in a quantity exceeding the receivability thereof, the data read from the storage unit 3205 in response to the request from this user terminal 3208 is stored in the data buffer part 3324 in a large quantity. Consequently, the processing for read requests from the remaining user terminals 3208 is retarded in the server unit. This phenomenon is now described in more detail with reference to a concrete example.

It is assumed that 10 user terminals 3208 are connected to the server unit, each user terminal 3208 has receivability of 10 Mbps, and the communication band between the server unit and the exterior is 100 Mbps as a whole, for example. If a certain user terminal 3208 issues a read request for non-preferential data in a quantity exceeding 100 Mbps to the server unit, the data buffer part 3324 is filled with storage data for the single user terminal 3208 issuing the read request. Further, the data stored in the data buffer part 3324 at this time are reduced only at a speed of 10 Mbps. If a read request for non-preferential data is received from another user terminal 3208 under such circumstances, transmission processing for the request from this user terminal 3208 cannot be executed until a space area capable of storing read data is formed in the buffer part 3324. In this case, it is impossible to quickly cope with a read request command requiring immediateness. In this case, further, the server unit which has communicatability of 100 Mbps as a whole provokes communicatability of only 10 Mbps in practice, and the best use of the limited communication band cannot be made.

According to the eighth embodiment, therefore, the management information stored in the buffer management part 3325 is referred to thereby selecting the command queue corresponding to the user terminal 3208 having the minimum quantity of data stored in the data buffer part 3324 from the command queues 3321 for the user terminals 3208 storing commands for preferentially executing transmission processing of the commands stored in the selected command queue, whereby a single user terminal 3208 hardly occupies the non-preferential resources shared by the plurality of user terminals 3208, and it is possible to make the best use of the communicability of the server unit for the respective user terminals 3208.

If the minimum data quantity stored in the data buffer part 3324 is in excess of a prescribed threshold value, the command queue control part 3322 may interrupt command fetch from the selected command queue 3321. Thus, it is possible to further effectively prevent the data buffer part 3324 from being filled up with data of a specific user terminal 3208, so that read requests for non-preferential data from the remaining user terminals 3208 can also be processed.

In the eighth embodiment, further, the command transmission part 3323 reserves the area for storing the data in the data buffer part 3324, and thereafter transmits the commands requiring reading of non-preferential data to the MSFS 3206. If no storage area can be reserved, the command transmission part 3323 does not transmit the commands requiring reading of non-preferential data to the MSFS 3206 until the area can be reserved. Due to the provision of such a command transmission part 3323, the data received from the MSFS 3206 can be prevented from being disposed due to no storage area in the data buffer part 3324.

In the eighth embodiment, further, the command transmission part 3323 does not receive the next command from the command queue control part 3322 until all commands transmitted from the command queue control part 3322 are transmitted and all data corresponding to the transmitted commands are completely received from the MSFS 3206. Thus, the I/O unit 3207 does not simultaneously communicate with a plurality of MSFSs 3206 in relation to receiving of the non-preferential data, whereby it is not necessary to take collision of non-preferential data into consideration. Further, the MSFS 3206 can transmit the data at a high speed through all communication bands of the non-preferential resources provided in the I/O unit 3207.

(Ninth Embodiment)

Figure 37:
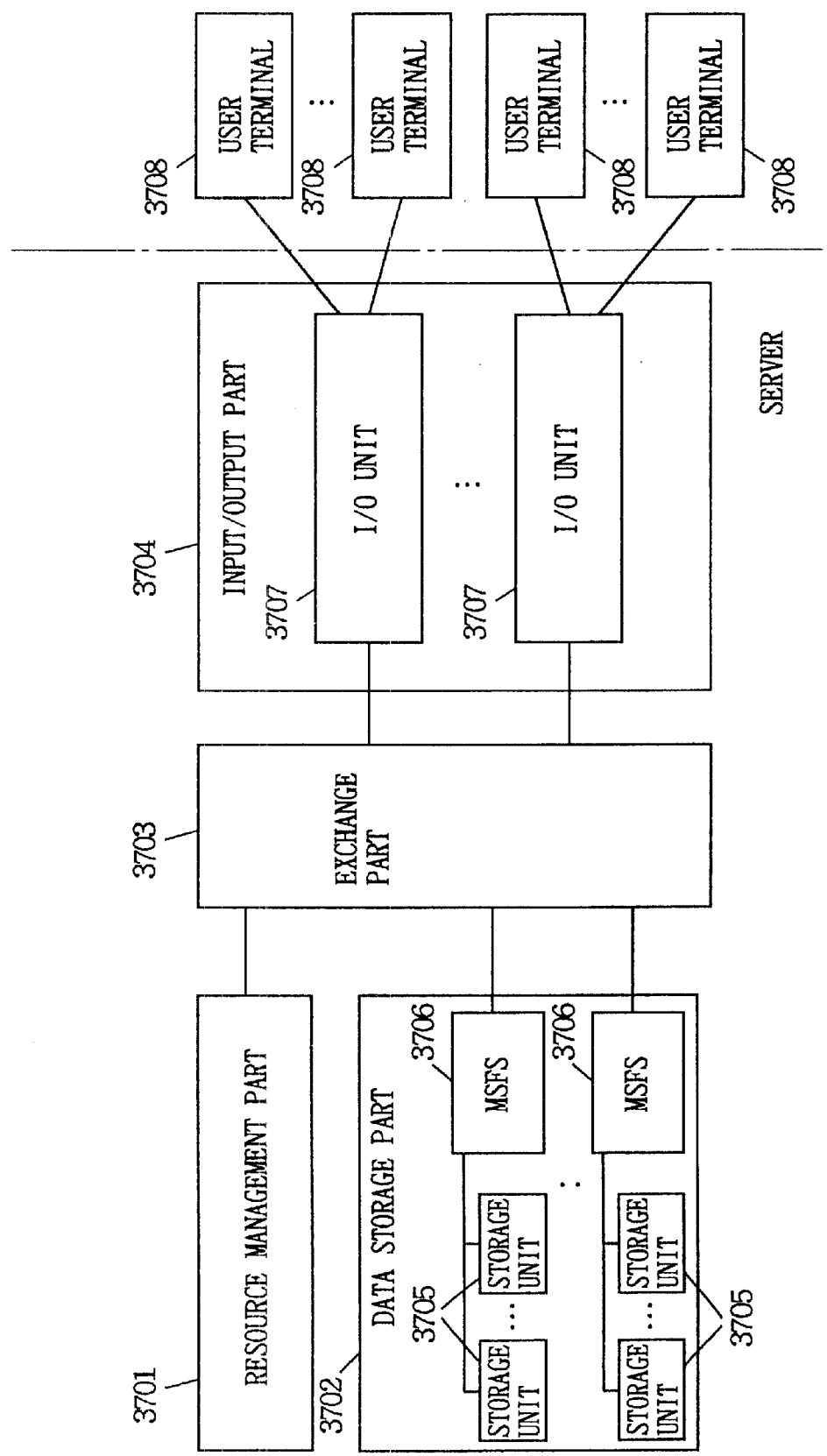
FIG. 37 is a block diagram showing the structure of a data transmission system employing a server unit according to a ninth embodiment of the present invention.

FIG. 37 is a block diagram showing a data transmission system employing a server unit according to a ninth embodiment of the present invention. Referring to FIG. 37, this data transmission system comprises a resource management part 3701, a data storage part 3702, an exchange part 3703, an input/output part 3704, and a plurality of user terminals 3708. The server unit according to this embodiment is formed by the resource management part 3701, the data storage part 3702, the exchange part 3703 and the input/output part 3704. This server unit is connected with the respective terminals 3708 through wire or wireless transmission paths.

The resource management part 3701 manages resources which are necessary for transmitting data to the respective user terminals 3708. The data storage part 3702 includes a plurality of random-accessible storage units (optical disk drivers provided with auto changers, for example), and a plurality of MSFSs 3706 which are connected to the storage units 3705 for controlling data reading. The exchange part 3703 exchanges data between the input/output part 3704 and the data storage part 3702. According to this embodiment, ATM switches are employed for the exchange part 3703, for example. The input/output part 3704 includes a plurality of I/O units 3707, for controlling data input/output between the server unit and the user terminals 3708. Each user terminal 3708 is connected to any I/O unit 3707.

In the aforementioned structure, the exchange part 3703 sets a connection in the form of a mesh between each I/O unit 3707 and each MSFS 3706. The band of each connection is managed by the resource management part 3701.

The ninth embodiment is different from the aforementioned eighth embodiment in the following points:

First, the resource management part 3701, which separates the resources of the overall system into preferential resources and non-preferential resources for managing the same, changes the quantities of the resources allocated as the preferential and non-preferential resources respectively in response to increase/decrease of the necessary quantity of the preferential resources.

Communication bands of the ATM switches in the exchange part 3703 serving as the non-preferential resources are ensured in an ABR mode. "ABR" is a service category discussed in "the ATM Forum", which is an industry body promoting standardization of ATM communication. In communication through ABR, transmission rates are automatically adjusted by ATM layers when congestion takes place, thereby dissolving the congestion. If there are free bands, the transmission rates are automatically increased to effectively utilize the communication bands. This ABR is described in ATM Forum Traffic Management Specification Version 4.0, October 1995, ATM Forum/95-0013R8 etc.

Figure 38:
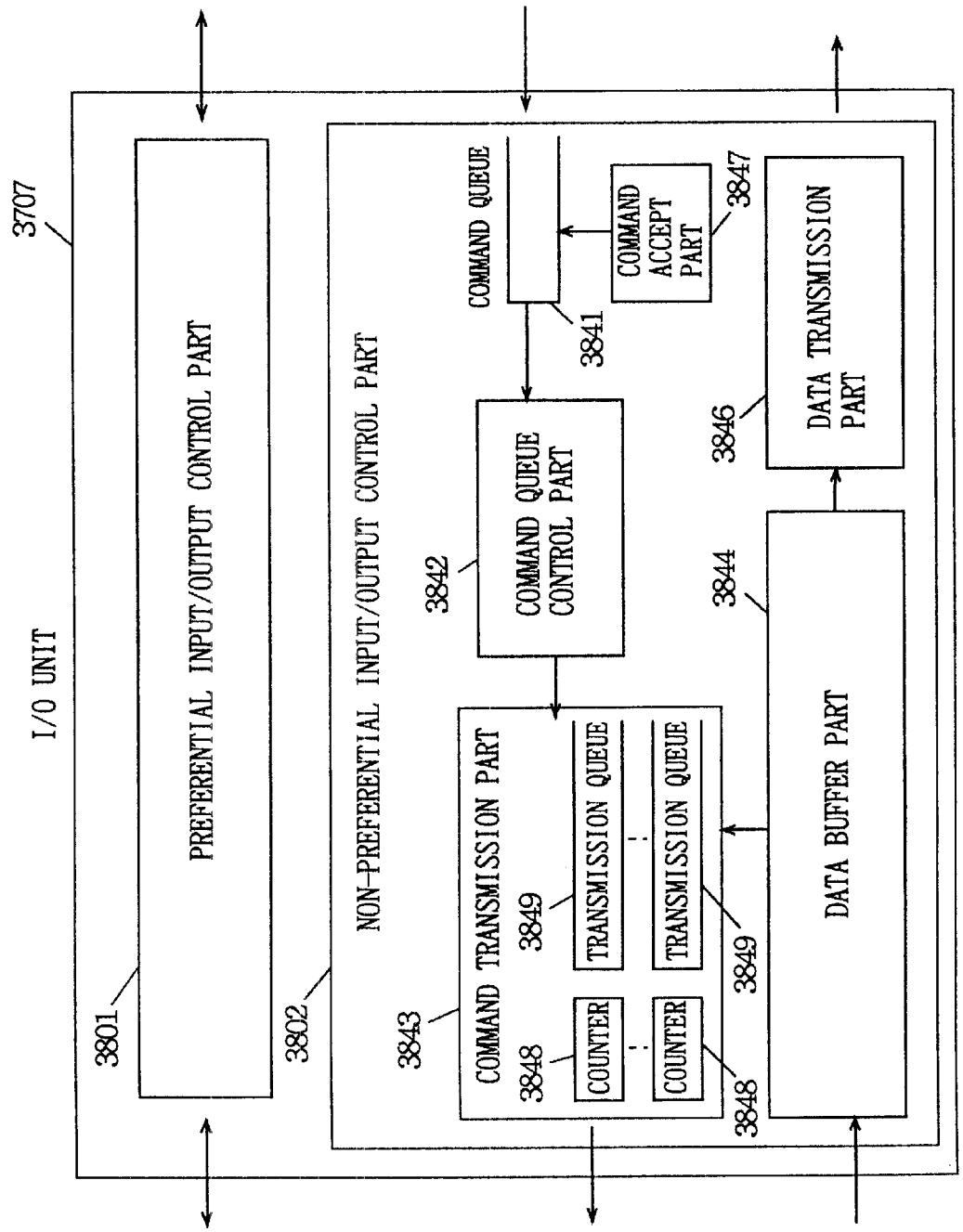
FIG. 38 is a block diagram showing a more detailed structure of an 1/O unit 3707 shown in FIG. 37.

FIG. 38 is a block diagram showing a more detailed structure of the I/O unit 3707 in FIG. 37. Referring to FIG. 38, the I/O unit 3707 comprises a preferential input/output control part 3801 and a non-preferential input/output control part 3802. The non-preferential input/output control part 3802 includes a command queue 3841, a command queue control part 3842, a command transmission part 3843, a data buffer part 3844, a data transmission part 3846, and a command acceptance part 3847. The command transmission part 3843 includes a plurality of counters 3848 and a plurality of transmission queues 3849 provided for every MSFS 3706.

The preferential input/output control part 3801 controls input/output of preferential data such as dynamic image data. On the other hand, the non-preferential input/output control part 3802 controls input/output of non-preferential data such as still picture data.

In the non-preferential input/output control part 3802, the command queue 3841 collectively stores commands from the user terminals 3708 requiring reading of non-preferential data. The command queue control part 3842 controls fetch of the commands from the command queue 3841. The command transmission part 3843 transmits the commands fetched by the command queue control part 3842 to the corresponding destination MSFSs 3706. The data buffer part 3844 stores data read by the MSFSs 3706 from the storage unit 3705. The data transmission part 3846 transmits the data stored in the data buffer part 3844 to the corresponding destination user terminals 3708. The command acceptance part 3847 manages whether or not the commands arriving from the user terminals 3708 are registered in the command queue 3841.

In the command transmission part 3843, each counter 3848 counts the number of commands whose data do not yet arrive from the MSFS 3706 in the transmitted data reading commands for every MSFS 3706. Each transmission queue 3849 stores the transmitted commands for every MSFS 3706.

Figure 39:
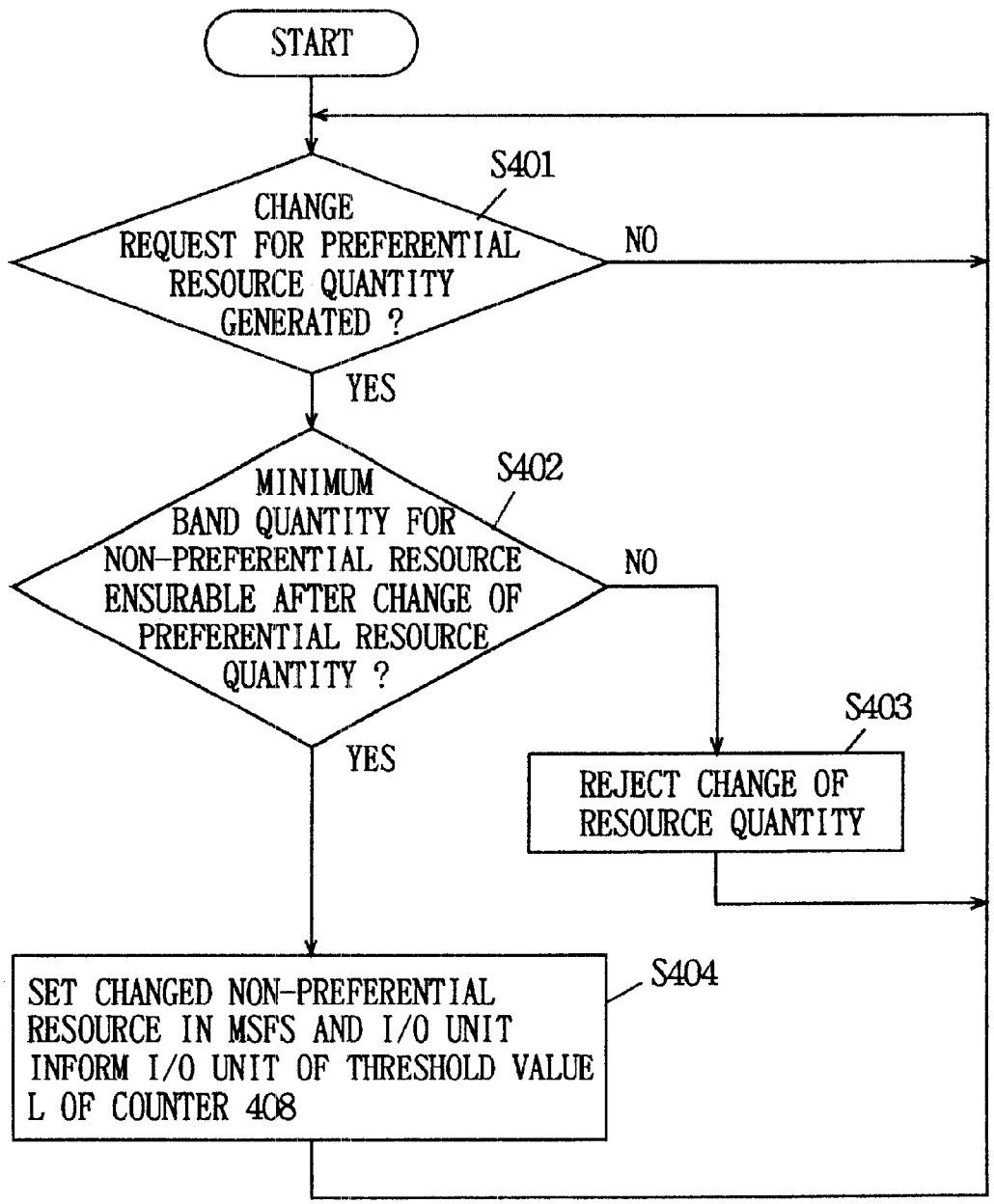
FIG. 39 is a flow chart showing operations of a resource management part 3701 shown in FIG. 37.
Figure 40:
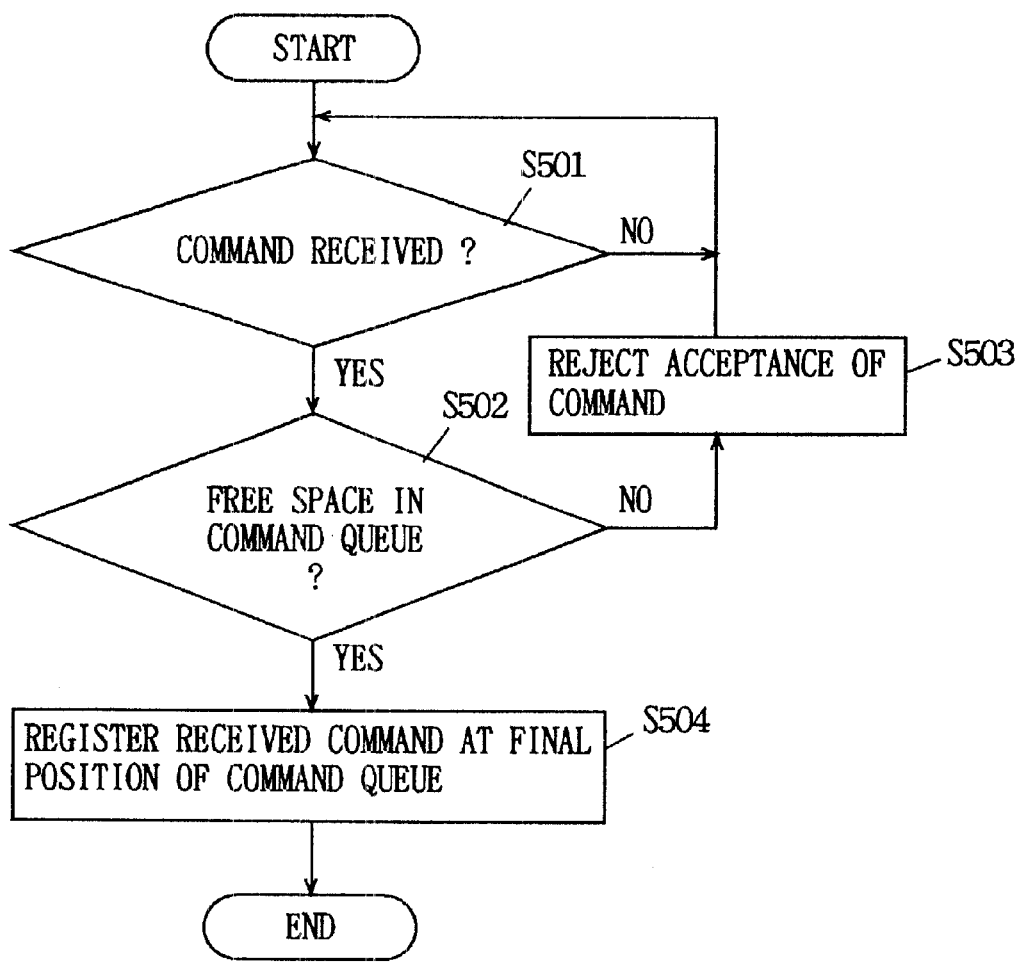
FIG. 40 is a flow chart showing operations of a command acceptance part 3847 shown in FIG. 38.
Figure 41:
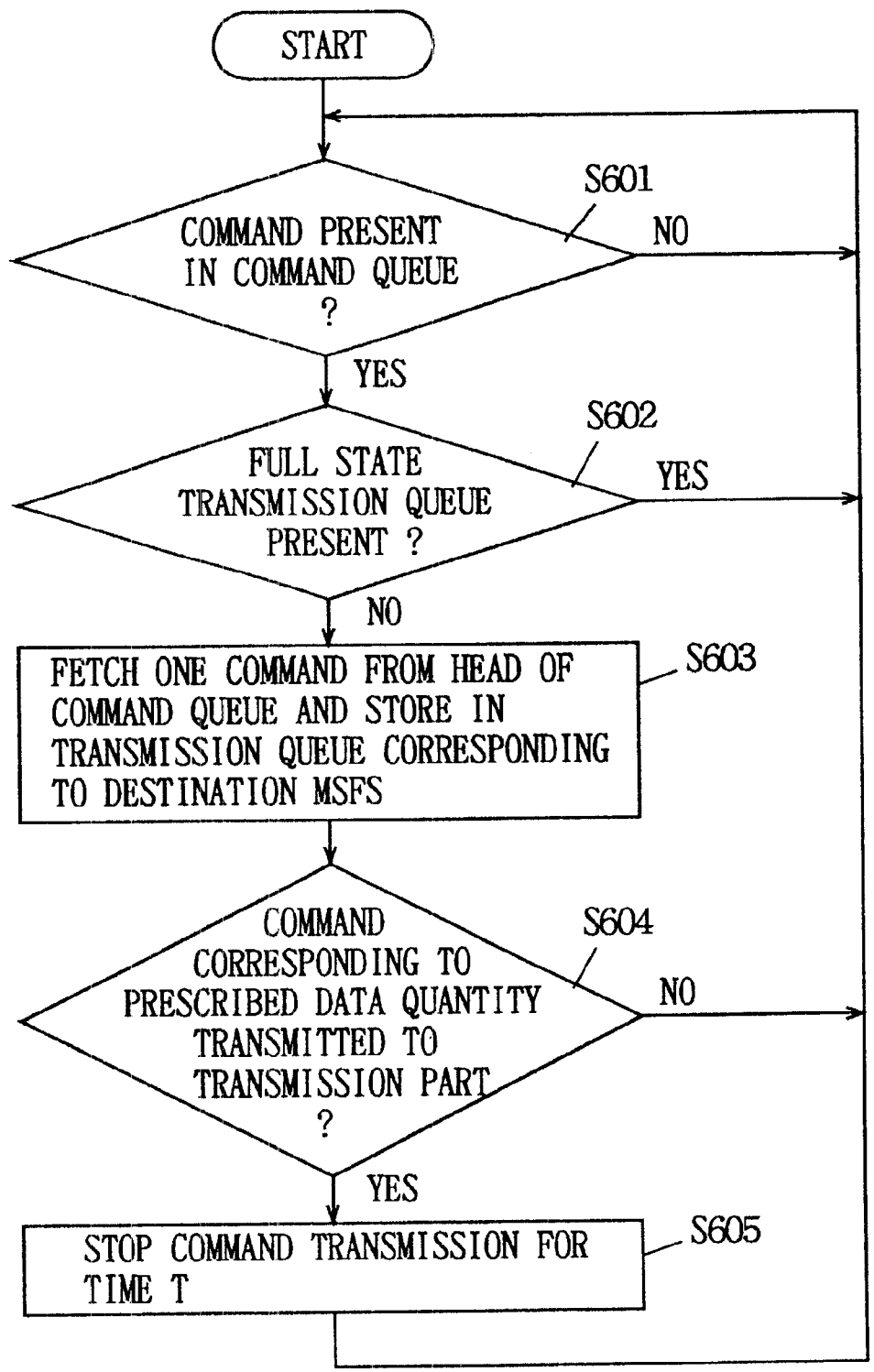
FIG. 41 is a flow chart showing operations of a command queue control part 3842 shown in FIG. 38.
Figure 42:
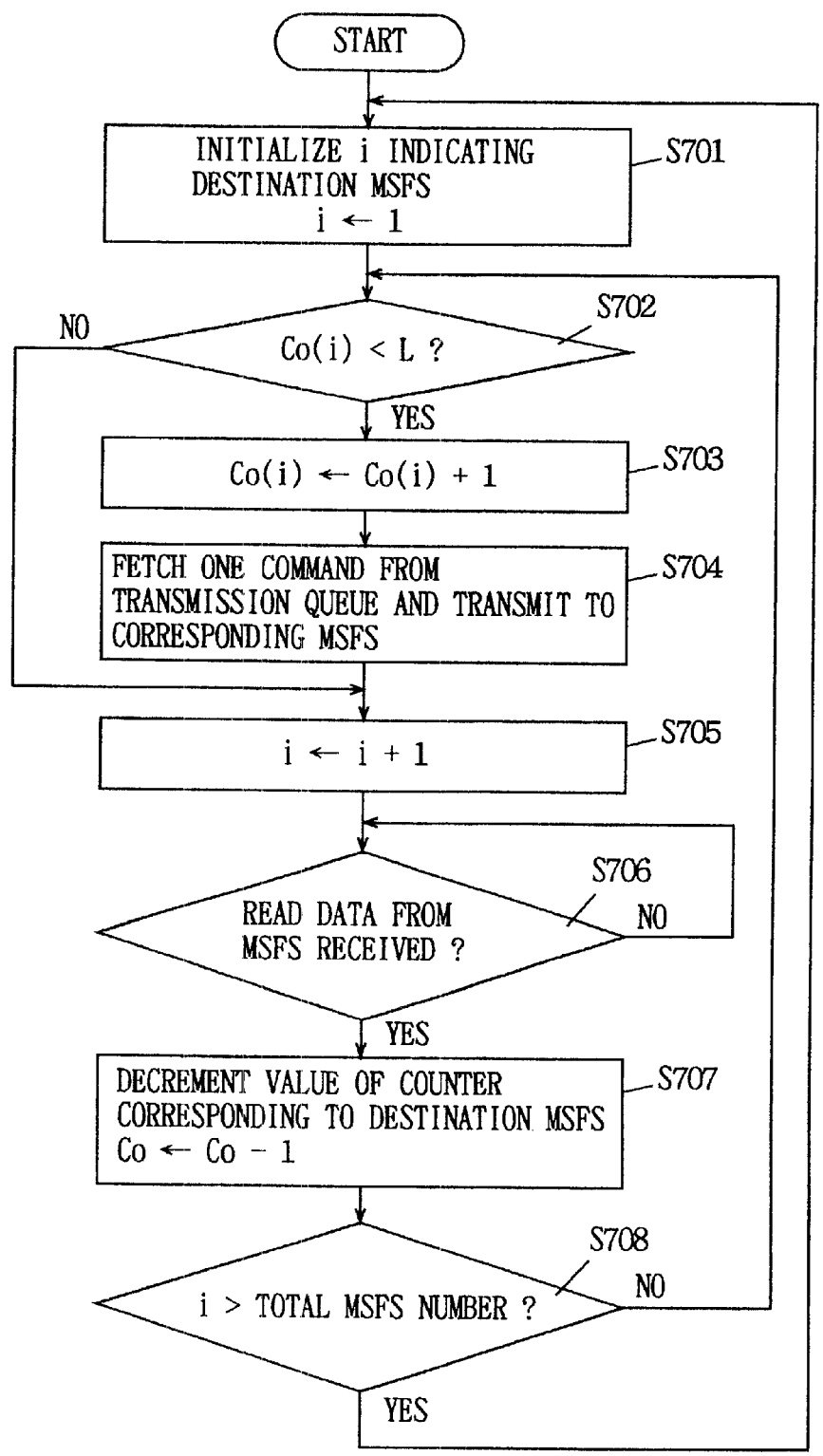
FIG. 42 is a flow chart showing operations of a command transmission part 3843 shown in FIG. 38.

FIG. 39 is a flow chart showing the operation of the resource management part 3701 shown in FIG. 37. FIG. 40 is a flow chart showing the operation of the command acceptance part 3847 shown in FIG. 38. FIG. 41 is a flow chart showing the operation of the command queue control part 3842 shown in FIG. 38. FIG. 42 is a flow chart showing the operation of the command transmission part 3843 shown in FIG. 38. With reference to FIGS. 39 to 42, the operations of the server unit according to the ninth embodiment are described.

First, initialization of the resources performed in starting of the system is described. In starting of the system, the resource management part 3701 decides the band width to be ensured for the non-preferential resources at the minimum among the resources (including the data read bands of the respective MSFSs 3706, communication bands between the respective I/O units 3707 and the exterior, communication bands of the respective ATM switches in the exchange part 3703 and the like) of the overall data transmission system. According to this embodiment, the preferential resources are regularly ensured preferentially to the non-preferential resources. Unless the minimum band width to be ensured for the non-preferential resources is decided, therefore, no band can be ensured for the non-preferential resources and the non-preferential resources cannot be transmitted if the number of read requests for the preferential data is increased. In starting of the system, further, the resource management part 3701 sets ATM communication paths between the MSFSs 3706 and the I/O units 3707 as the non-preferential resources by the ABR mode.

An output operation for the preferential data is now described. In case of requiring output of preferential data to the server unit, each user terminal 3708 requires assurance of resources of a band necessary for transmitting the preferential data. The preferential input/output control part 3801 receiving the request for the resource assurance requires the resource management part 3701 to ensure the resources while specifying the band width. The resource management part 3701 ensures a communication band of the ATM switch in the exchange part 3703, a data read band of the MSFS 3706 and a communication band of the I/O unit 3707 from the band width previously allocated for the preferential resources, in order to transmit data of the required band width.

If all or most part of the bands ensured for the preferential resources is currently in use and there is no allowance for a band width necessary for reading and transmitting the required preferential data, the resource management part 3701 determines that a change request for the band width ensured for the preferential resources is generated (step S401), as shown in FIG. 39. Thereafter the resource management part 3701 determines whether or not the aforementioned minimum band width (set in starting of the system) can be ensured for the non-preferential resources if the band width for the preferential resources is changed to be increased. If the minimum band width cannot be ensured for the non-preferential resources when the band width for the preferential resources is increased, the resource management part 3701 rejects the increase of the preferential resources (step S403), and returns to the operation at the step S401. In this case, assurance of the preferential resources is unsuccessful and the server unit cannot execute output of the preferential data.

If the minimum quantity can be ensured for the non-preferential resources even if the band width of the preferential resources is increased, on the other hand, the resource management part 3701 sets the band width of the non-preferential resources allocated as the remainder of the preferential resources after change in the MSFS 3706 and the I/O unit 3707, and informs the command transmission part 3843 of a threshold value L of the counter 3848 (step S404). When the preferential input/output control part 3801 completely outputs the preferential data, the resource management part 3701 reduces the corresponding band width from the ensured preferential resources.

The operations of the resource management part 3701 and others are similar to those of the resource management part 3201 etc. shown in FIG. 32, and hence redundant description is omitted.

An output operation for the non-preferential data is now described. When a command requiring reading of non-preferential data is received from any user terminal 3708 (step S501), the command acceptance part 3847 determines whether or not the command queue 3841 has a free space (step S502), as shown in FIG. 40. If the command queue 3841 has no free space, the command acceptance part 3847 rejects acceptance of the command to the user terminal 3708 transmitting the same (step S503), and returns to the operation at the step S501. If the command queue 3841 has a free space, on the other hand, the command acceptance part 3847 stores the received command in the final part of the command queue 3841 (step S504), and completes its operation.

As shown in FIG. 41, the command queue control part 3842 determines whether or not the command queue 3841 stores commands (step S601), and determines whether or not at least one of the transmission queues 3849 provided every MSFS 3706 is filled up (i.e., stores commands up to the tail) if the determination is of YES (step S602). If at least one of the queues is filled up, the command queue control part 3842 stops fetch of the commands from the command queue 3841 until the commands are transmitted and the transmission queue 3849 has a free space. If no transmission queue 3849 is filled up, on the other hand, the command queue control part 3842 fetches one command from the head of the command queue 3841, and stores the same in the transmission queue 3849 corresponding to the destination MSFS 3706 (step S603).

Then, the command queue control part 3842 determines whether or not commands corresponding to a prescribed data quantity have been transmitted to the command transmission part 3843 (step S604). The prescribed data quantity is defined as a data quantity of non-preferential resources allocated to the I/O unit 3707 at this point of time and transmittable in a predetermined time through a smaller one of communication bands between the I/O unit 3707 and the MSFS 3706 and between the same and the user terminal 3708. If no commands corresponding to the prescribed data quantity have been transmitted to the command transmission part 3843, the command queue control part 3842 returns to the operation at the step S601, and fetches the next command from the command queue 3841 for transmitting the same to the command transmission part 3843. When commands corresponding to the prescribed data quantity have been transmitted to the command transmission part 3843, on the other hand, the command queue control part 3842 stops transmission of the commands from the command queue 3841 to the command transmission part 3843 for the time T (step S605).

Assuming that the communication band for the non-preferential resources for the I/O unit 3707 for outputting data to the exterior of the server unit is M (KB/s), the communication band for the non-preferential resources for the I/O unit 3707 for receiving read data from the MSFS 3706 is N (Kb/r), the quantity of data read through a single read request command is S (KB) and M>N, for example, it comes to that the command queue control part 3842 fetches commands from the command queue 3841 in a cycle of S/N (sec.) and transmits the same to the command transmission part 3843.

As shown in FIG. 42, the command transmission part 3843 initializes a value i expressing the destination MSFS 3706 for the command, i.e., sets the value i at 1 (step S701). Then, the command transmission part 3843 determines whether or not a count value Co(i) of an i-th counter 3848 is less than the threshold value L (set at the step S404) set by the resource management part 3701 (step S702). If the count value Co(i) is less than the threshold value L (i.e., if Co(i)>L), the command transmission part 3843 increments the count value Co(i) of the i-th counter 3848 (step S703), and fetches a single command from the i-th transmission queue 3849 for transmitting the same to the corresponding destination MSFS 3706 (step S704). Then, the command transmission part 3843 increments the value i (step S705).

Thereafter the command transmission part 3843 determines whether or not the data buffer part 3844 receives read data from the MSFS 3706 (step S706), and decrements the count value of the counter 3848 corresponding to the MSFS 3706 to which the received data is transmitted if the determination is of YES (step S707). Then, the command transmission part 3843 determines whether or not the value i is greater than the total number of the MSFSs 3706 (step S708). If the value i is not more than the total number of the MSFSs 3706, the command transmission part 3843 returns to the operation at the step S702, and executes command transmission processing to the next transmission queue 3849.

If the count value Co(i) of the i-th counter 3848 is in excess of the threshold value L (i.e., if Co(i)≧L) at the aforementioned step S702, the command transmission part 3843 transmits no command to the corresponding i-th transmission queue 3849, in order to avoid concentration of read processing to a single MSFS 3706 and residence of commands in this MSFS 3706.

If the value i is greater than the total number of the MSFSs 3706 at the step S708, the command transmission part 3843 returns to the operation at the step S701. Therefore, the value i is set at the initial value 1, and the aforementioned series of operations are repeated. Thus, the command transmission part 3843 successively searches for the plurality of transmission queues 3849 from the first one, and fetches only one command if a noted transmission queue 3849 stores commands for transmitting the same to the corresponding destination MSFS 3706. Thus, the respective MSFSs 3706 uniformly perform read processing, whereby it is possible to prevent concentration of loads to any one MSFS 3706. Even if read requests from the user terminals 3708 are concentrated to a single MSFS 3706, command transmission processing for this MSFS 3706 is stopped when the number of unprocessed commands (commands whose data reading is not yet executed) with respect to this MSFS 3706 exceeds the threshold value L. Thus, it is also possible to cope with such an unexpected accident.

The MSFS 3706 receiving a non-preferential data read request temporarily stores this request in the internal non-preferential command queue. Then, this MSFS 3706 fetches the command from the non-preferential command queue in a read band ensured for the non-preferential resources and executes data reading.

The read data is transmitted through the communication path ensured between the I/O unit 3707 requiring the reading and the MSFS 3706 in the ABR mode as a non-preferential resource.

The data from the MSFS 3706 arriving at the I/O unit 3707 is stored in the data buffer part 3844. At this time, the count value of the counter 3848 corresponding to the transmission MSFS 3706 is decremented (the above step S707).

The data transmission part 3846 fetches the data from the data buffer part 3844 along the communication band with the exterior of the server unit ensured as a non-preferential resource, and transmits the fetched data to the corresponding user terminal 3708.

According to the ninth embodiment, as hereinabove described, all resources not used as preferential resources are managed as non-preferential resources so that preferential resources are allocated from the non-preferential resources under conditions that the number of the non-preferential resources is not below the prescribed resource quantity (minimum band width), whereby input/output of the preferential data is not influenced even if reading of the non-preferential data is increased, while reading of the non-preferential data is efficiently executed since all unused resources are used as non-preferential resources.

In the aforementioned ninth embodiment, the MSFSs 3706 asynchronously operate and hence data transmitted to the I/O units 3707 from these MSFSs 3706 may collide with each other to result in congestion in the ATM switches provided in the exchange part 3703. In the ninth embodiment, however, the communication bands of the ATM switches serving as non-preferential resources are ensured in the ABR mode so that the MSFSs 3706 reading data transmit the data through the communication paths ensured in the ABR mode. Even if congestion takes place, therefore, the transmission rates from the MSFSs 3706 are immediately reduced to solve the problem of congestion. Therefore, the I/O units 3707 can regularly normally receive the data. If the communication bands have free spaces due to release from the function as preferential resources, the transmission rates are immediately increased for effectively utilizing the bands.

According to the aforementioned ninth embodiment, further, the commands are successively fetched from the head of the command queue 3841 in such a cycle that the data quantity required by the data read commands is equal to the smaller one of the communication band for serving as a non-preferential resource for the I/O unit 3707 for outputting data to the exterior of the server unit and that for the non-preferential resource for the I/O unit 3707 for receiving the read data from the MSFS 3707. Thus, an average band used by the data transmitted from the MSFS 3706 is equal to or less than the communication band for the ATM switch for communicating with the MSFS 3706, whereby an effect of suppressing congestion of the ATM switches resulting from data transmission of the MSFS 3706 can be expected. Further, an average band used by the data transmitted from the MSFS 3706 is also equal to or less than the communication band for serving as a non-preferential resource for outputting the data to the exterior of the server unit, whereby increase of the quantity of the data stored in the data buffer part 3844 in the I/O unit 3707 can be suppressed.

In the aforementioned ninth embodiment, further, the command transmission part 3843 transmits commands in a noted transmission queue 3849 to the MSFS 3706 only when the count value of the counter 3848 corresponding to the noted transmission queue 3849 is less than the predetermined threshold value L, whereby the number of data which may be simultaneously transmitted from the MSFS 3706 is limited and an effect of suppressing congestion of the ATM switches can be expected.

While the commands are fetched from the internal non-preferential command queue for executing data reading in the read band ensured as a non-preferential resource in the ninth embodiment, the commands may alternatively be fetched from the non-preferential command queue for executing reading of the non-preferential data when no I/O processing of data is performed for the preferential resources. In this case, it is not necessary to inform the MSFSs 3706 of the data read bands serving as non-preferential resources in case of change of the band width of the non-preferential resources.

While the counter 3848 and the transmission queue 3849 are provided for every MSFS 3706 in the aforementioned ninth embodiment, the number of data which may be simultaneously transmitted from the MSFSs 3706 is limited similarly to the ninth embodiment also when a single counter and a single transmission queue are provided for every I/O unit 3707 with no attention to the transmission MSFS, and an effect of suppressing congestion of the ATM switches can be expected. When data read requests from the user terminals 3708 are concentrated to a specific MSFS 3706 to some extent, however, the read efficiency may conceivably be deteriorated. This is because the requests cannot be transmitted to the MSFS 3706 by the threshold control of the count value of the counter 3848 if data from the MSFS 3706 to which the requests are concentrated are not received, although a response must be immediately obtainable if a request can be transmitted to an MSFS 3706 to which no requests are concentrated.

In general, a user of a file system specifies the range of acquired file data and transmits a data transmission request to a server in the file system. The server transmits all file data in the range specified by the data transmission request to the user. In the conventional file system, the user can perform an operation of interrupting data transmission processing which is under execution by the server, while he cannot perform an operation of temporarily stopping data transmission processing in execution and resuming the temporarily stopped data transmission processing.

In a file system handling digitized dynamic image data, continuous transmission processing of the data at an arbitrary data transmission speed is inevitable. In relation to such a file system handling dynamic image data, the draft of ISO/EEC standard 13818-9 defines temporary stop and resume operations of continuous transmission of data in relation to a single dynamic image file. According to this draft, it is defined that data transmission is temporarily stopped by "DSM stream pause", and resumed by "DSM stream resume".

In relation to the pause for temporarily stopping continuous transmission of data at a certain transmission speed and pause release for resuming the temporarily stopped data transmission in the conventional file system handling dynamic image data, however, no pause control system of resuming the data transmission at an arbitrarily specified data transmission speed in pause release has been established.

In the conventional file system, further, a time necessary for data acquisition in case of resuming data transmission by pause release is taken into consideration. If the data transmission rate is changed around the pause processing, therefore, this may result in insufficiency of data necessary for continuous transmission, overflow of the acquired data from a buffer, and necessity for a time for the file system for acquiring next data before resuming of data transmission.

Description is now made on an embodiment which causes no data insufficiency in data transmission and can reduce the time up to resuming also when the transmission speed after pause release is arbitrarily specified in a file system for temporarily stopping and resuming continuous transmission processing of data.

(Tenth Embodiment)

Figure 43:
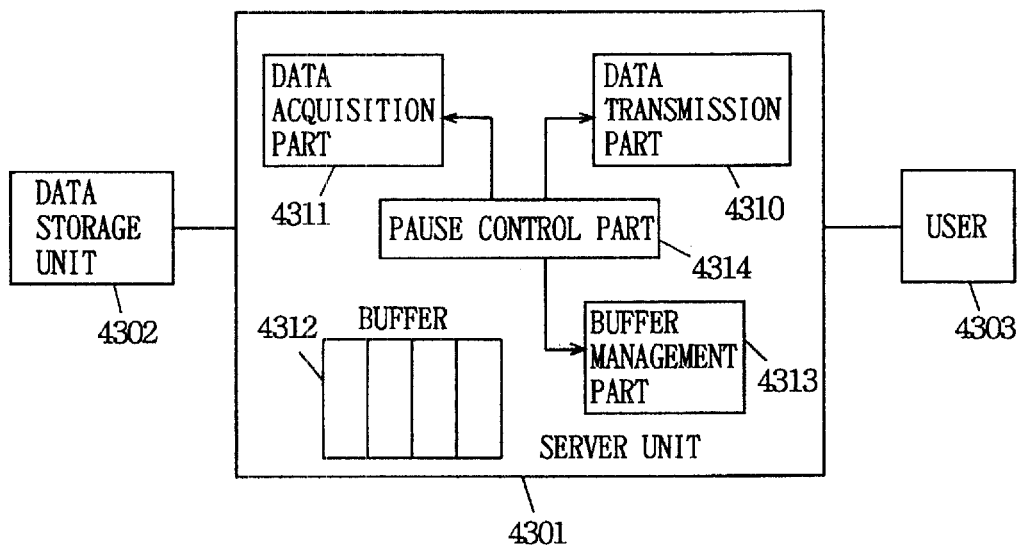
FIG. 43 is a block diagram showing the structure of a file system according to a tenth embodiment of the present invention.

FIG. 43 is a block diagram showing the structure of a file system according to a tenth embodiment of the present invention. Referring to FIG. 43, this file system comprises a server unit 4301 and a data storage unit 4302.

The data storage unit 4302 stores data managed by the server unit 4301 and used by a user 4303. The user 4303 issues a data transmission request requiring transmission of data in a specified range, a pause request requiring temporary stop of data transmission, and a pause release request requiring resuming of the temporarily stopped data transmission. The server unit 4301 is adapted to receive the data transmission request from the user 4303, acquire data from the data storage unit 4303, and transmit the data to the user 4303, and includes a data transmission part 4310, a data acquisition part 4311, a buffer 4312, a buffer management part 4313, and a pause control part 4314.

The data acquisition part 4311 acquires data from the data storage unit 4302 successively from a specified position and continuously at a specified speed. The buffer 4312 stores the data acquired from the data storage unit 4302. The buffer management part 4313 operates the data stored in the buffer 4312 and manages the data quantity. The data transmission part 4310 transmits the data stored in the buffer 4312 to the user 4303 in the specified order continuously at the specified arbitrary transmission speed. The pause control part 4314 receives the pause request and the pause release request from the user 4303 and controls the data transmission part 4310, the data acquisition part 4311 and the buffer management part 4313. It is assumed that all data handled by the server unit 4301 and the data storage unit 4302 are operated in units of blocks of fixed lengths, and block numbers indicating the positions in the data are continuously provided to the respective blocks.

Figure 44:
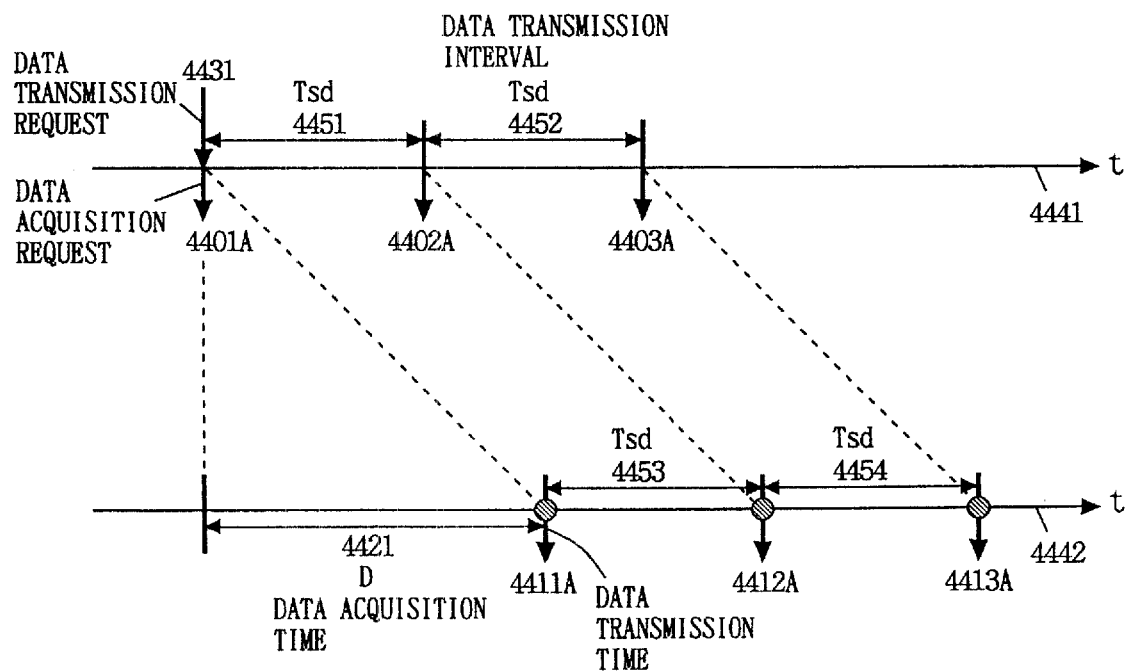
FIG. 44 is a timing diagram showing the relation between a data transmission request, data acquisition requests and data transmission in a data transmission operation of a server unit in the tenth embodiment.

FIG. 44 is a timing diagram showing the relation between the data transmission request, data acquisition requests and data transmission in a data transmission operation of the server unit 4301. With reference to FIG. 44, the operation of the server unit 4301 accepting the data transmission request from the user 4303 is described.

Referring to FIG. 44, reference numerals 4441 and 4442 denote time bases, corresponding vertical positions of which express identical times. Reference numeral 4431 denotes the data transmission request from the user 4303 accepted by the server unit 4301 and the acceptance time. Reference numerals 4401A to 4403A denote data acquisition requests issued by the data acquisition part 4311 to the data storage unit 4302 and the issuance times. Reference numerals 4411A to 4413A denote data acquired by the data acquisition requests 4401A to 4403A and times when the data transmission part 4310 transmits the data to the user 4303. Reference numeral 4421 denotes the maximum time between the issuance of the data acquisition request 4401 and storage of the corresponding data 4411A in the buffer 4312. Reference numerals 4451 to 4454 denote time intervals at which the data transmission part 4310 transmits the data to the user 4303.

The user 4303 issues the data transmission request 4431, and specifies the data range and the transmission speed for transmitting the data. The data range is specified by a start block number and an end block number. The data transmission speed is specified by a data transmission interval (hereinafter referred to as Tsd) which is an average time interval between the transmitted blocks.

When the data transmission request 4431 is accepted, the data acquisition part 4311 issues the data acquisition request 4401 A for acquiring a single block corresponding to the start block number specified by this data transmission request 4431. After a lapse of the data transmission interval Tsd from the issuance time for the data acquisition request 4401A, the data acquisition part 4311 issues the data acquisition request 4402A for acquiring the next single block to the data storage unit 4302. Through a similar procedure, the data acquisition part 4311 repeatedly issues data transmission requests until the end block number specified by the data transmission request 4431 is reached.

The blocks acquired from the data storage unit 4302 by the data acquisition request 4401A are stored in the buffer 4312. A data acquisition time D, which is the maximum time between issuance of a data acquisition request by the data acquisition part 4311 and storage of the corresponding single block in the buffer 4312, is a known value. Namely, it is guaranteed that the specified single block can necessarily be acquired in this data acquisition time D.

The block acquired by the data acquisition request 4401A and stored in the buffer 4312 is transmitted by the data transmission part 4310 to the user 4303 at the data transmission time 4411A after a lapse of the data acquisition time D from the issuance time for the data acquisition request 4401A. Similarly, the block acquired by the data acquisition request 4402A is transmitted from the data transmission part 4310 to the user 4303 at the transmission time 4412A after a lapse of the data acquisition time D from the issuance time for the data acquisition request 4402A. Through a similar procedure, data transmission is continuously performed until data corresponding to the end block number specified by the data transmission request 4431 is transmitted. Due to the aforementioned operation, continuous data transmission at the arbitrary data transmission speed specified by the user 4303 is implemented.

Figure 45:
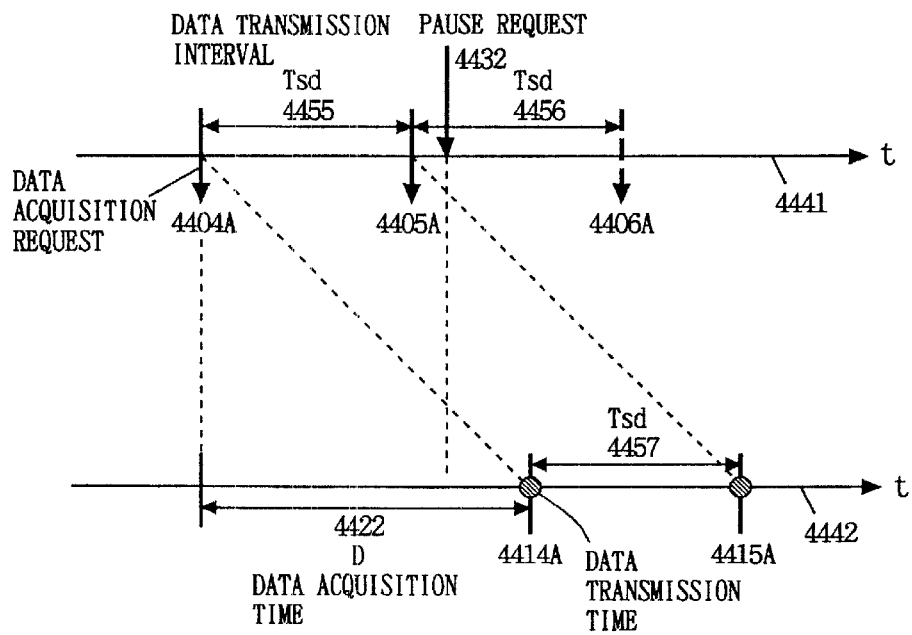
FIG. 45 is a timing diagram showing the relation between a data transmission request, data acquisition requests and data transmission in a pause operation of the server unit in the tenth embodiment.

FIG. 45 is a timing diagram showing the relation between a data transmission request, data acquisition requests and data transmission in a pause operation of the server unit 4301. With reference to FIG. 45, the operation of the pause control part 4314 in the server unit 4301 receiving a pause request from the user 4303 is described.

Referring to FIG. 45, reference numeral 4432 denotes the pause request from the user 4303 accepted by the pause control part 4314 and its acceptance time. Reference numerals 4404A to 4406A denote the data acquisition requests issued by the data acquisition part 4311 to the data storage unit 4302 and issuance times thereof Reference numerals 4414A and 4415A denote data required by the data acquisition requests 4044A and 4045A and times when the data transmission part 4310 transmits the data to the user 4303. Reference numeral 4422 denotes the maximum time between the issuance of the data acquisition request 4404A and storage of the corresponding data 4414A in the buffer 4312. Reference numerals 4455 to 4457 denote time intervals at which the data transmission part 4310 transmits data to the user 4303.

If the pause control part 4314 accepts the pause request 4432 when the data acquisition part 4311 is in the process of issuing the data acquisition requests 4404A to 4406A in response to the data transmission request from the user 4303 and after the data acquisition requests 4404A and 4405A are issued, the pause control part 4314 controls the data acquisition part 4311 to immediately stop issuance of the data acquisition requests. Thus, the data acquisition request 4406A is not issued from the data acquisition part 4311. Similarly, the pause control part 4314 controls the data transmission part 4310 to immediately stop data transmission. The transmission times for the blocks 4414A and 4415A acquired by the data acquisition requests 4404A and 4405A are later than the pause request acceptance time, and hence these blocks 4414A and 4415A remain stored in the buffer 4312, and are not transmitted from the data transmission part 4310 to the user 4303. Due to the aforementioned operation, temporary stop of the continuously transmitted data is implemented.

Figure 46:
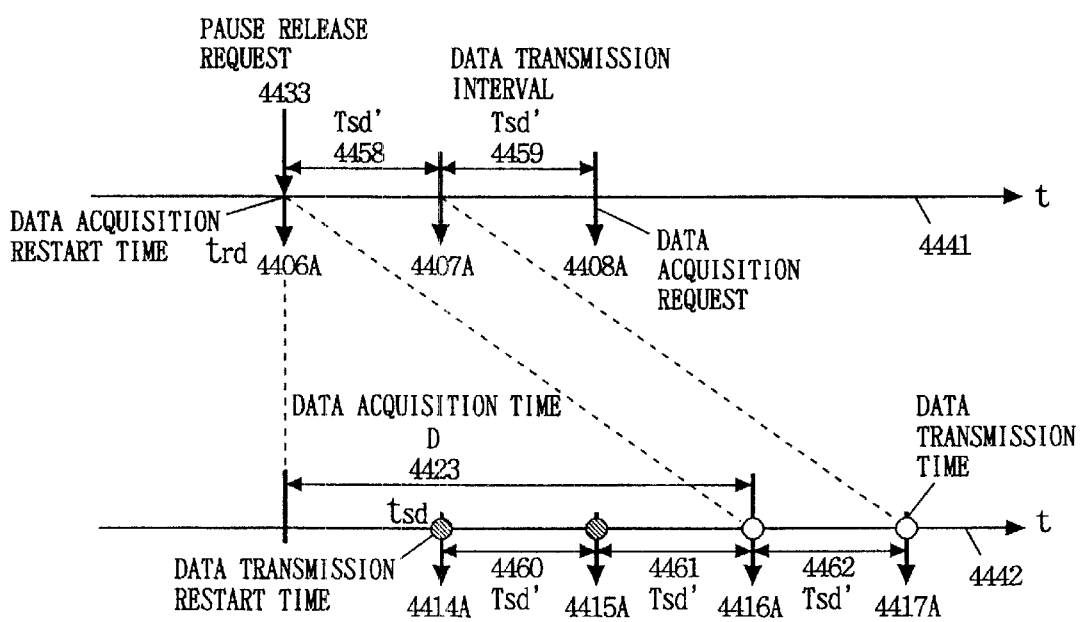
FIG. 46 is a timing diagram showing the relation between a data transmission request, data acquisition requests and data transmission in a pause release operation of the server unit in the tenth embodiment.

FIG. 46 is a timing diagram showing the relation between a data transmission request, data acquisition requests and data transmission in a pause release operation of the server unit 4301. With reference to FIG. 46, the operation of the pause control part 4314 receiving a pause release request from the user 4303 is described.

Referring to FIG. 46, reference numeral 4433 denotes the pause release request from the user 4303 accepted by the pause control part 4314 and its acceptance time. Reference numerals 4406A to 4408A denote data acquisition requests issued by the data acquisition part 4311 to the data storage unit 4302 and issuance times thereof Reference numerals 4414A and 4415A denote two blocks remaining stored in the buffer 4312 in pause processing and transmission times to the user 4303. Reference numerals 4416A and 4417A denote data acquired by the data acquisition requests 4406A and 4407A after pause release and times when the data transmission part 4310 transmits the data to the user 4303. Reference numeral 4423 denotes the maximum time D between the issuance of the data acquisition request 4406A and storage of the corresponding data 4416A in the buffer 4312. Reference numerals 4458 to 4462 denote time intervals at which the data transmission part 4310 transmits data to the user 4303.

The user 4303 issues the pause release request 4433, and specifies the data transmission speed after pause release. The data transmission speed is specified by a data transmission interval Tsd', which is an average time interval between transmitted blocks, similarly to that in the data transmission request.

When the pause release request 4433 from the user 4303 is accepted, the pause control part 4314 refers to the buffer management part 4313, thereby acquiring the number N of blocks remaining stored in the buffer 4312 after the pause processing.

A time when the pause control part 4314 controls the data acquisition part 4311 to immediately resume data acquisition in response to the pause release request 4433 is defined as a data acquisition resume time trd. Similarly, a transmission time for a block to be subsequently transmitted among those stored in the buffer 4312, i.e., the data transmission time 4414A in FIG. 46, is defined as a data transmission resume time tsd.

The pause control part 4314 substitutes the data acquisition resume time trd, the number N of blocks in the buffer 4312, the data transmission interval Tsd' after the pause release and the data acquisition time D in the following expression (14), thereby obtaining the data transmission resume time tsd:

$$tsd = trd + D - N \cdot Tsd' \quad (14)$$

Then, the pause control part 4314 compares the data transmission resume time tsd obtained through the above expression (14) with the data acquisition resume time trd, and decides the time obtained through the expression (14) as the data transmission resume time tsd if this data transmission resume time tsd is in excess of the data acquisition resume time trd. If the data transmission resume time tsd is less than the data acquisition resume time trd, on the other hand, the pause control part 4314 decides a time equal to the data acquisition resume time trd as the data transmission resume time tsd.

Then, the pause control part 4314 controls the data acquisition part 4311 at the data acquisition resume time trd to issue data acquisition requests successively from the data acquisition request 4406A for acquiring the block 4416A next to the final block 4415A stored in the buffer 4312 up to the end block. Similarly, the pause control part 4314 controls the data transmission part 4310 at the decided data transmission resume time tsd to immediately transmit the data successively from the head block 4414A stored in the buffer 4312 up to the end block.

According to the tenth embodiment, as hereinabove described, the pause control part 4314 obtains the data transmission resume time through the above expression (14) when an arbitrary transmission speed is specified as the data transmission speed after pause release, whereby the data are not interrupted after pause release but can be transmitted at the specified transmission speed.

(Eleventh Embodiment)

A file system according to an eleventh embodiment of the present invention is now described with reference to the drawings. The eleventh embodiment is similar in overall structure to the tenth embodiment shown in FIG. 43, except functions of respective blocks. Therefore, the eleventh embodiment is now described with reference to the structure of the tenth embodiment shown in FIG. 43.

In the eleventh embodiment, an operation of a server unit 4301 accepting a data transmission request from a user 4303 is identical to the operation of the tenth embodiment described with reference to FIG. 44. Similarly, an operation of a pause control part 4314 receiving a pause request from the user 4303 is identical to that of the tenth embodiment described with reference to FIG. 45. Therefore, description of these operations is omitted.

Figure 47:
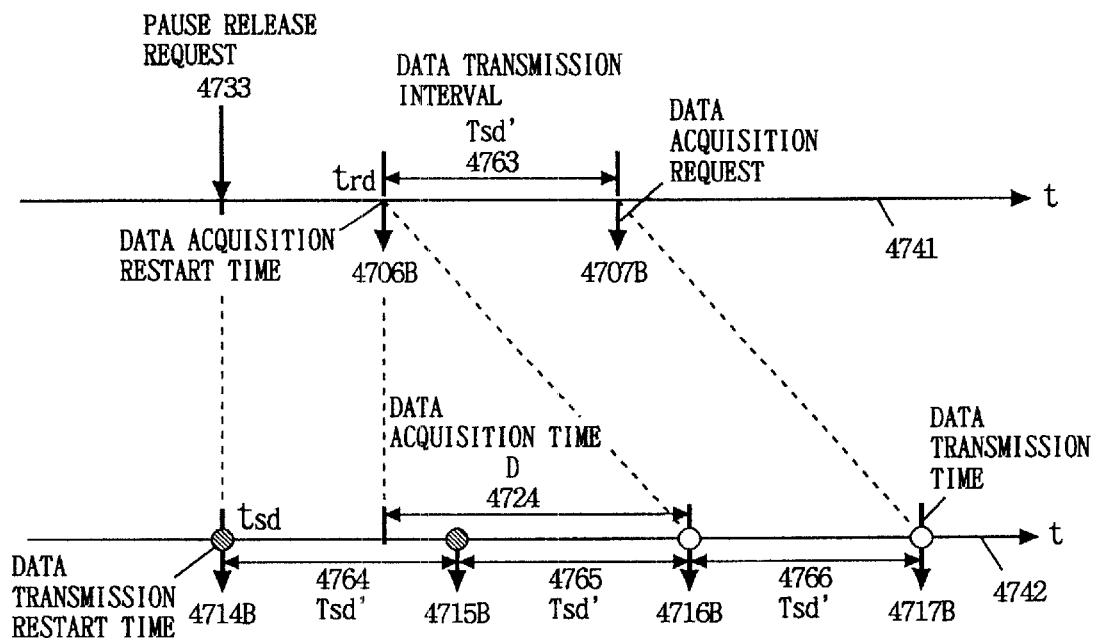
FIG. 47 is a timing diagram showing the relation between a data transmission request, data acquisition requests and data transmission in a pause release operation of a server unit according to an eleventh embodiment.

FIG. 47 is a timing diagram showing the relation between a data transmission request, data acquisition requests and data transmission in a pause release operation of the server unit 4301. With reference to FIG. 47, the operation of the pause control part 4314 accepting a pause release request from the user 4303 is now described.

Referring to FIG. 47, reference numerals 4741 and 4742 denote time bases, vertical corresponding positions of which express the same times. Reference numeral 4733 denotes the pause release request from the user 4303 accepted by the pause control part 4314 and its acceptance time. Reference numerals 4706B and 4707B denote data acquisition requests issued by the data acquisition part 4311 for a data storage unit 4302 and issuance times thereof Reference numerals 4714B and 4715B denote two blocks remaining stored in a buffer 4312 in pause processing and transmission times to the user 4303. Reference numerals 4716B and 4717B denote data acquired by the data acquisition requests 4706B and 4707B and times when the data transmission part 4310 transmits the data to the user 4303. Reference numeral 4724 denotes the maximum time D between issuance of the data acquisition request 4706B and storage of the corresponding data 4716B in the buffer 4312. Reference numerals 4763 to 4766 denote time intervals at which the data transmission part 4310 transmits data to the user 4303.

The user 4303 issues the pause release request 4733, and specifies a data transmission speed after pause release. The data transmission speed is specified by a data transmission interval Tsd' which is an average time interval between transmitted blocks, similarly to the case of the data transmission request.

When the pause release request 4733 from the user 4303 is accepted, the pause control part 4314 refers to a buffer management part 4313, and acquires the number N of blocks remaining stored in the buffer 4312 after pause processing.

A time when the pause control part 4314 controls the data acquisition part 4311 to immediately resume data acquisition in response to the pause release request 4733 is defined as a data acquisition resume time trd. Similarly, a transmission time for a block to be subsequently transmitted among those stored in the buffer 4312, i.e., the data transmission time 4714B in FIG. 47, is defined as a data transmission resume time tsd.

The pause control part 4314 substitutes the data transmission resume time tsd, the number N of blocks in the buffer 4312, the data transmission interval Tsd' after pause release and a data acquisition time D in the following expression (15), thereby obtaining the data acquisition resume time trd:

$$trd=tsd+N \cdot Tsd'-D \quad (15)$$

The pause control part 4314 compares the data acquisition resume time trd obtained through the above expression (15) with the data transmission resume time tsd, and decides the time obtained through the expression (15) as the data acquisition resume time trd if this data acquisition resume time trd is in excess of the data transmission resume time tsd. If the data acquisition resume time trd is less than the data transmission resume time tsd, on the other hand, the pause control part 4314 obtains the data transmission resume time tsd by substituting the data acquisition resume time trd, the number N of blocks in the buffer 4312, the data transmission interval Tsd' after pause release and the data acquisition time D, where the tenth embodiment is applied.

The pause control part 4314 controls the data acquisition part 4311 at the decided data acquisition resume time trd to issue data acquisition requests successively from the data acquisition request 4706A for acquiring the block 4716B next to the final block 4715B stored in the buffer 4312 up to the end block. Similarly, the pause control part 4314 controls the data transmission part 4310 at the decided data transmission resume time tsd to immediately transmit the data successively from the head block 4714B stored in the buffer 4312 up to the end block.

According to the eleventh embodiment, as hereinabove described, the pause control part 4314 obtains the data acquisition resume time through the above expression (15) when an arbitrary transmission speed is specified as the data transmission speed after pause release, whereby the data are not interrupted after pause release but can be transmitted at the specified transmission speed.

(Twelfth Embodiment)

A file system according to a twelfth embodiment of the present invention is now described with reference to the drawings. The twelfth embodiment is similar in overall structure to the tenth embodiment shown in FIG. 43, except functions of respective blocks. Therefore, the twelfth embodiment is now described with reference to the structure of the tenth embodiment shown in FIG. 43.

In the twelfth embodiment, an operation of a server unit 4301 accepting a data transmission request from a user 4303 is identical to that in the tenth embodiment described with reference to FIG. 44. Similarly, an operation of a pause control part 4314 receiving a pause request from the user 4303 is identical to that of the tenth embodiment described with reference to FIG. 45. Therefore, description of these operations is omitted.

Figure 48:
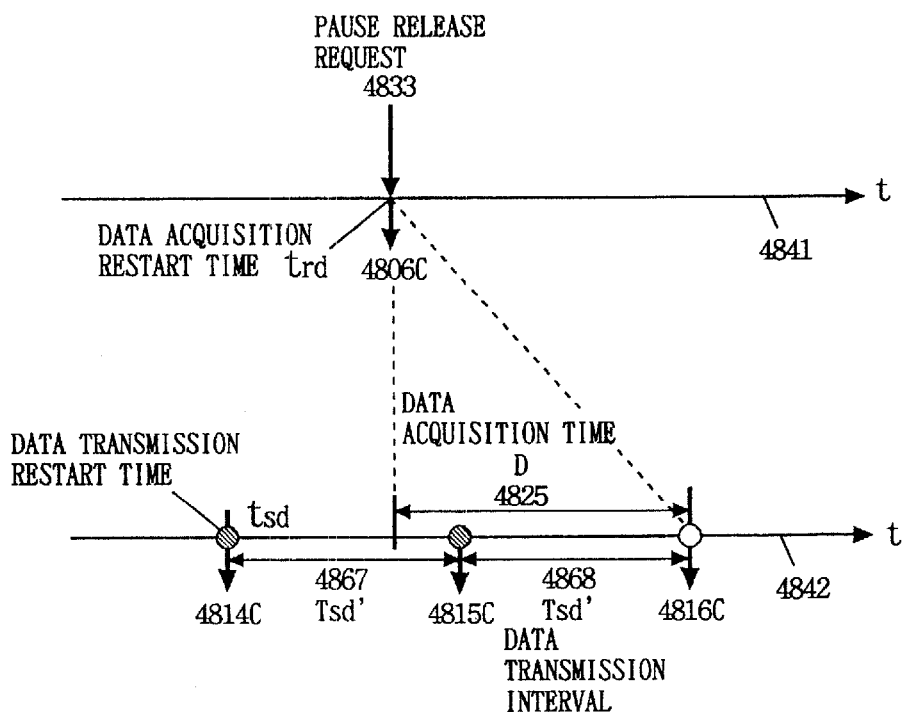
FIG. 48 is a timing diagram for illustrating a method of calculating a data transmission resume time in a pause release operation of a server unit according to a twelfth embodiment.
Figure 49:
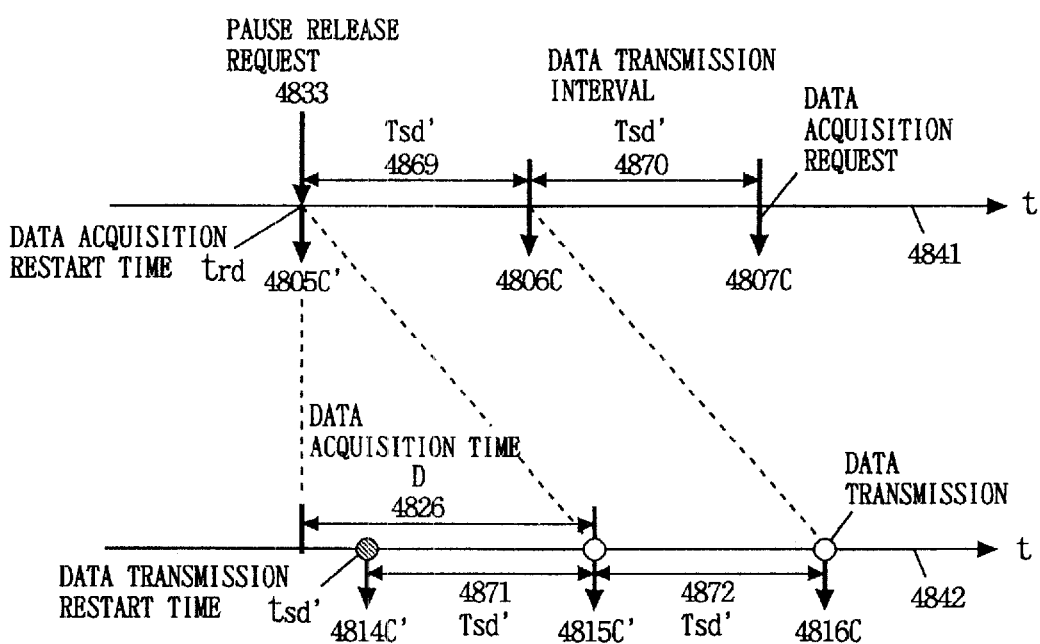
FIG. 49 is a timing diagram showing the relation between a data transmission request, data acquisition requests and data transmission in a pause release operation of a server unit according to the twelfth embodiment.

FIG. 48 is a timing diagram for illustrating a method of calculating a data transmission resume time in a pause release operation. FIG. 49 is a timing diagram showing the relation between a data transmission request, data acquisition requests and data transmission in the pause release operation of the server unit 4301. With reference to FIGS. 48 and 49, the operation of the pause control part 4314 accepting a pause release request from the user 4303 is now described.

Referring to FIG. 48, reference numerals 4841 and 4842 denote time bases, vertical corresponding positions of which express the same times. Reference numeral 4833 denotes the pause release request from the user 4303 accepted by the pause control part 4314 and its acceptance time. Reference numeral 4806C denotes a data acquisition request issued by the data acquisition part 4311 to a data storage unit 4302 and its scheduled issuance time. Reference numerals 4814C and 4815C denote two blocks remaining stored in a buffer 4312 in pause processing and scheduled transmission times to the user 4303. Reference numeral 4816C denotes data to be acquired by the data acquisition request 4306C and a scheduled time for the data transmission part 4310 for transmitting the data to the user 4303. Reference numeral 4825 denotes the maximum time D between issuance of the data acquisition request 4806C and storage of the corresponding data 4816C in the buffer 4312. Reference numerals 4867 and 4868 denote time intervals at which the data transmission part 4310 transmits data to the user 4303.

Referring to FIG. 49, reference numeral 4833 denotes the pause release request from the user 4303 accepted by the pause control part 4314 and its acceptance time. Reference numerals 4805C', 4806C and 4807C denote issuance times of data acquisition requests issued by the data acquisition part 4311 for a data storage unit 4302. Reference numeral 4814C' denotes a block remaining stored in the buffer 4312 after pause processing and a transmission time to the user 4303. Reference numerals 4815C' and 4816C denote data acquired by the data acquisition requests 4805C' and 4806C and times when the data transmission part 4310 transmits the data to the user 4303. Reference numeral 4826 denotes the maximum time D between issuance of the data acquisition request 4805C' and storage of the corresponding data 4815C' in the buffer 4312. Reference numerals 4869 to 4872 denote time intervals at which the data transmission part 4310 transmits data to the user 4303.

The user 4303 issues the pause release request 4833, and specifies a data transmission speed after pause release. The data transmission speed is specified by a data transmission interval Tsd' which is an average time interval between transmitted blocks, similarly to the case of the data transmission request.

When the pause release request 4833 from the user 4303 is accepted, the pause control part 4314 refers to a buffer management part 4313, and acquires the number N of blocks remaining stored in the buffer 4312 after pause processing.

A time when the pause control part 4314 controls the data acquisition part 4311 to immediately resume data acquisition in response to the pause release request 4833 is defined as a data acquisition resume time trd. Similarly, a transmission time for a block to be subsequently transmitted among those stored in the buffer 4312, i.e., the data transmission time 4814C in FIG. 48 and the data transmission time 4814C' in FIG. 49, is defined as a data transmission resume time tsd.

The pause control part 4314 obtains a scheduled data transmission resume time tsd through the above expression (14). Then, the pause control part 4314 compares the scheduled data transmission resume time tsd obtained through the expression (14) with the data acquisition resume time trd, decides the time obtained through the expression (14) as the data acquisition resume time tsd when the scheduled data transmission resume time tsd is in excess of the data acquisition resume time trd, and performs the following processing, similarly to the pause release processing described above with reference to the tenth embodiment: Namely, the pause control part 4314 controls the data acquisition part 4311 at the data acquisition resume time trd to immediately issue data acquisition requests successively from a data acquisition request for acquiring a block next to the final block stored in the buffer 4312 up to the end block. Similarly, the pause control part 4314 controls the data transmission part 4310 at the decided data transmission resume time tsd to immediately transmit the data successively from the head block stored in the buffer 4312 up to the end block.

If the scheduled data transmission resume time tsd obtained through the expression (14) is less than the data acquisition resume time trd, i.e., in the case shown in FIG. 48, the following processing is performed: Namely, the pause control part 4314 obtains at the data acquisition time 4825 in FIG. 48 the number L of blocks which can be transmitted at the data transmission speed Tsd' after pause release, i.e., the limit data quantity, through the following expression (16):

$$L=[D/Tsd']  \quad (16)$$

where [X] is assumed to be the maximum integer not exceeding X.

Then, the pause control part 4314 obtains the number Nd of blocks deleted from the buffer 4312 through the following expression (17), and controls the buffer management part 4313 to delete the Nd blocks obtained through the expression (17):

$$Nd=N-L  \quad (17)$$

The buffer management part 4313 deletes Nd blocks from the buffer 4312 in order finally stored in the buffer, i.e., in order from the largest block number. Thus, the block number in the buffer 4312 matches with L. Consequently, the block 4815C shown in FIG. 48 is deleted from the buffer 4312.

The pause control part 4314 substitutes the data acquisition resume time trd, the block number L in the buffer 4312, the data transmission interval Tsd' after pause release and the data acquisition time D in the following expression (18), thereby newly obtaining a data transmission resume time tsd':

$$tsd'=trd+D-L \cdot Tsd'  \quad (18)$$

Then, the pause control part 4314 controls the data acquisition part 4311 at the data acquisition resume time trd to issue data acquisition requests successively from the data acquisition request 4805C for acquiring the block 4815C' next to the final block 4814C' stored in the buffer 4312 up to the end block. Similarly, the pause control part 4314 controls the data transmission part 4310 at the decided data transmission resume time tsd' to immediately transmit the data successively from the head block 4814C' stored in the buffer 4312 up to the end block.

According to the twelfth embodiment, as hereinabove described, data exceeding the limit data quantity are deleted from the buffer 4312 when an arbitrary transmission speed is specified as the data transmission speed after pause release, whereby the server unit 4301 may not have a buffer capacity exceeding the limit data quantity but the data can be transmitted at the specified transmission speed with no interruption of the data after pause release.

While the invention has been described in detail, the foregoing description is in all aspects illustrative and not restrictive. It is understood that numerous other modifications and variations can be devised without departing from the scope of the invention.

What is claimed is:

1. A scheduling unit for use with a server and a plurality of clients and for use in scheduling service requests so that the server cyclically provides services to the plurality of clients, said scheduling unit comprising:
    a first queue for queuing service requests from the plurality of clients;
    registration means for registering cycles of generation of execution rights for the plurality of clients;
    execution right generation means for generating the execution rights according to the cycles registered in said registration means, wherein the execution rights are rights of execution of the service requests; and
    execution instruction means for instructing the server to execute service requests from clients corresponding to the execution rights generated by said execution right generation means among the service requests queued in said first queue.

2. The scheduling unit according to claim 1, wherein said execution right generation means is started in a prescribed cycle for determining, at the time of starting, based on the cycles for generating the execution rights, which are registered in said registration means, and the cycle for starting said execution right generation means, whether or not execution rights are to be generated for every client, while collectively generating the execution rights for the clients for whom it has been determined that execution rights are to be generated.

3. The scheduling unit according to claim 2, wherein said execution instruction means is started in a prescribed cycle for selecting an execution right for a client having a shorter time between a current started time to a time for generating the next execution right.

4. The scheduling unit according to claim 3, wherein said execution right generation means calculates an evaluation index indicating precedence as a function of the cycles for generating the execution rights being registered in said registration means and providing the evaluation index to the generated execution rights, and
    said execution instruction means selects an execution right to be preferentially processed among the execution rights being generated by said execution right generation means.

5. The scheduling unit according to claim 4, wherein said execution right generation means calculates the evaluation index Nsft by a function Nsft=f(Treq/Tslt), where f(x) represents a minimum integer exceeding x, with respect to the cycles Treq for generating the execution rights being registered in said registration means and the cycle Tslt for starting said execution right generation means, and
    said execution instruction means selects an execution right having a smaller evaluation index Nsft being provided thereto.

6. The scheduling unit according to claim 5, wherein said execution right generation means is started in a cycle being shorter than the longest one of the cycles being registered in said registration means.

7. The scheduling unit according to claim 5, wherein said execution right generation means is started in a cycle being shorter than the shortest one of the cycles being registered in said registration means.

8. The scheduling unit according to claim 5, wherein said execution instruction means recognizes a maximum number of service requests, execution of which is instructed in starting, stops the instruction of execution when the execution of the service requests is instructed by a number equal to the maximum number, and decrements the evaluation indices of the remaining execution rights.

9. The scheduling unit according to claim 4, wherein said execution instruction means includes second queue means for queuing the execution rights being generated by said execution right generation means for every provided evaluation index in order of generation, for selecting an execution right having a smaller provided evaluation index and being precedently generated among the execution rights being queued in said second queue means.

10. The scheduling unit according to claim 4, wherein said execution instruction means recognizes a maximum number of service requests, execution of which is instructed in starting, stops the instructions of execution when the execution of the service requests is instructed by a number equal to the maximum number, and changes the evaluation indices of the remaining execution rights to those having higher precedence.

11. The scheduling unit according to claim 10, wherein the maximum number of service requests, execution of which is instructed in starting, being recognized by said execution instruction means is a maximum number of service requests executable by the server in a time being equal to the cycle for starting said execution right generation means.

12. The scheduling unit according to claim 8, wherein the maximum number of the service requests, execution of which is instructed in starting, being recognized by said execution instruction means is a maximum number of service requests executable by the server in a time equal to the cycle for starting said execution right generation means.

13. The scheduling unit according to claim 10, further comprising registration instruction means for instructing said registration means to register the cycles for generating the execution rights based on declarations from the plurality of clients.

14. The scheduling unit according to claim 13, wherein said registration instruction means recognizes a maximum number of service requests, execution of which is instructed by said execution instruction means per unit time, and when registration of a further cycle is declared in addition to the already registered cycles, said registration instruction means instructs said registration means to register the cycle if said registration instruction means determines that an average number of the generated execution rights per unit time is not in excess of the maximum number even if further registration is made, while making the cycle not registered if said registration instruction means determines otherwise.

15. The scheduling unit according to claim 2, wherein said execution right generation means calculates a time from a current started time up to a time for generating a next execution right based on the cycles for generating the execution rights which are registered in said registration means and the cycle for starting the execution right generation means, and determines whether or not the execution rights are generated by comparing the time obtained by the calculation with the cycle for starting the execution right generation means.

16. The scheduling unit according to claim 15, wherein said execution right generation means generates an execution right for a client having a Tofs, which is a time between a current started time to a time for generating the next execution right, being less than a cycle Tslt for starting the execution right generation means (Tofs<Tslt), and adds a cycle Treq for generating the execution right being registered in said registration means to the Tofs of the client, for calculating a new Tofs for the next starting from an expression Tofs=Tofs−Tslt with respect to the Tofs if the Tofs obtained by the addition is greater than or equal to Tslt (Tofs≧Tslt).

17. The scheduling unit according to claim 16, wherein said execution right generation means repeats an operation of further generating an execution right, adding the Treq to the Tofs and comparing the result with the Tslt if the Tofs obtained by the addition is less than Tslt (Tofs<Tslt), and calculates a new Tofs for the next starting from an expression Tofs=Tofs−Tslt with respect to Tofs when the Tofs obtained by the addition is greater than or equal to Tslt (Tofs≧Tslt).

18. The scheduling unit according to claim 16, wherein said execution right generation means generates no execution right as to a client having a Tofs greater than or equal to Tslt (Tofs≧Tslt) or having a service request being not queued in said first queue, and calculates a new Tofs for the next starting through an expression Tofs=Tofs−Tslt with respect to the Tofs.

19. The scheduling unit according to claim 18, wherein said execution right generation means zeroes the Tofs for next starting if the new Tofs obtained by said calculation is less than zero (Tofs<0).

20. A scheduling unit for use with a plurality of servers and a client and for use in scheduling service requests so that the plurality of servers cyclically provide services to the client respectively, said scheduling unit comprising:
first queue means for queuing service requests to the plurality of servers;
registration means for registering cycles of generation of execution rights for the plurality of servers;
execution right generation means for generating execution rights according to the cycles registered in said registration means, wherein the execution rights are rights of execution of the service requests; and
execution instruction means for instructing the servers to execute the service requests corresponding to the execution rights generated by said execution right generation means among the service requests queued in said first queue means.

21. The scheduling unit according to claim 20, wherein said execution right generation means is started in a prescribed cycle for determining, at the time of starting, based on the cycles for generating the execution rights registered in said registration means and the cycle for starting said execution right generation means, whether or not the execution rights are generated for respective servers, and collectively generating the execution rights for the servers in which the execution rights are determined to be generated.

22. The scheduling unit according to claim 21, wherein said execution right generation means calculates a time from a current started time up to a time for generating a next execution right based on the cycles for generating the execution rights being registered in said registration means and the cycle for starting the execution right generation means, and compares the time obtained by the calculation with the cycle for starting said execution right generation means to determine whether or not the execution rights are generated.

23. The scheduling unit according to claim 22, wherein said execution right generation means generates an execution right for a server having a Tofs, which is a time between a current started time to a time for generating the next execution right, being less than a cycle Tslt for starting the execution right generation means (Tofs<Tslt), and adds a cycle Titv for generating the execution right being registered in said registration means to the Tofs of the server, for calculating a new Tofs for the next starting from an expression Tofs=Tofs−Tslt with respect to the Tofs if the Tofs obtained by the addition is greater than or equal to Tslt (Tofs≧Tslt).

24. The scheduling unit according to claim 23, wherein said execution right generation means repeats an operation of further generating an execution right, adding Titv to Tofs and comparing the result with Tslt if the Tofs obtained by the addition is less than Tslt (Tofs<Tslt), and calculates a new Tofs for the next starting by an expression Tofs=Tofs−Tslt with respect to Tofs when the Tofs obtained from the addition is greater than or equal to Tslt (Tofs≧Tslt).

25. The scheduling unit according to claim 23, wherein said execution right generation means generates no execution right as to a server having a Tofs greater than or equal to Tslt (Tofs≧Tslt) or having a service request being not queued in said first queue means, and calculates a new Tofs for the next starting through an expression Tofs=Tofs−Tslt with respect to the Tofs.

26. The scheduling unit according to claim 25, wherein said execution right generation means zeroes the Tofs for the next starting if the new Tofs obtained by the calculation is less than zero (Tofs<0).

27. The scheduling unit according to claim 21, wherein said execution instruction means is started in a prescribed cycle for selecting an execution right of a server having a shorter time between a current started time to a time for generating the next execution right.

28. The scheduling unit according to claim 27, wherein said execution right generation means calculates an evaluation index indicating precedence as a function of the cycles for generating the execution rights being registered in said registration means and providing the evaluation index to the generated execution rights, and said execution instruction means selects an execution right to be preferentially processed among the execution rights being generated by said execution right generation means based on the provided evaluation index.

29. The scheduling unit according to claim 28, wherein said execution right generation means calculates the evaluation index Nsft by a function Nsft=f(Titv/Tslt), where f(x) represents a minimum integer exceeding x, with respect to the cycles Titv for generating the execution rights being registered in said registration means and the cycle Tslt for starting said execution right generation means, and said execution instruction means selects an execution right having a smaller evaluation index Nsft being provided thereto.

30. The scheduling unit according to claim 29, wherein said execution right generation means is started in a cycle being shorter than the longest one of the cycles being registered in said registration means.

31. The scheduling unit according to claim 29, wherein said execution right generation means is started in a cycle being shorter than the shortest one of the cycles being registered in said registration means.

32. The scheduling unit according to claim 29, wherein said execution instruction means recognizes a maximum number of service requests, execution of which is instructed at the time of starting, stops instruction of execution when execution of the service requests is instructed by a number equal to the maximum number, and decrements the evaluation indices of the remaining execution rights.

33. The scheduling unit according to claim 32, wherein the maximum number of service requests, execution of which is instructed at the time of starting, being recognized by said execution instruction means is a number of service requests corresponding to a maximum quantity of information being transmittable from all of the servers to the client in a time being equal to the cycle for starting said execution instruction means.

34. The scheduling unit according to claim 28, wherein said execution instruction means includes second queue means for queuing the execution rights being generated by said execution right generation means for every provided evaluation index in order of generation, for selecting an execution right having a smaller provided evaluation index and being precedently generated among the execution rights being queued in said second queue means.

35. The scheduling unit according to claim 28, wherein said execution instruction means recognizes a maximum number of service requests, execution of which is instructed at the time of starting, stops instruction of execution when execution of the service requests is instructed by a number equal to the maximum number, and changes the evaluation indices of the remaining execution rights to those having higher precedence.

36. The scheduling unit according to claim 35, wherein the maximum number of service requests, execution of which is instructed at the time of starting, being recognized by said execution instruction means is a number of service requests corresponding to a maximum quantity of information being transmittable from all of the servers to the client in a time being equal to the cycle for starting said execution instruction means.

37. The scheduling unit according to claim 35, further comprising registration instruction means for instructing said registration means to register/update the cycles for generating execution rights based on a declaration from the client.

38. The scheduling unit according to claim 37, wherein said registration instruction means recognizes a maximum number of service requests, execution of which is instructed by said execution instruction means to all of the servers per unit time, and when registration of a cycle of a further server is declared in addition to already registered cycles, said registration instruction means instructs said registration means to register the cycle if said registration instruction means determines that an average number of generated execution rights of all of the servers per unit time is not in excess of the maximum number even if further registration is made, while making the cycle not registered if said registration instruction means determines otherwise.

39. The scheduling unit according to claim 37, wherein said registration instruction means recognizes a maximum number of service requests, execution of which is instructed by said execution instruction means to each server per unit time, and when registration of a cycle of a further server is declared in addition to already registered cycles, said registration instruction means instructs said registration means to register the cycle if said registration instruction means determines that an average number of generated execution rights of each server per unit time is not in excess of the maximum number of service requests, execution of which is instructed by said execution instruction means to the server per unit time, even if further registration is made, while making the cycle not registered if said registration instruction means determines otherwise.

40. The scheduling unit according to claim 39, wherein the maximum number of service requests, execution of which is instructed by said execution instruction means to each server per unit time, is a maximum number of service requests being executable by the each server per unit time.

41. The scheduling unit according to claim 37, wherein said registration instruction means recognizes a maximum number of service requests, execution of which is instructed by said execution instruction means to all of the servers per unit time, and a maximum number of service requests, execution of which is instructed by said execution instruction means to each server per unit time, and when a declaration is made to update a cycle Titv for generating an execution right for a prescribed server being already registered to a cycle for generating an execution right with further addition of a cycle Treq, said registration instruction means instructs said registration means to update said cycle Titv to a new Titv being calculated by an expression $Titv=1/(1/Titv+1/Treq)$ in case of determining that an average number of generated execution rights of all of the servers per unit time is not in excess of a maximum number of service requests, execution of which is instructed by said execution instruction means to all of the servers per unit time and in case of determining that an average number of generated execution rights of each server per unit time is not in excess of the maximum number of service requests, execution of which is instructed by said execution instruction means to each server per unit time, while not updating said Titv in case of determining otherwise.

42. The scheduling unit according to claim 37, wherein when a declaration is made to update an already registered cycle Titv for generating an execution right of a prescribed server to a cycle for generating an execution right while excluding a cycle Treq, said registration instruction means instructs said registration means to update the Titv to a new Titv being calculated by an expression $Titv=1/(1/Titv-1/Treq)$.

* * * * *